(12) United States Patent
Grimm

(10) Patent No.: US 12,281,580 B2
(45) Date of Patent: Apr. 22, 2025

(54) ROTARY-WING VEHICLE, AND ROTARY-WING TURBINE

(71) Applicant: Friedrich Grimm, Stuttgart (DE)

(72) Inventor: Friedrich Grimm, Stuttgart (DE)

( * ) Notice: Subject to any disclaimer, the term of this patent is extended or adjusted under 35 U.S.C. 154(b) by 0 days.

(21) Appl. No.: 18/682,037

(22) PCT Filed: Aug. 3, 2022

(86) PCT No.: PCT/EP2022/071884
§ 371 (c)(1),
(2) Date: Feb. 7, 2024

(87) PCT Pub. No.: WO2023/016901
PCT Pub. Date: Feb. 16, 2023

(65) Prior Publication Data
US 2024/0328327 A1    Oct. 3, 2024

(30) Foreign Application Priority Data
Aug. 9, 2021 (DE) ...................... 10 2021 004 136.4

(51) Int. Cl.
*F01D 15/10* (2006.01)
*B63B 1/28* (2006.01)
(Continued)

(52) U.S. Cl.
CPC .............. *F01D 15/10* (2013.01); *B63B 1/286* (2013.01); *B64C 27/473* (2013.01); *B64C 27/72* (2013.01);
(Continued)

(58) Field of Classification Search
CPC ....... F01D 15/10; B63B 1/286; B64C 27/473; B64C 27/72; B64C 27/04; B64C 27/32;
(Continued)

(56) References Cited

U.S. PATENT DOCUMENTS

| 1,880,302 A | 10/1932 | Lammeren |
| 4,134,708 A | 1/1979 | Brauser |

(Continued)

FOREIGN PATENT DOCUMENTS

| DE | 3606549 A1 | 9/1987 |
| DE | 102007030095 A1 | 1/2008 |

(Continued)

*Primary Examiner* — Hoang M Nguyen
(74) *Attorney, Agent, or Firm* — FRESH IP PLC

(57) ABSTRACT

A device has a rotor module comprising a motor generator, rotor blades, and a rotary-wing kinematic system for the rotor blades connected to the motor generator. The rotor blades are each divided into a plurality of longitudinal sections, each for receiving at least one actuator integrated in a longitudinal member or transverse member of the rotor blade, and have a variable, asymmetrical airfoil which, in one revolution of the rotor blade on a diameter of the circular path, the diameter being freely orientable within an adjustment range and having turning points, can be adjusted in at least one longitudinal section of the rotor blade with a length in such a way that the suction surface and the pressure surface of the asymmetrical airfoil change at the turning points from the outside to the inside of the circular path, or vice versa.

18 Claims, 37 Drawing Sheets

Figure 1:
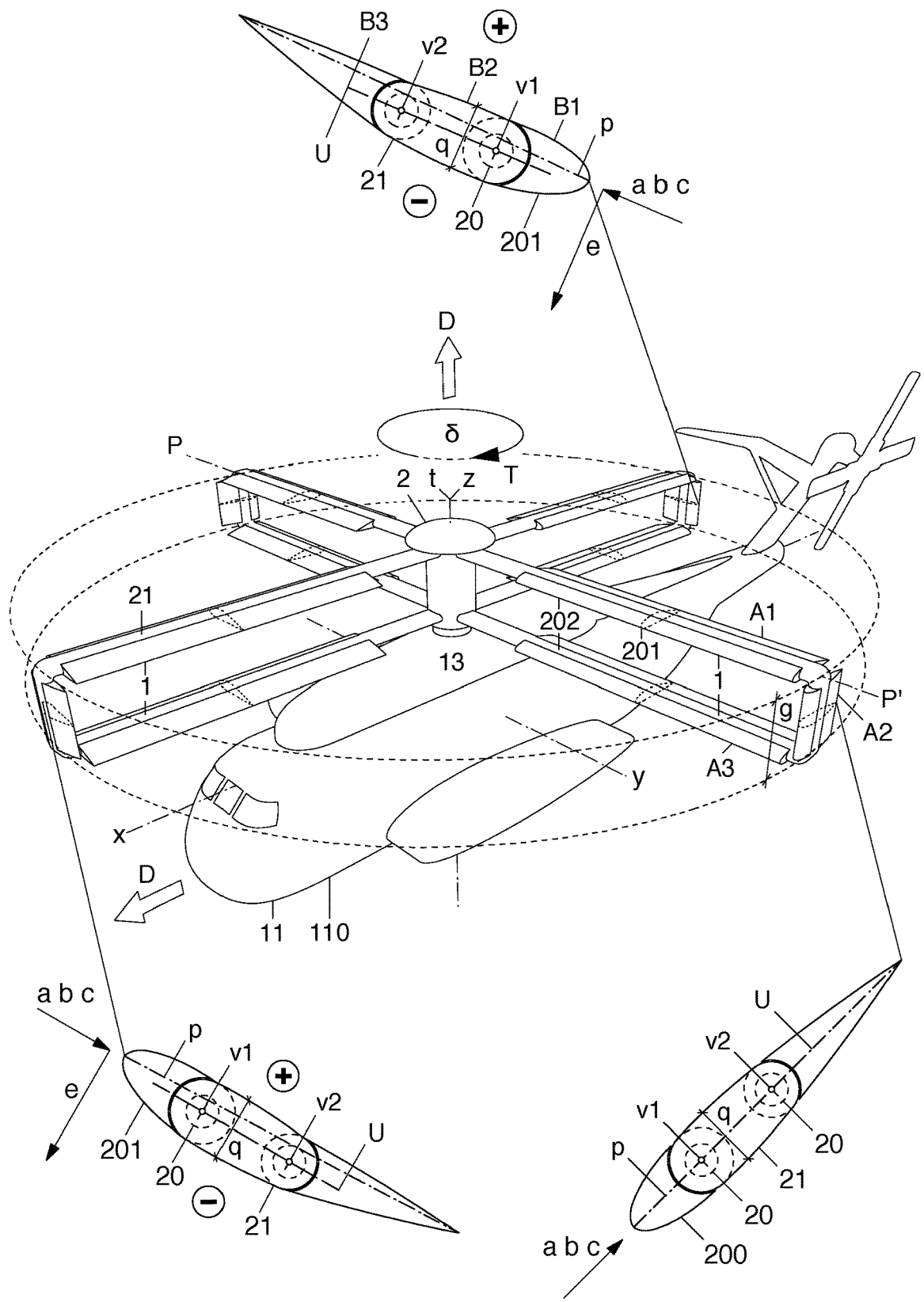

(51) Int. Cl.
  *B64C 27/04* (2006.01)
  *B64C 27/473* (2006.01)
  *B64C 27/72* (2006.01)
  *H02K 7/18* (2006.01)

(52) U.S. Cl.
  CPC ............ *H02K 7/1823* (2013.01); *B64C 27/04* (2013.01); *F05D 2220/76* (2013.01)

(58) Field of Classification Search
  CPC ..... B64C 37/00; B64C 39/005; B64C 39/006; B64C 2027/7222; B64C 2027/7266; H02K 7/1823; F05D 2220/76; F05B 2210/16; F05B 2240/121; F05B 2240/13; F05B 2240/305; F05B 2240/301; F05B 2240/913; F05B 2240/3052; F05B 2240/40; F05B 2240/931; B63H 1/10; B63H 2001/105; F03B 17/063; F03D 3/061; B64D 27/24
  See application file for complete search history.

(56) References Cited

U.S. PATENT DOCUMENTS

| | | | |
|---|---|---|---|
| 4,289,444 A * | 9/1981 | Monk | ............... F03D 7/06 415/164 |
| 4,383,801 A | 5/1983 | Pryor | |
| 5,263,846 A | 11/1993 | Smith | |
| 5,265,827 A | 11/1993 | Gerhardt | |
| 5,269,647 A | 12/1993 | Moser | |
| 7,843,097 B2 * | 11/2010 | Tsai | ............... H02K 53/00 310/90 |
| 9,346,535 B1 | 5/2016 | Adams | |
| 10,822,079 B2 * | 11/2020 | Schwaiger | ............... B64C 27/22 |
| 11,174,012 B2 * | 11/2021 | Brunetti | ............... H02K 16/02 |
| 11,772,790 B2 * | 10/2023 | Habibnia Rami | ...... B64C 39/08 244/7 A |
| 2005/0274843 A1 | 12/2005 | Schwaiger | |
| 2008/0011900 A1 | 1/2008 | Quintana | |
| 2011/0266391 A1 | 11/2011 | Kothera | |
| 2016/0329777 A1 | 11/2016 | Mariotto | |
| 2022/0227477 A1 * | 7/2022 | Grimm | ............... B64U 30/12 |

FOREIGN PATENT DOCUMENTS

| | | |
|---|---|---|
| DE | 102007009951 B3 | 7/2008 |
| DE | 102007020079 A1 | 10/2008 |
| DE | 102008057212 A1 | 5/2010 |
| DE | 102010011708 A1 | 9/2011 |
| DE | 102011016141 A1 | 9/2012 |
| DE | 102017002797 B3 | 6/2018 |
| DE | 102017011890 A1 | 6/2019 |
| DE | 102019131673 A1 | 5/2021 |
| WO | WO 2012/060806 A1 | 5/2012 |
| WO | WO 2014/048468 A1 | 4/2014 |
| WO | WO 2017/089047 A1 | 6/2017 |
| WO | WO 2017/112973 A1 | 7/2017 |
| WO | WO 2019/155656 A1 | 8/2019 |

* cited by examiner

ROTARY-WING VEHICLE, AND ROTARY-WING TURBINE

RELATED APPLICATION

This is a U.S. national stage under 35 U.S.C 371 of international application of PCT/EP2022/071884, filed on Aug. 3, 2022, claiming the priority benefit of German patent application 10 2021 004 136.4, filed on Aug. 9, 2021.

The invention relates to a device which is designed as a rotary-wing vehicle or a rotary-wing turbine.

PRIOR ART

Adjustable "kinematic" rotor blades for flow converters, watercraft and also for aircraft are well known. Known solutions for the blade adjustment of rotor blades with a symmetrical or asymmetrical airfoil use a linkage such that the rotor blades are subject to a determined kinematic in a rotation. Probably the most prominent example of a rotary-wing aircraft is a helicopter. Compared to a fixed-wing aircraft, the helicopter has the advantage that it does not require a landing and take-off runway and can take off and land vertically. The ability to hover, i.e. to remain stationary in the air, and the possibility of flying sideways or performing a slow turn around the vertical axis are further specific advantages of this rotary-wing vehicle. However, these advantages are offset by some disadvantages, which are briefly mentioned below. The helicopter is not inherently stable, its center of gravity is above the fuselage, so that the pilot must continuously adjust the flight attitude. By displacing the swashplate up or down, the setting angle of the rotor blades is changed globally, which increases or decreases the lift of the main rotor, causing the helicopter to climb or descend. This flight maneuver alone is associated with a change in engine or turbine power and requires counter steering by means of the tail rotor. When flying straight ahead, the swashplate and the rotor plane are tilted in the direction of flight. The maximum speed of a helicopter is limited by the aerodynamics of the rotor blades, as the blade moving forwards has a higher speed than the rotor blade moving backwards due to the incoming air. This creates an imbalance between the leading blade and the trailing blade. With the leading blade, the forward speed and the rotational speed overlap, so that with a rotor diameter of ten meters, for example, the speed of sound is very quickly exceeded at the blade tips. If this point is reached, there are not only aerodynamic disadvantages, but also an unpleasant noise development. Therefore, the top speed of a helicopter is approximately 200-300 km/h, wherein a combat helicopter can reach a speed of more than 400 km/h. The helicopter is exposed to very strong vibrations caused by the swashplate. In addition to the lower forward speed of this aircraft compared to a fixed-wing aircraft, it has a limited ceiling, which is typically 5,000 meters and can be up to 12,000 meters for a combat helicopter. The flight performance is accompanied by increased fuel consumption. As a special form of helicopter, the gyrocopter has established itself as a small aircraft. The ability to autorotate in the event of engine failure and the possibility of folding the rotor blades on the axis of rotation to save space opens up the possibility of an individual mobility offering that combines the advantages of a motor vehicle with those of a small aircraft. However, the system-related disadvantages of the rotary-wing kinematics of a helicopter remain. Current developments for rotary-wing vehicles are based on the principle of the Voith-Schneider propeller as an aircraft propulsion system. The Voith-Schneider propeller is not a pure lifting rotor, but with its special rotary-wing kinematics it pushes away from the respective fluid at certain orbital positions of the rotor, resulting in high loads on the gearbox and an upwardly limited rotational speed. Although the Voith-Schneider propeller has a good efficiency at low forward speeds, the propulsion power decreases rapidly as the forward speed of a watercraft increases, so that an upper limit is reached at approximately seven knots and therefore the application of this propeller is limited to slow-moving watercraft such as tugs and bowsers as well as commuting ferries and other watercraft specializing in short distances. Wind power systems with a vertical axis of rotation are known as Darrieus rotors and are named after their inventor. Compared to wind power systems with a horizontal axis of rotation, they have the great advantage that they do not have to be aligned with the respective direction of flow. The Darrieus rotor runs quietly, as it reaches its optimum performance at a speed corresponding to three to four times the wind speed. The rotor blades are arranged at a radial distance from the axis of rotation and have a symmetrical airfoil. Based on Betz's law, which establishes a theoretical upper limit of just under 60% for the utilization of the kinetic energy stored in a flow, known vertical axis rotors only achieve an efficiency of approximately 30% to a maximum of 45%, while the maximum efficiency of horizontal axis rotors with an asymmetrical airfoil is more than 50%. Coastal portions where certain relief formations result in high flow speeds caused by the ebb and flow of the tide can be considered for extensive use of hydropower. Tidal power plants and ocean current power plants will therefore play a decisive role in the generation of renewable energy in the future. The further expansion of hydropower in Germany suffers from the conflict of objectives between power generation at transverse structures in river courses and the associated consequence of interrupting the natural migration routes for fish and therefore cannot simply be continued with existing technologies.

In the field of control technology, current developments in actuators for electromagnetic valve control in combustion engines should be mentioned here. Rotational speeds of 7000 rpm are common in combustion engines, so that the high frequency and stability of an electromagnetic actuator required there seem particularly suitable for the controller of rotary-wing kinematics.

DE 10 2007 009 951 B3 describes an aircraft in which drivable cylinders that can be supplied with air by a fan are arranged transversely to a fuselage of an aircraft aligned in the direction of flight in order to generate lift using the magnetic effect, wherein rotor blades designed in one piece and rotating about the transverse axis of the cylinders with a symmetrical airfoil are designed to generate lift and propulsion.

DE 2017 002 797 B3 shows a flow converter with at least one rigidly designed reversible blade, in which one half of the rotor blade is oriented towards the inside and a second half of the rotor blade is oriented towards the exterior side of a circular path.

DE 10 2010 011 708 A1 describes a turbine with rotor blades that have a passive, bending-elastically mediated change in curvature.

DE 10 2017 011 890 A1 describes a rotary-wing arrangement for an aircraft in which rotary-wing kinematics are realized for one-piece designed rotor blade profiles with a linkage located outside the rotor blade.

U.S. Pat. No. 9,346,535 B1 describes a rotary-wing aircraft in which rigid wings are replaced by a starboard and port-side rotary-wing arrangement and a linkage with a gearbox causes rotary wings to rotate on the involute of a circular curve.

US 2008/0 011 900 A1 describes an airship with a rotary-wing arrangement in which the rotor blades are adjustably hinged to a linkage with a gearbox.

U.S. Pat. No. 4,383,801 A shows a wind turbine with a plurality of vertically arranged rotor blades that are rotatably mounted on a transverse carrier and assume a layer favorable for the flow in a rotor orbit. FIGS. 7-10 show rotor blades designed in two and three parts, the blade segments of which are adjustable by means of a linkage arranged outside the blades.

U.S. Pat. No. 5,265,827 A shows an aircraft with a rotary-wing arrangement to the left and right of the hull. In one revolution of the rotary blade rotor, the one-piece designed rotor blades are adjusted by means of push rods linked to a central gearbox.

WO 2017/089 047 A1 describes a wind power system with one-piece rotor blades, each of which can be rotated about the longitudinal axis of the blade by means of control elements arranged outside the rotor blades.

WO 2017 112 973 A1 describes a helicopter with a main rotor and secondary rotors arranged on the sides of the hull. The secondary rotors have rotary-wing kinematics for rotor blades that can be adjusted by means of a gearbox and linkage.

DE 10 2007 030 095 A1 shows a rotor blade for a rotary-wing vehicle, wherein a profile base body with a profile core forms an abutment for a movable profile trailing edge area, wherein actuators for a bendable carrier element cause a change in length at the profile trailing edge area.

U.S. Pat. No. 5,263,846 A shows a rotor blade for rotary-wing aircraft divided into longitudinal portions, wherein blade segments of a main rotor designed in one piece are connected to one another by means of couplings and can each be adjusted individually.

DE 10 2011 016 141 A1 shows a wind turbine with a nozzle body that can be designed as a confuser or diffuser.

DE 10 2008 057 212 A1 describes a wind turbine with a horizontal axis of rotation and rotor blades designed in the shape of a loop.

U.S. Pat. No. 5,269,647 A shows a wind turbine with a vertical axis of rotation in which the rotor blades are designed in a loop shape.

U.S. Pat. No. 4,134,708 A describes a wind power system with adjustable rotor blades whose surfaces are formed by a membrane.

WO 2019/155 656 A1 shows a loop-shaped rotor blade.

WO 2014/048 468 A1 describes a turbine with a nozzle body.

Task

Based on the prior art described above, the object of the invention is to provide a novel device with a kinematic rotor blade.

In the case of the rotary-wing vehicle, the object of the invention is particularly to find a working machine that uses the thrust generated fluid-dynamically from the lift of the variable asymmetrical airfoil of the rotor blades to drive the rotary-wing vehicle and can steer the thrust in different directions of travel by means of the rotary-wing kinematics.

In the case of the rotary-wing turbine, the object of the invention is particularly to find rotary-wing kinematics for a prime mover that can utilize a fluid-dynamically generated tangential drive force for the conversion of the kinetic energy contained in a flow into a rotary movement.

These objects are achieved by the subject matter of claim 1.

A device is designed as a rotary-wing vehicle or as a rotary-wing turbine, the device having a rotor module with a motor generator, with rotor blades and with rotary-wing kinematics for the rotor blades connected to the motor generator, the rotor module is designed to enable the rotor blades to rotate in the same or opposite direction on a circular path around an axis of rotation, the rotor blades are each subdivided into a plurality of longitudinal portions for the receptacle of in each case at least one actuator integrated in a longitudinal carrier or transverse carrier of the rotor blade and have a variable, asymmetrical airfoil which is adjustable in one circular path of the rotor blade at a diameter of the circular path which can be freely oriented within an adjustment area with turning points in at least one longitudinal portion of the rotor blade with a length in such a manner that the suction side and the pressure side of the asymmetrical airfoil changes from the exterior side to the interior side of the circular path by means of the rotary-wing kinematics at the turning points, or vice versa, and the variable, asymmetrical airfoil of the rotor blade temporarily has a symmetrical airfoil with its chord aligned tangentially to the circular path in a transitional position, wherein, in the case of the design as a rotary-wing vehicle, the device is designed in such a manner that the diameter with the turning points in the at least one longitudinal portion of the rotor blades can be aligned with the length transverse to the direction of travel, so that the suction side of the asymmetrical airfoil in both halves of the circular path is oriented in the direction of travel and a thrust force acting in the direction of travel results from the lifting force generated on the asymmetrical airfoil, and wherein, in the case of the design as a rotary-wing turbine, the device is designed in such a manner that the diameter with the turning points can be aligned orthogonally to the flow in all longitudinal portions of the rotor blade, so that the suction side of the asymmetrical airfoil can be oriented to the leeward side in both halves of the circular path and a tangential drive force for the rotary-wing turbine results from the lifting force generated by the asymmetrical airfoil.

The rotation of the rotor blades in the same or opposite direction preferably extends in corresponding directions of rotation.

In the context of the invention, the preamble rotary-wing vehicle relates to both aircraft and watercraft, while the preamble rotary-wing turbine relates to both water turbines and wind turbines, each of which is shown and explained by way of example. As exemplary embodiments for aircraft, a helicopter, an air cab, a vehicle suitable for air and road traffic, an aircraft with a wing and, as exemplary embodiments for watercraft, a tug and bowser, a hull for inland waterways, a container ship and a submarine are explained in more detail.

Further objects and advantageous properties of the invention are apparent from the subclaims. In detail, the following objects can be solved at least partially:

specification of rotary-wing kinematics for pure lifting rotors, specification of a kinematic rotor blade that is connected to a motor generator at least at one end, division of the rotor blade into a plurality of longitudinal portions, each of which has at least one actuator for each axis of rotation, specification of a mechanical, electromagnetic, electropneumatic, electrohydraulic adjustment device for each individual longitudinal portion of a rotor blade, specification of a straight, bow-shaped, curved or loop-shaped designed rotor blade, specification of a longitudinal carrier that is rigid with respect to its circular path for the receptacle of the actuators, specification of an actuator integrated in a longitudinal carrier of the rotor blade for the blade adjustment, specification of a ring- or disc-shaped transverse carrier for the receptacle of an electromagnetic actuator, specification of a rotor blade whose longitudinal portions each have a different angle of inclination relative to the axis of rotation, specification of a rotary-wing aircraft designed as a helicopter or as an air cab or as an airplane, specification of a helicopter with bow-shaped rotor blades whose longitudinal portions generate lift and thrust in a division of labor, specification of an aircraft with at least one wing that accommodates the housing for at least one rotor module, specification of a vehicle suitable for air and road traffic that can switch to flight mode from the road, specification of a rotary-wing vehicle whose dimensions meet the requirements of StVZO § 32, specification of a rotary-wing aircraft that meets the certification requirements of the Federal Aviation Authority, specification of a rotary-wing vehicle, with bow-shaped rotor blades, whose rotor modules rotate about axes of rotation arranged parallel to the transverse axis, specification of a rotary-wing aircraft with bow-shaped rotor blades, the longitudinal portion of which generates lift and thrust and the lateral longitudinal portions of which form a vertical stabilizer, specification of a flow guide for a watercraft formed by a flat ship bottom and horizontal and vertical flow control surfaces connected to the ship bottom, specification of a watercraft for river navigation with a shallow draft and with a bow- and stern-mounted bulkhead for the drive machines formed by the rotor modules, specification of a flow guide formed by a flow guide arranged within the circular path of the rotor module, specification of a drive machine with two rotor blades rotating in opposite directions, specification of a drive machine with a housing for the rotor module, which generates a circular counterflow rotating against the direction of rotation of the rotor module, specification of a drive machine with a housing for a rotor module that has a pressure-side input and a suction-side output for the flow, specification of a drive channel for a watercraft which accommodates a plurality of rotor modules with housings, specification of rotary-wing kinematics for thrust reversal of a rotor module, specification of rotary-wing kinematics for the rotor module of a wind power system that can be operated at wind forces of 3-12 according to the Beaufort scale, specification of a motor generator whose stator is connected to a support structure and whose rotor is connected to the rotor module.

The Kinematic Rotor Blade

In a first advantageous embodiment, the kinematic rotor blade is designed in two parts and has a front blade segment designed as a longitudinal carrier of the rotor blade. A rear blade segment is hinged to the front blade segment on a rear axis of rotation. In a second advantageous embodiment, the rotor blade of the rotor module is designed in three parts, wherein a front blade segment, which can rotate about a front axis of rotation, is articulated to the nose and a rear blade segment, which can rotate about a rear axis of rotation, is articulated to the rear edge of a central blade segment designed as a longitudinal carrier of the variable rotor blade. Two-part and three-part does not mean that further parts cannot be provided, for example to form a hinge. In both exemplary embodiments, the asymmetrical airfoil in one revolution of the rotor blade temporarily has a symmetrical airfoil with a chord aligned tangentially to the circular path of the rotor module at the diameter with the turning points, wherein the rotor blade, which is designed in two parts, has an asymmetrical airfoil by turning the rear blade segment in or out by up to 6 degrees in the windward and leeward directions of rotation, wherein the chord in both halves of the circular path divided by the diameter with the turning points has a positive setting angle of 3, 5 degrees relative to a tangent to the circular path and the three-part designed rotor blade has an asymmetrical airfoil in the upwind and leeward orbits which corresponds to a Clark YM-15 airfoil whose chord is inclined at a positive setting angle of 2 degrees relative to a tangent to the circular path. In the embodiments described above, the kinematic rotor blade of the rotor module is designed to be either straight or bow-shaped or curved or loop-shaped and subdivided into individual longitudinal portions that form a wing chain. In the case of the straight rotor blade, the wing chain is straight and in the case of a bow-, arc- or loop-shaped rotor blade, it is designed in the shape of a polygon and has differently inclined axes of rotation for the rotatable front and rear blade segments of the rotor blades.

The Actuators for the Rotary-Wing Kinematics of the Rotor Module

The actuators for the blade adjustment are preferably integrated either in the longitudinal carriers or in the transverse carriers of the rotor blades, in each case between the straight longitudinal portions of the wing chain formed by the individual longitudinal portions. In the case of a ring- or disc-shaped transverse carrier, the actuator is designed as an electromagnetically actuated setting lever, which is arranged at both ends of a longitudinal portion of the rotor blade perpendicular to the front and rear axes of rotation. In the case of a longitudinal carrier formed by the front or the central blade segment, the actuator for a longitudinal portion of the rotor blade preferably has either a pneumatic muscle or a hydraulic cylinder or a switchable electromagnet with an excitation winding. By means of computer-controlled rotary-wing kinematics, each longitudinal portion of the wing chain can be controlled individually. Hair joints between the blade segments and elastic discs between the individual straight designed longitudinal portions or an elastic envelope of the wing chain enable laminar flow around the rotor blade. In an advantageous design variant for the rotary-wing kinematics, the actuators, including the conduits, energy stores and servomotors, are fully integrated into internal hollow spaces of the longitudinal carrier of the two- or three-part designed rotor blades, wherein the hollow spaces are connected to one another by at least one hollow hinge pin arranged coaxially and concentrically to an axis of rotation of the rotor blade. The actuators of the three-part designed rotor blade are arranged in pairs and actuate cylindrical slides, which are guided linearly on their inner sides on the hinge pins arranged coaxially and concentrically to the axes of rotation and engage on their exterior sides in threaded portions of the front and rear blade segments. The actuators are driven electromagnetically, hydraulically, pneumatically or mechanically. The linear translational movement of the slide causes the movable blade segments to turn in and out relative to the inherently rigid longitudinal carrier, which is formed by the front blade segment in the case of the two-part designed rotor blade and by the middle blade segment in the case of the three-part designed rotor blade. The low pitch of the threaded portions preferably enables a ratio of 1 to 10 for the force of the actuators. The actuators can be designed as pneumatic muscles or synchronous linear motors, for example. A linear motor is preferably formed by the hinge pin in the relevant longitudinal portion of the rotor blade carrying a plurality of exciter windings arranged radially with respect to the axes of rotation, which together with annular permanent magnets of the slide form a synchronous three-phase linear motor. This allows both the front and rear blade segments to be adjusted precisely and the adjustment angle to be maintained without additional force. In a simplified embodiment, the actuator is designed as a switchable electromagnet, wherein the hinge pin has an excitation winding arranged coaxially and concentrically to the axes of rotation for the induction of an iron sleeve of the slide. The media channel formed by the hinge pin extends between both ends of the rotor blade. In the two-part designed rotor blade, the slides of the actuators are arranged in pockets of the front blade segment such that only the rear blade segment is rotated around the rear axis of rotation.

Rotary-Wing Kinematics for Drive and Power Machines

Rotary-wing aircraft and rotary-wing turbines each have a motor generator with stator and rotor and are preferably designed as induction machines or as permanently excited synchronous machines either with one shaft for one rotor blade or with two shafts and two gearboxes for two rotor blades arranged coaxially and concentrically to one another and rotating in opposite directions. The motor generator of a rotary-wing aircraft switches from motor mode to generator mode when the suction sides of the variable airfoil in both halves of the circular path of the rotor blades are aligned against the direction of travel and the rotary-wing aircraft is decelerated in descent or in free fall by autorotation of the rotor blades with a thrust force acting against the direction of descent or fall. The motor generator of a rotary-wing turbine accelerates the rotor module to a starting rotational speed in motor mode as a working machine and then switches to generator mode as a power machine when the tangential drive force is greater than the rotational resistance of the rotor module. The rotary-wing kinematics of the rotor module of a wind or water turbine are controlled by means of sensors and actuators by first detecting the direction of the flow and then adjusting the position of the turning points on the circular path perpendicular to the respective direction of the flow by means of the actuators. To limit the rotational speed of the rotor turbine, the suction side of the asymmetrical airfoil is to be oriented towards the exterior side of the circular path on the windward side and towards the interior side on the leeward side of the rotor module. In this position of the asymmetrical airfoils, referred to as the hurricane position in the context of the invention, the rotary blade wind turbine generates a reduced torque adapted to the extreme flow speed and does not have to be switched off. The rotor module is connected to a supporting structure which, in the case of a wind turbine, is formed by a mast anchored in the ground and, in the case of a water turbine with a horizontal or vertical axis of rotation, by a bridge or a mast. The individual longitudinal portions of the rotor blade can be controlled individually, wherein a pilot or remote control controls the electromechanical, electromagnetic, electropneumatic or electrohydraulic drive of the actuators. The suction side of the variable airfoil can be aligned in the respective direction of travel of the vehicle on the longitudinal portion of the rotor blades provided for thrust generation, which is aligned parallel or inclined to the axis of rotation. The rotary-wing aircraft has a longitudinal, a transverse and a vertical axis and can be designed as an aircraft or as a watercraft, wherein the aircraft has a helicopter, a vertical take-off air cab or a vehicle suitable for air and road traffic and the watercraft has a tug and bowser or a cargo or passenger ship. In the aforementioned rotary-wing aircraft described by means of exemplary embodiments, the rotor modules rotate as working machines or as drive machines about axes of rotation arranged coaxially and concentrically or parallel to the longitudinal, transverse or vertical axis. In normal operation of rotary-wing aircraft, the suction sides of the asymmetrical airfoils are oriented in the direction of travel, wherein the direction of travel is changed by orienting the diameter with the turning points perpendicular to the new direction of travel. Actuators designed as electromechanical, electromagnetic, electropneumatic or electrohydraulic control elements are used to adjust the rotor blades. If the drive machines fail, the rotor blades of the rotor modules convert the kinetic energy of the rotary-wing aircraft into electrical energy until the vehicle comes to a standstill, wherein the motor generator switches to generator mode.

Aircraft

In a first advantageous exemplary embodiment, the rotary-wing aircraft is designed as a helicopter with an axis of rotation arranged concentrically and coaxially to the vertical axis for a rotor module, the rotor blades of which are designed in the shape of a bow and are divided in height into an upper, a means of and a lower longitudinal portion and form a polygon-train-shaped wing chain. In the upper and lower longitudinal portions, the diameter is aligned with the turning points largely parallel to the direction of flight. When the helicopter is ascending, the lifting forces in the left and right halves of the rotor module are equal, so that the rotary-wing kinematics can remain in standby mode. In the central longitudinal portion of the rotor blades, the adjustment area for the turning points is 360 degrees, so that the suction sides of the asymmetrical airfoils can be aligned in any direction of travel by means of the rotary-wing kinematics and the rotor blades generate a thrust force directed in the respective direction of flight in both halves of the circular path. In straight flight, the different speeds of the helicopter's rotor blades moving forwards and backwards in the direction of travel are compensated for by adjusting the respective setting angle in the upper and lower longitudinal portions of the rotor blades responsible for lift, so that the left and right halves of the rotor module each provide the same amount of lift. As an alternative to the bow-shaped rotor blade, a loop-shaped rotor blade can be designed in which the upper and lower longitudinal portions do not lie on top of one another in a vertical plane, but are arranged offset from one another in such a manner that the central longitudinal portion has an inclination relative to the axis of rotation.

In a second advantageous exemplary embodiment for a vertical take-off rotary-wing aircraft designed as an air cab for six persons, two rotor modules rotate in opposite directions around the axis of rotation formed by the vertical axis around an ellipsoidal or disc-shaped rotational body which forms the cabin of the aircraft. Two or three bracket-shaped rotor blades of a rotor module are each connected at the upper and lower apex of the rotating body to motor generators, which are designed as drive machines for the rotor blades rotating in opposite directions. The longitudinal carriers of the bow-shaped rotor blades are subdivided lengthwise into three longitudinal portions, wherein the rotary-wing kinematics for the variable asymmetrical airfoil generate lift in the upper and lower longitudinal portions and a thrust force that can be aligned in the direction of flight in the longitudinal means of the rotor blades. The rotary-wing kinematics can be programmed in such a manner that the rotor blades generate compensating thrust forces in the longitudinal portions to counteract crosswinds, turbulence and other external forces in such a manner that the rotorcraft can precisely maintain its respective position in hovering flight. When stationary, the vehicle is very agile in flight and can, for example, change direction very quickly within a 360 degree radius in any direction using a joystick control. In the air cab, large lifting forces and high thrust forces are generated by means of the wing chain of the rotor blades in a division of labor, so that a drive power of only 300-400 kW is required for such an air cab for six persons, which is distributed over two motor generators. This arrangement of hull and rotors can also be used with advantage for larger aircraft.

In a third advantageous exemplary embodiment, the rotary-wing aircraft is designed as a vehicle suitable for air and road traffic, in which two rotor blades rotating in opposite directions rotate about a front axis of rotation and a rear axis of rotation, each arranged parallel to the transverse axis of the vehicle. The rotor blades of the at least two rotor modules are designed in the shape of a bow and form a polygon-train-shaped wing chain, which is folded into the front and rear of the vehicle during driving operation of the vehicle suitable for air and road traffic, so that the vehicle can be designed as a passenger car with four wheels. Four telescopic stabilizers of the vehicle are extended during the take-off phase of flight operations to such an extent that the unfolded rotor modules can rotate freely and the vehicle takes off preferably at a rotational speed of 800 rpm and the telescopic stabilizers are retracted. In flight, the rotary-wing kinematics control the rotor modules of the vehicle in such a manner that the adjustment area for generating the lifting force and the thrust force acting in the direction of travel is used for straight flight in the longitudinal portion of the bracket-shaped rotor blades. The lateral longitudinal portions of the bow-shaped rotor blades stabilize the rotary-wing aircraft around the longitudinal, transverse and vertical axes and serve as a vertical stabilizer.

In a particularly advantageous exemplary embodiment, the rotary-wing aircraft is designed as an aircraft with at least one wing which accommodates a housing for a rotor module. A plurality of rotor modules are integrated into the at least one wing of the aircraft, wherein the wing forms a flow guide with a pressure side oriented in the direction of travel as the inlet for the flow and a suction side oriented towards the wing trailing edge of the wing as the outlet for the flow. Within the wing, the axes of rotation of the rotor modules are aligned transversely to the direction of travel, wherein a rotor module has at least four rotor blades, each of which rotates in pairs in opposite directions and enables the aircraft to take off vertically and fly straight ahead by aligning the diameter with the turning points in the longitudinal portion with the defined length within a radius of 360 degrees perpendicular to the desired direction of travel.

Watercraft

In the case of watercraft, a flow guide is provided for the flow to the drive machines formed by the rotor modules, which is designed as an integral part of the hull or as an integral part of the rotor module. The flow guide of the hull can be designed as a flat ship bottom with flow guide surfaces or as a bow- and stern-side bulkhead or as a drive channel extending from the bow to the stern of the watercraft. A flow guide of the rotor module that has an internal flow guide or external housing is particularly advantageous.

In a first advantageous embodiment for the drive machine of a preferably slow-moving and highly maneuverable watercraft, the flow guide for the rotor module has a flat designed ship bottom with horizontally and vertically arranged flow guide surfaces. The rotor modules preferably have axes of rotation aligned perpendicular to the flat ship bottom and each rotate in the opposite direction, wherein they are arranged either in a row coaxial to the longitudinal axis of the ship or in pairs parallel to the longitudinal axis of the ship. The individual rotor blades of the rotor modules are exposed to a free flow. The diameter with the turning points can be at any angle within a radius of 360 degrees in relation to the longitudinal axis of the watercraft, so that the thrust force can be directed in any direction in a matter of seconds and the watercraft can move forwards, backwards and sideways. As the rotor blades with the variable asymmetrical airfoils are designed to generate lift fluid-dynamically, the thrust force derived from this is transmitted directly to the hull of the watercraft, so that no propeller jet is generated, high rotor module rotational speeds are possible and vibrations to the hull are avoided. The hydrodynamic load on the rotor blade itself is also low, preventing cavitation and other damage caused by overstressing.

In a second particularly advantageous embodiment of the drive machine for a preferably fast-moving watercraft with a very shallow draft, the rotor module has an internal flow guide which is designed as a profile portion of a Reuleaux triangle that can rotate about the axis of rotation of the rotor module and is rotatably connected to the ship bottom within the circular path of the rotor module. The hull of the watercraft, which is designed for inland waters, has a corresponding starboard and port-side bulkhead cut-out at the bow and stern for the arrangement of the rotor modules.

In a third particularly advantageous embodiment of the drive machine for a preferably fast-moving seagoing watercraft, the flow guide has a housing for the rotor module, which is formed by a wing stub aligned with its pressure side in the direction of travel and has an inlet and an outlet for the flow. The inlet for the flow is located on the pressure side of the wing stub and has a plurality of comb-shaped flow guides designed to provide a circular flow to the rotor blades inside the housing against the direction of rotation of the rotor module. The outlet for the flow is located at the lower end of the wing stub in the dead water area, so that the suction present there promotes the flow through the housing.

In a fourth particularly advantageous embodiment of the drive machine for a preferably fast-moving seagoing watercraft, the flow guide has a drive channel extending from the bow to the stern coaxially to the longitudinal axis, which is bounded on its upper side by a flat ship bottom and laterally by deeper-reaching lifting bodies arranged on the starboard and port sides. Hydrogen tanks for fuel cells are preferably arranged in the lifting body along the totality of the ship in order to supply a plurality of rotor modules arranged in housings with current. The housings have a wing stub and are arranged in the drive channel in the direction of travel in series one behind the other parallel to the longitudinal axis of the watercraft in such a manner that the wing stub has a pressure side aligned in the direction of travel with an upper inlet for the flow and a suction side with a lower outlet for the flow. When the drive machines are in operation, the air flows vertically through a ring channel surrounding the motor generator and arranged parallel to the vertical axis of rotation of the rotor module, so that the variable asymmetrical airfoils of the rotor blades are flowed against independently of the forward speed of the watercraft. The vertical flow through the housing prevents the build-up of an undesirable circulation flow in the direction of rotation of the rotor modules within the ring channel. The supporting structure of the watercraft has a watertight hull and a load-bearing skeleton consisting of longitudinal and transverse truss discs, which are connected to one another to form a spatial truss girder and at nodal points within the drive channel to the upper ends of the housing for the rotor modules, so that the loads on the hull are transmitted from the hull to the spatial truss girder at the nodal points of the supporting structure. The thrust generated by the rotor modules can be transmitted particularly effectively to the hull of the watercraft using the proposed skeleton design.

In a particularly advantageous exemplary embodiment, the rotary-wing aircraft is designed as a submarine, the hull of which is connected at the stern to a housing for at least two rotor modules arranged parallel to the transverse axis of the submarine on the starboard and port sides. The housing is designed as a flow guide with a pressure side oriented in the direction of travel as the inlet for the flow and a suction side oriented towards the dead water of the submarine as the outlet for the flow, wherein a rotor module has at least four rotor blades, each rotating in pairs in opposite directions, which form the drive and controller for the above—and underwater travel of the submarine and control the diving or climbing of the submarine in such a manner that the diameter with the turning points can be aligned perpendicular to the desired direction of travel within a radius of 360 degrees.

Figure 2:
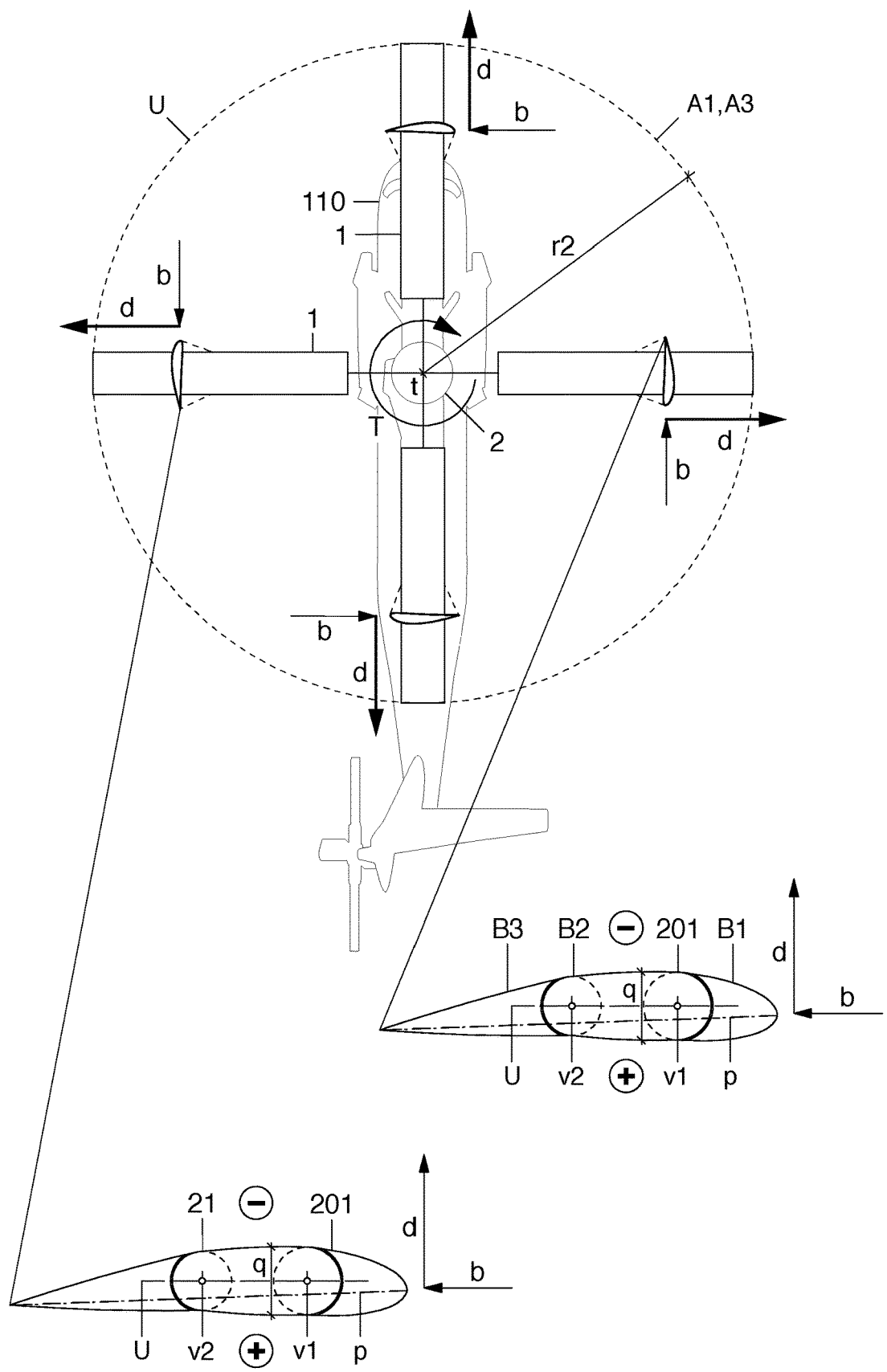
Figure 3:
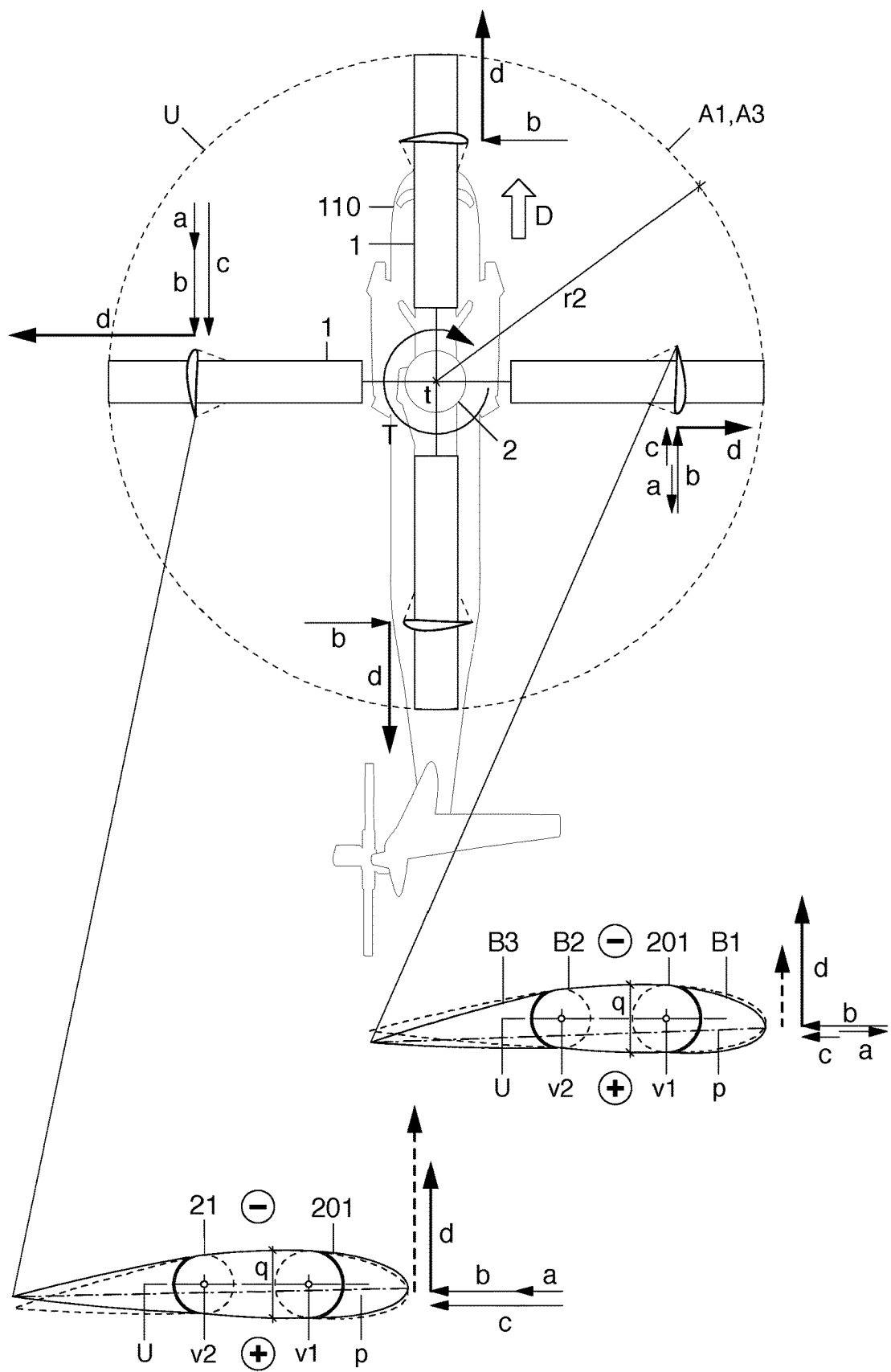
Figure 4:
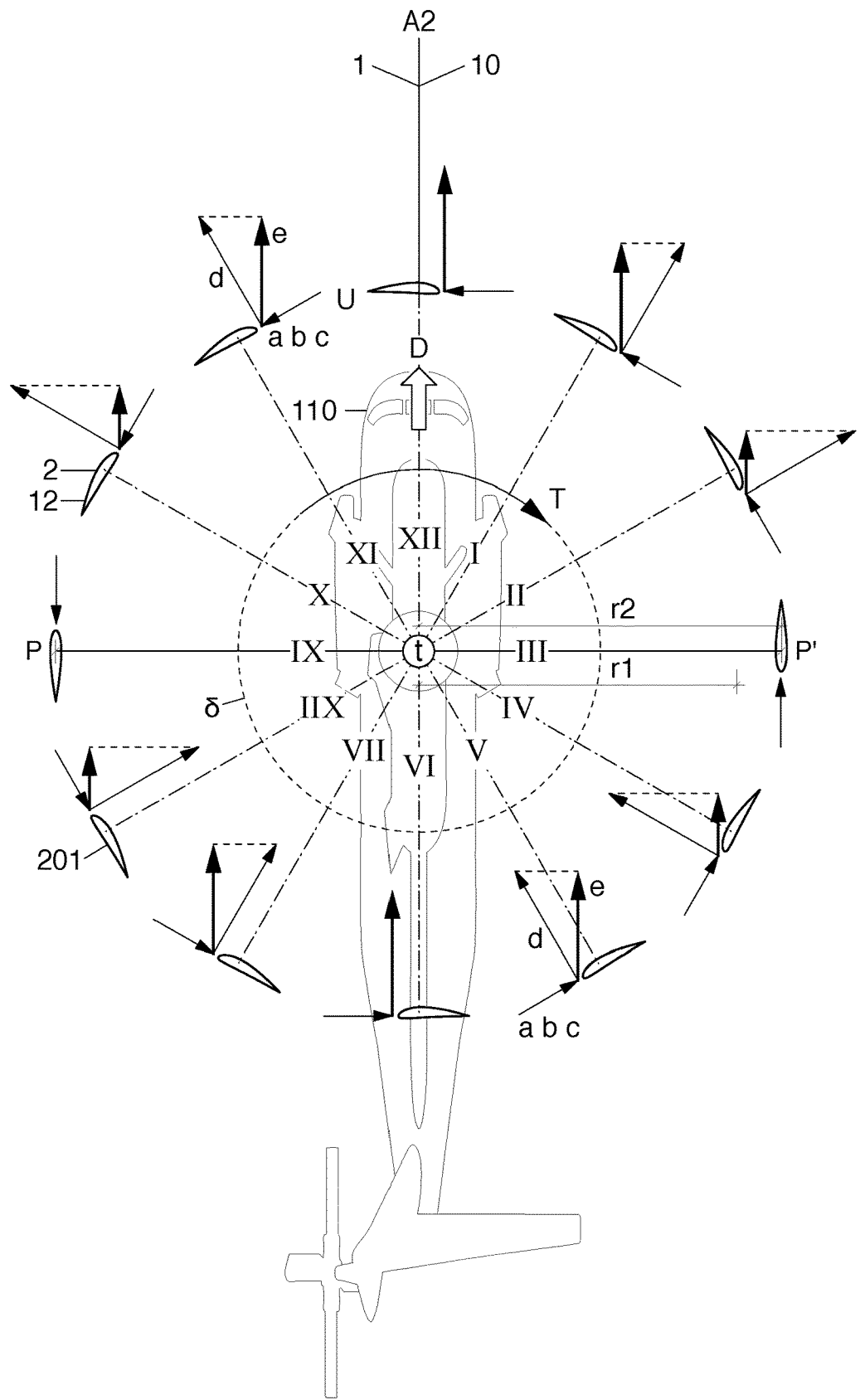
Figure 5:
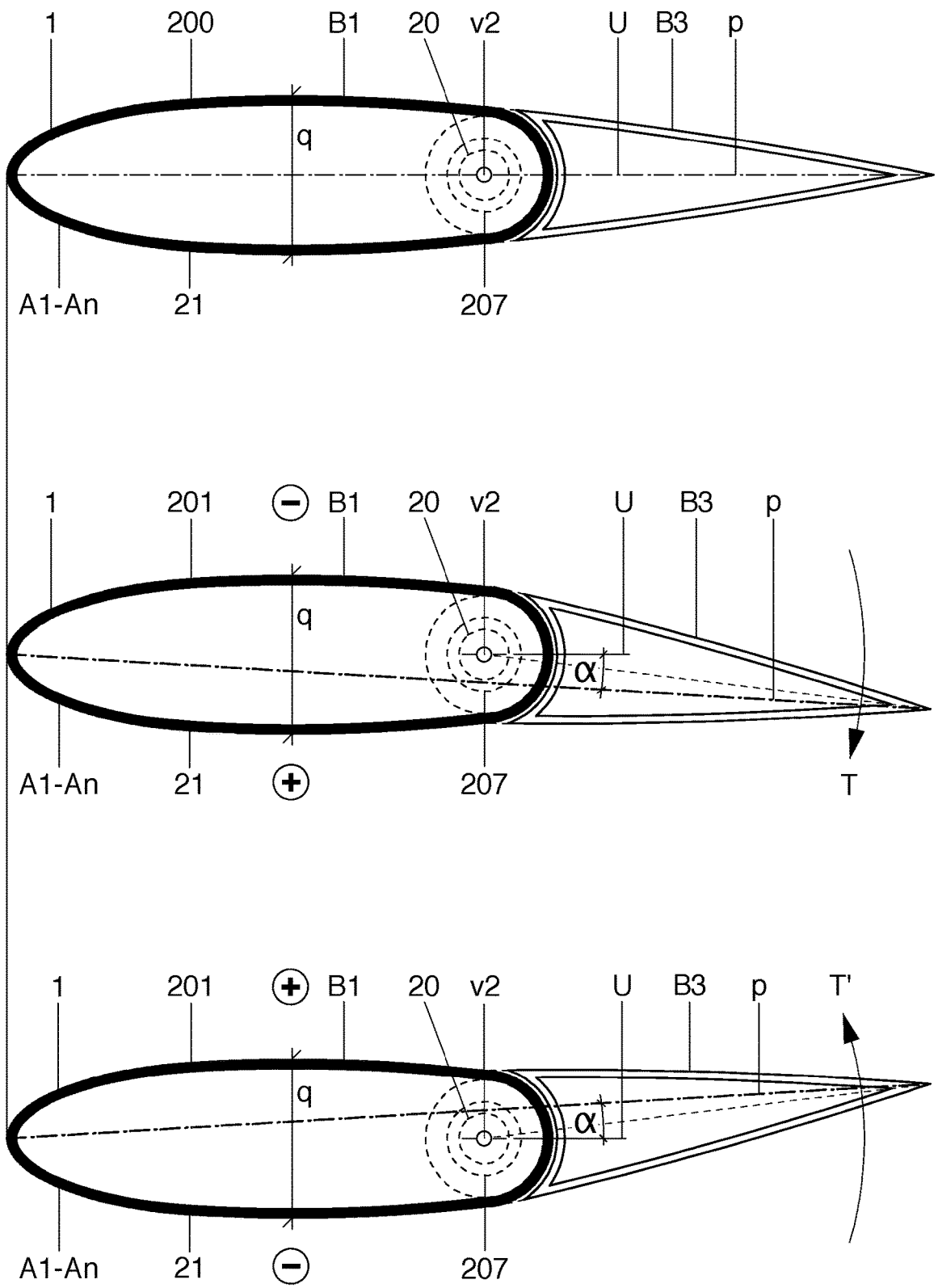
Figure 6:
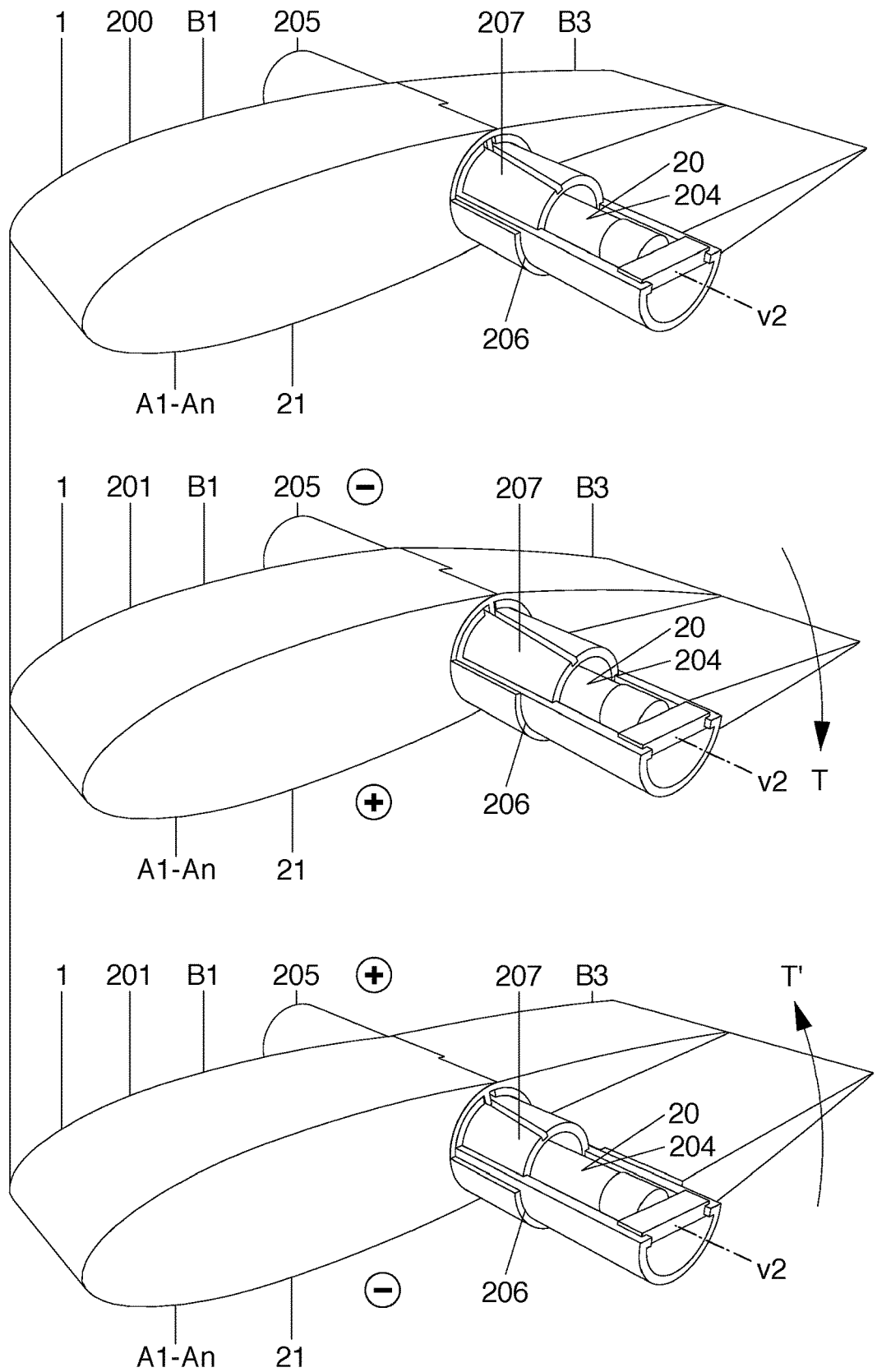
Figure 7:
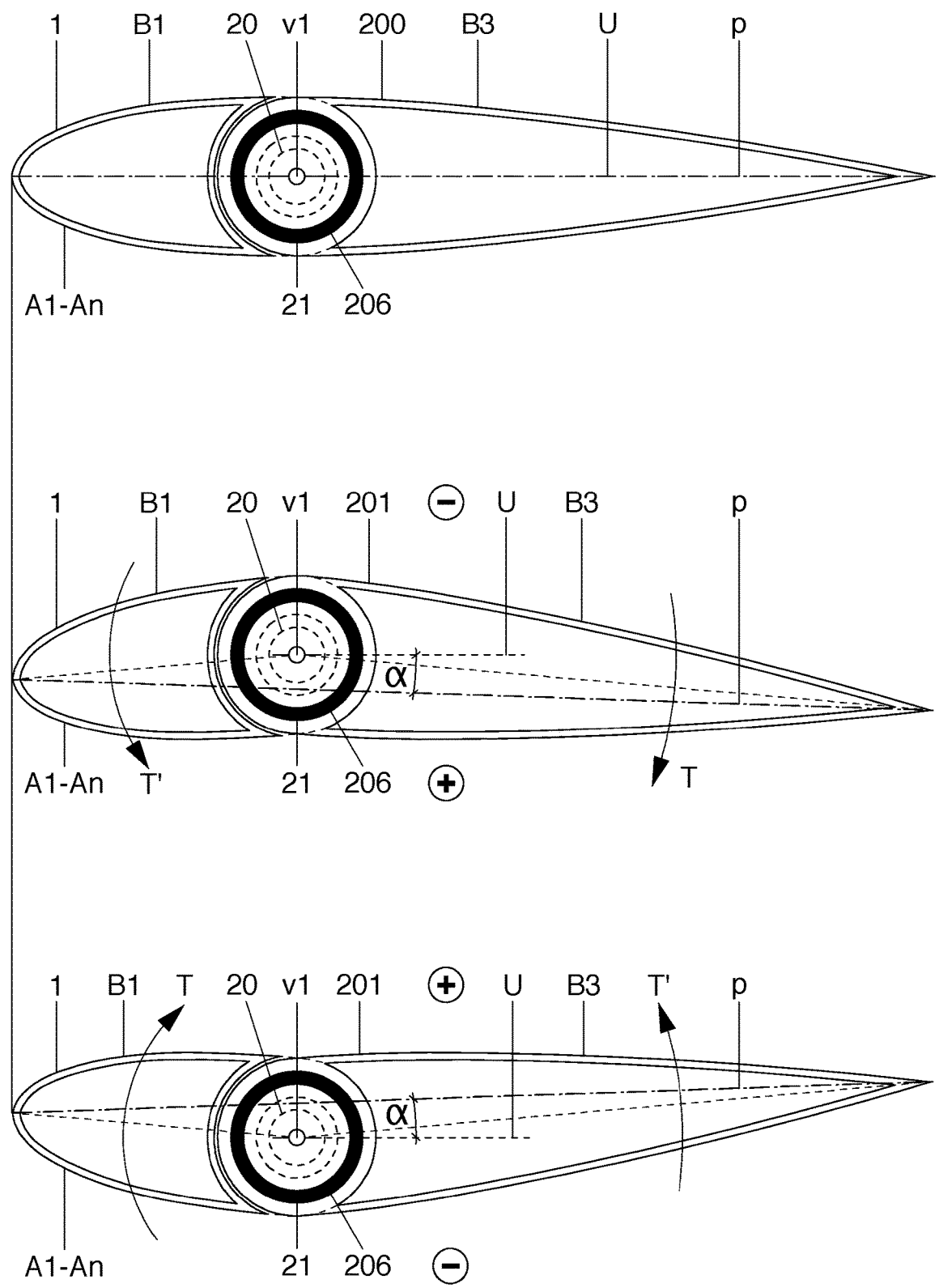
Figure 8:
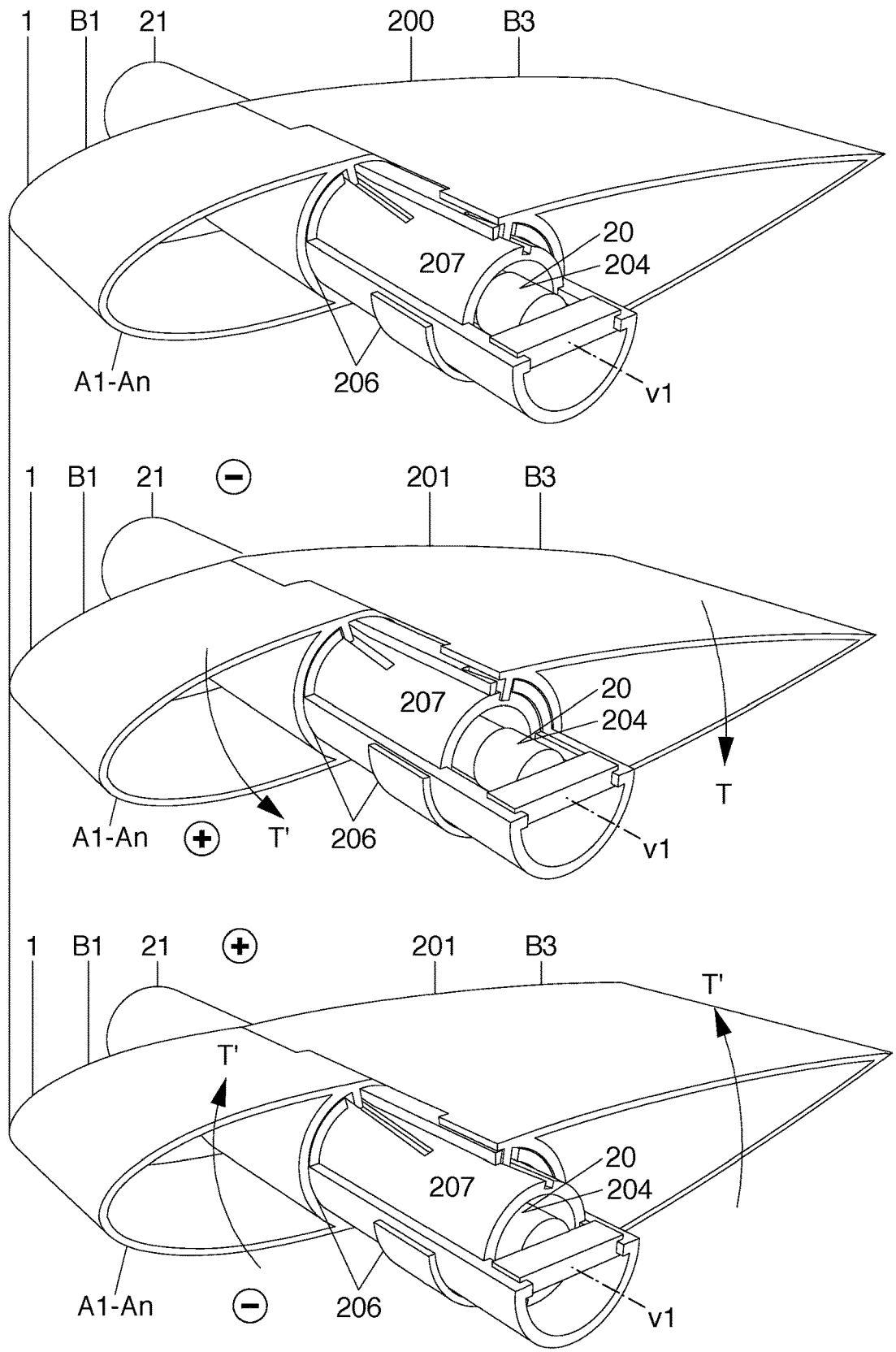
Figure 9:
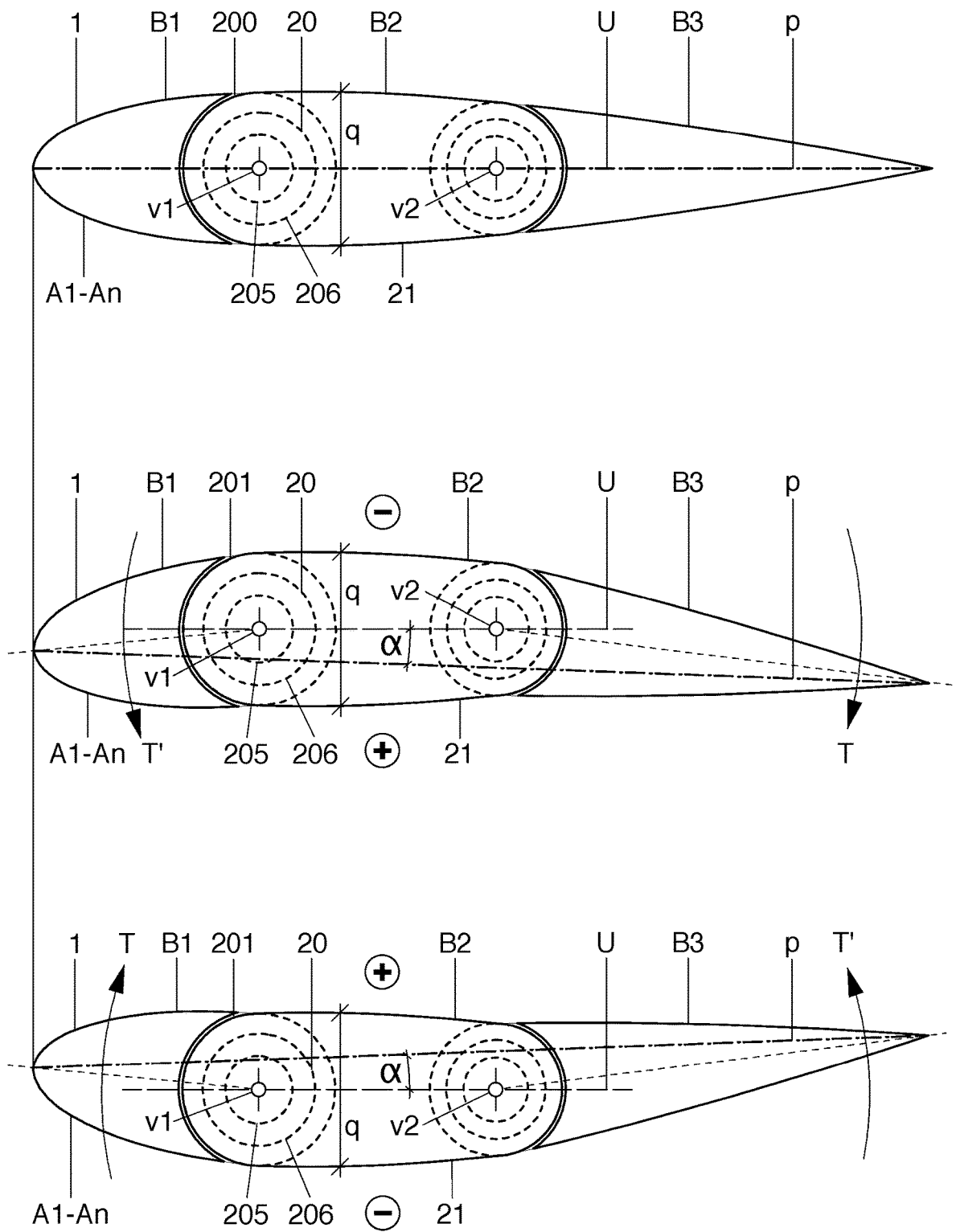
Figure 10:
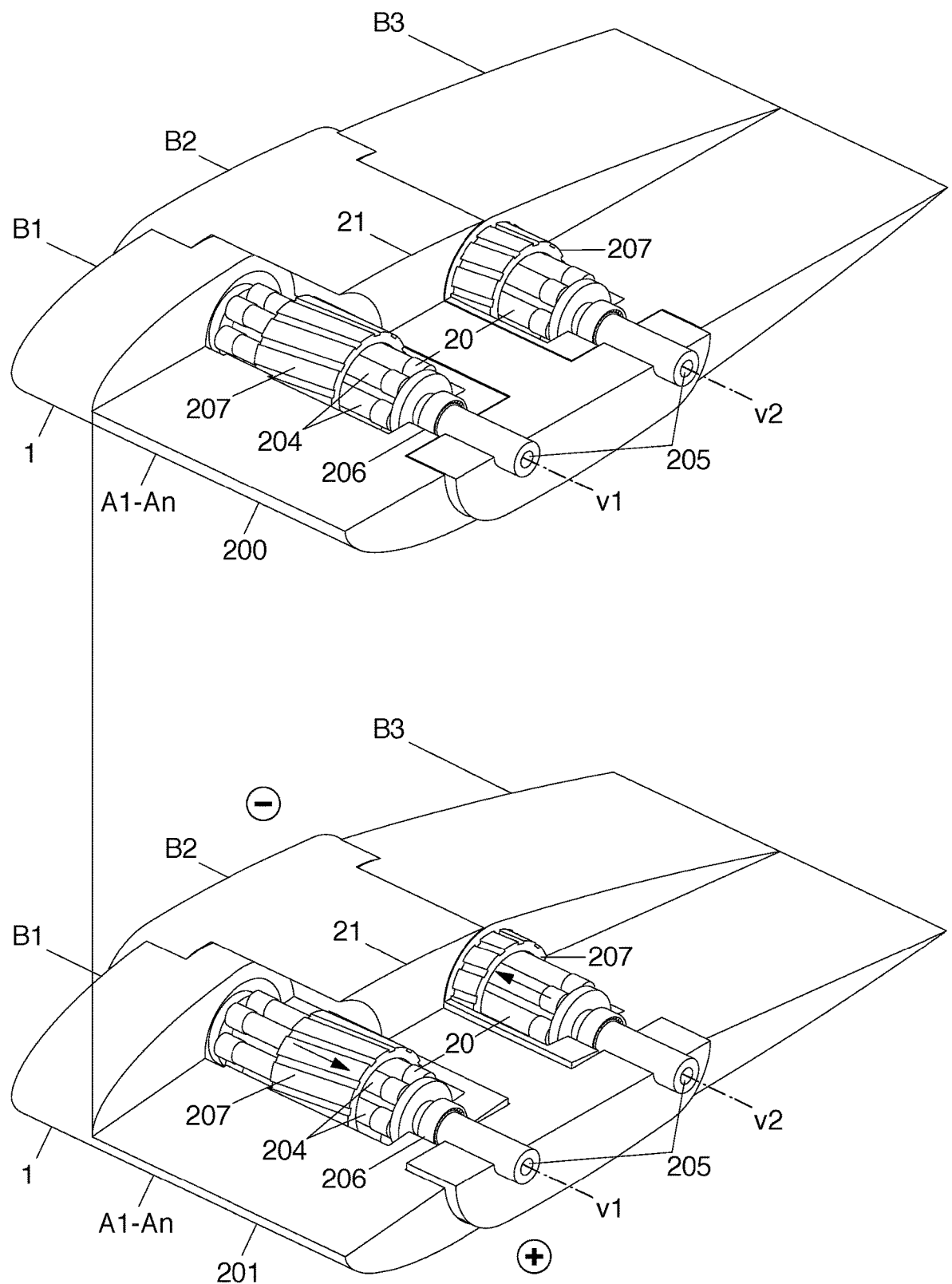
Figure 11:
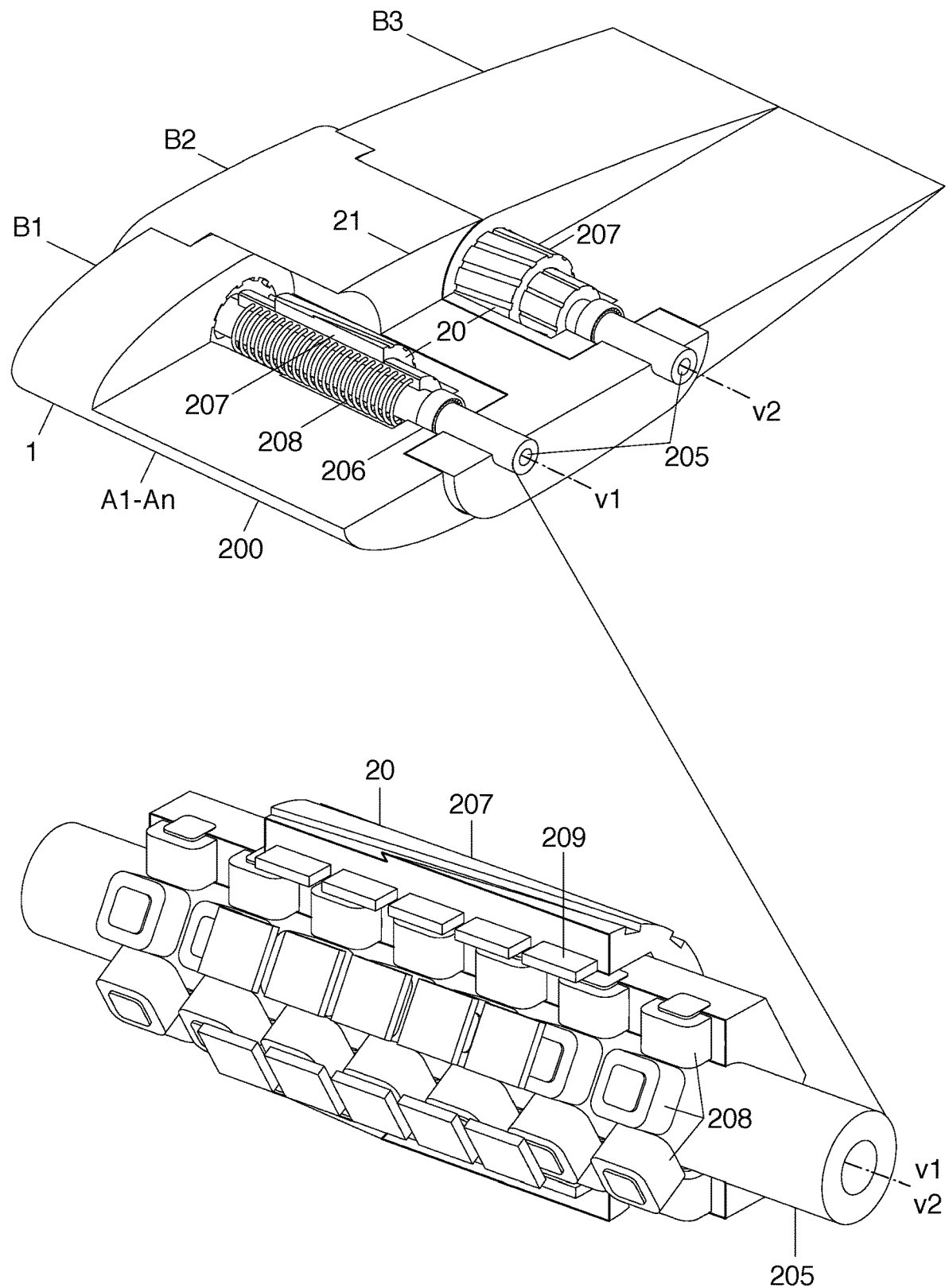
Figure 12:
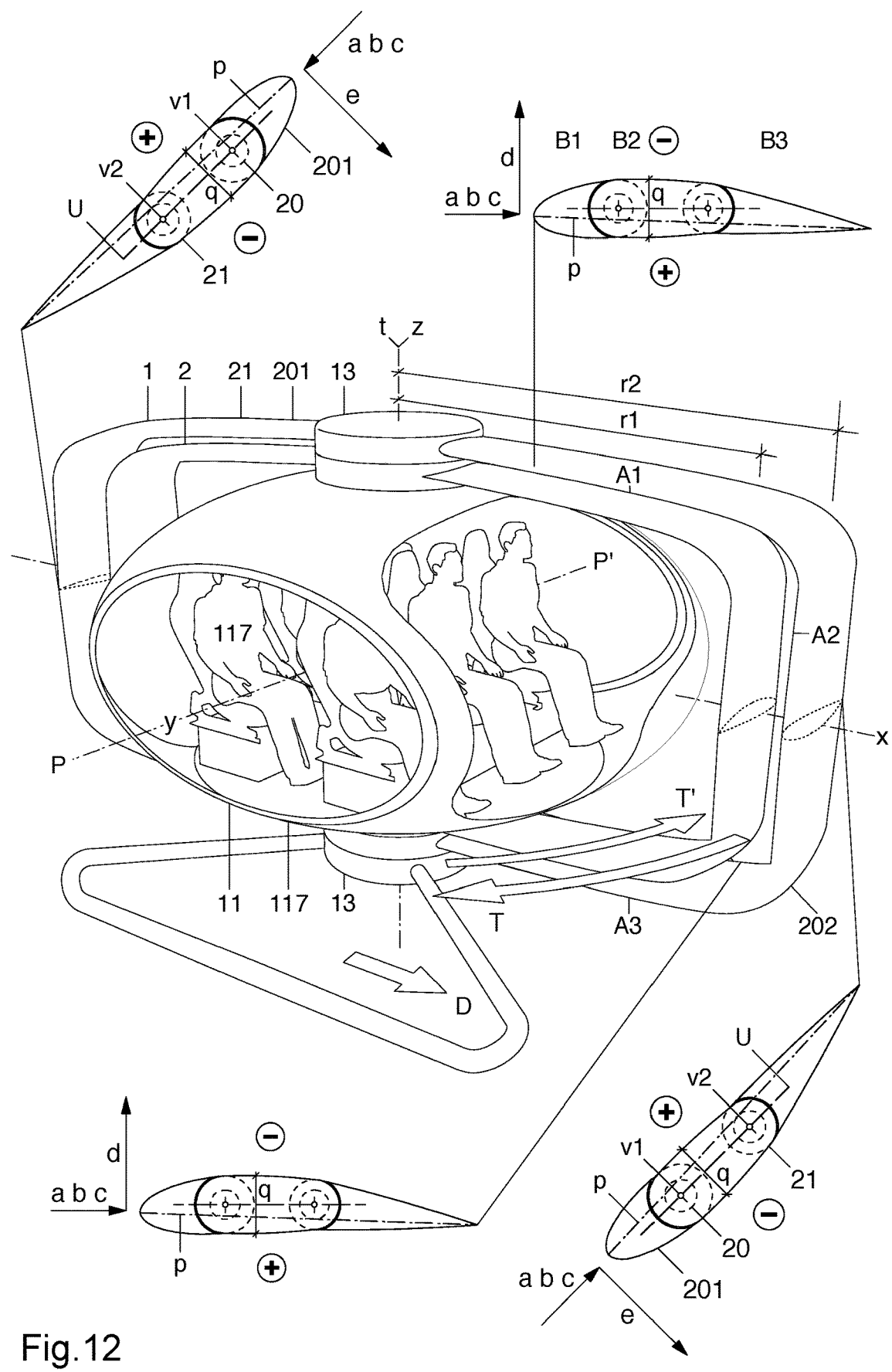
Figure 13:
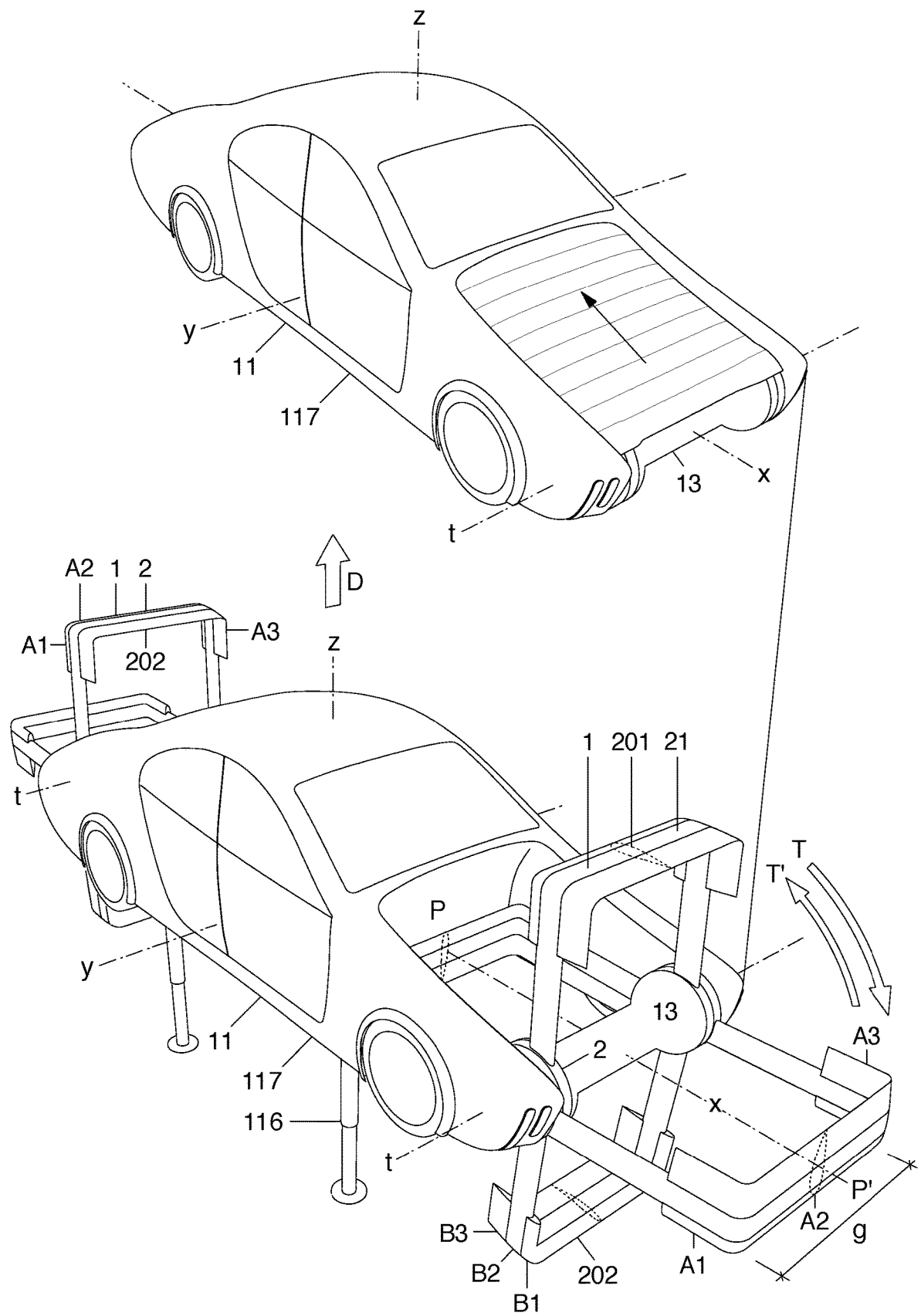
Figure 14:
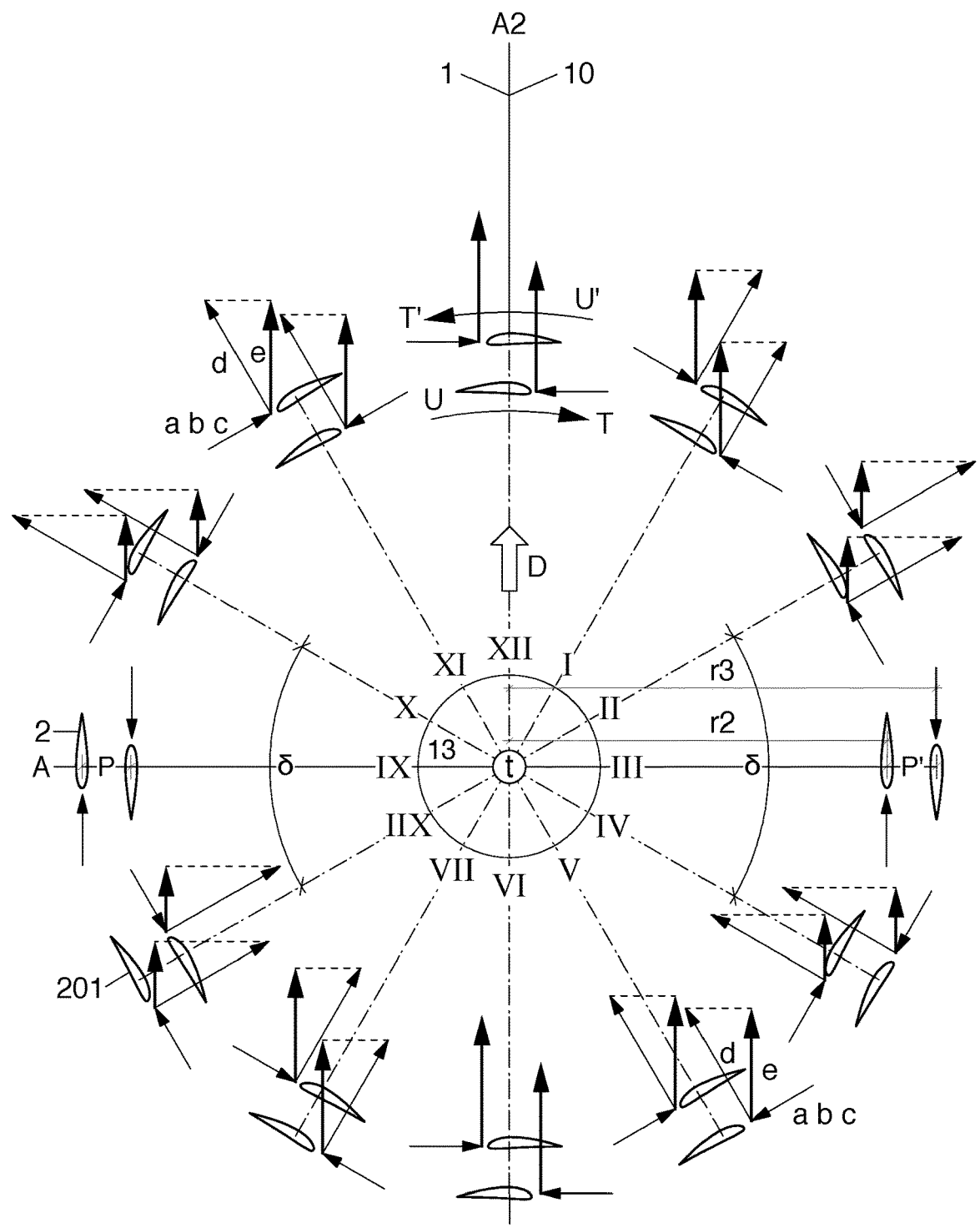
Figure 15:
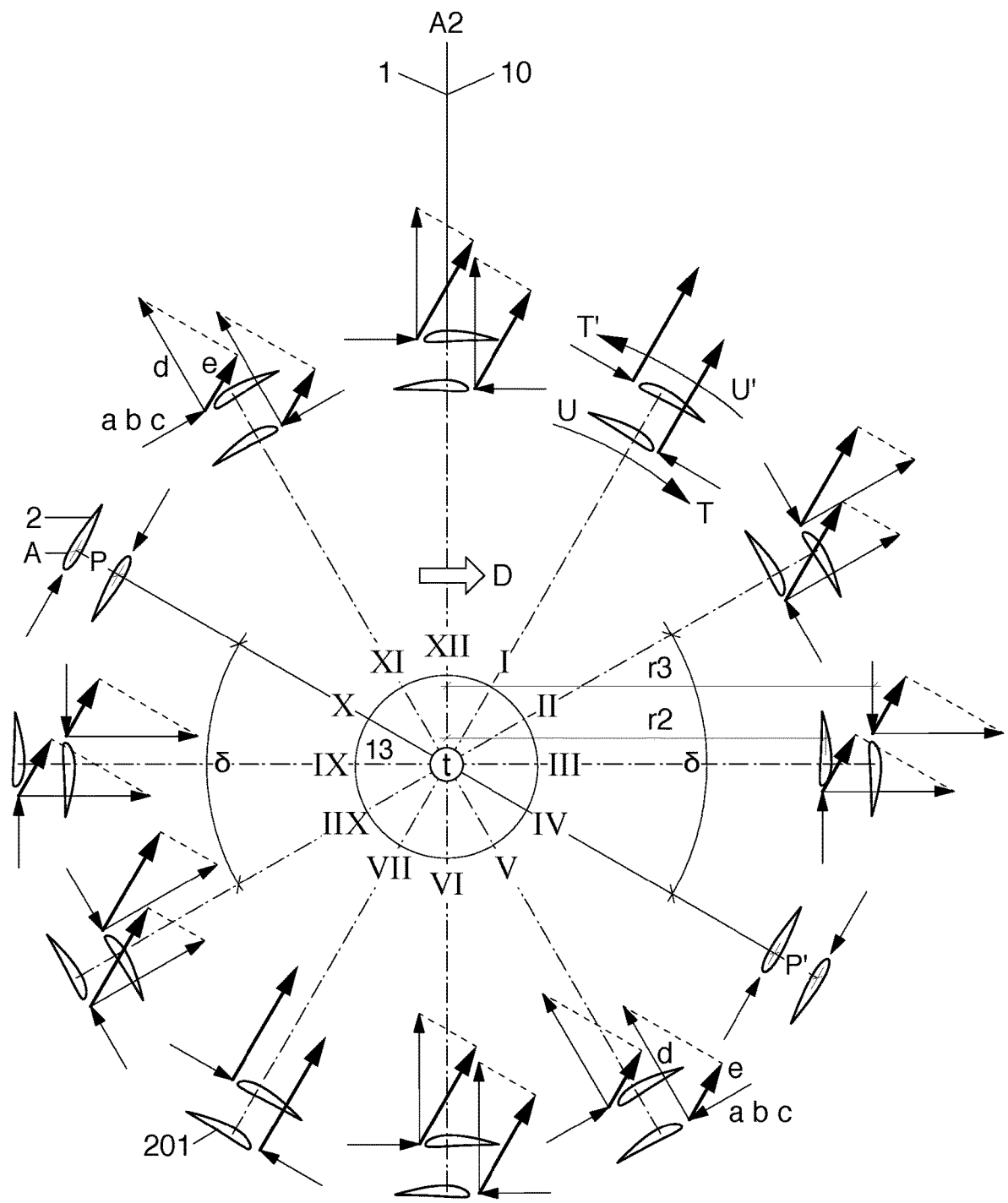
Figure 16:
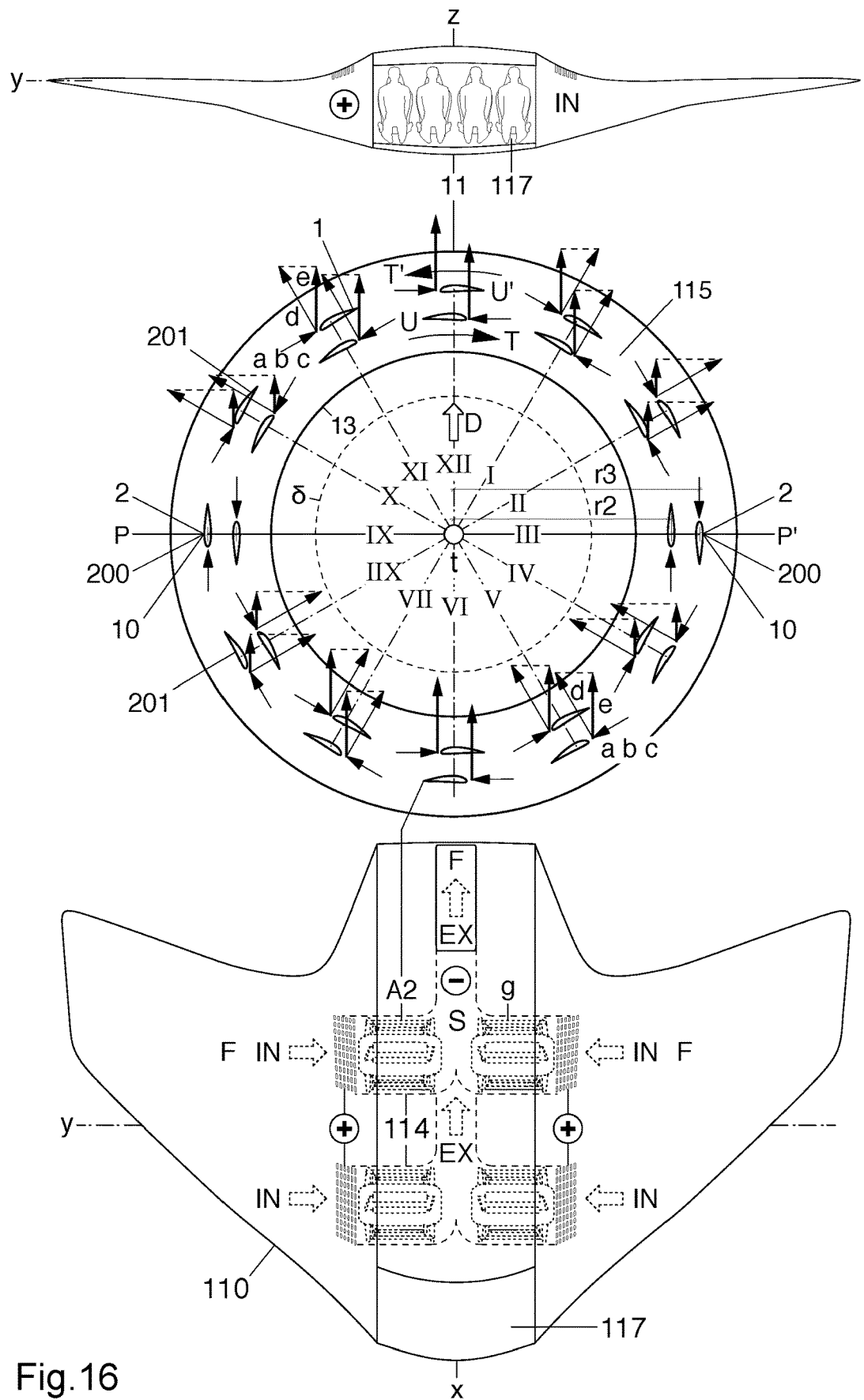
Figure 17:
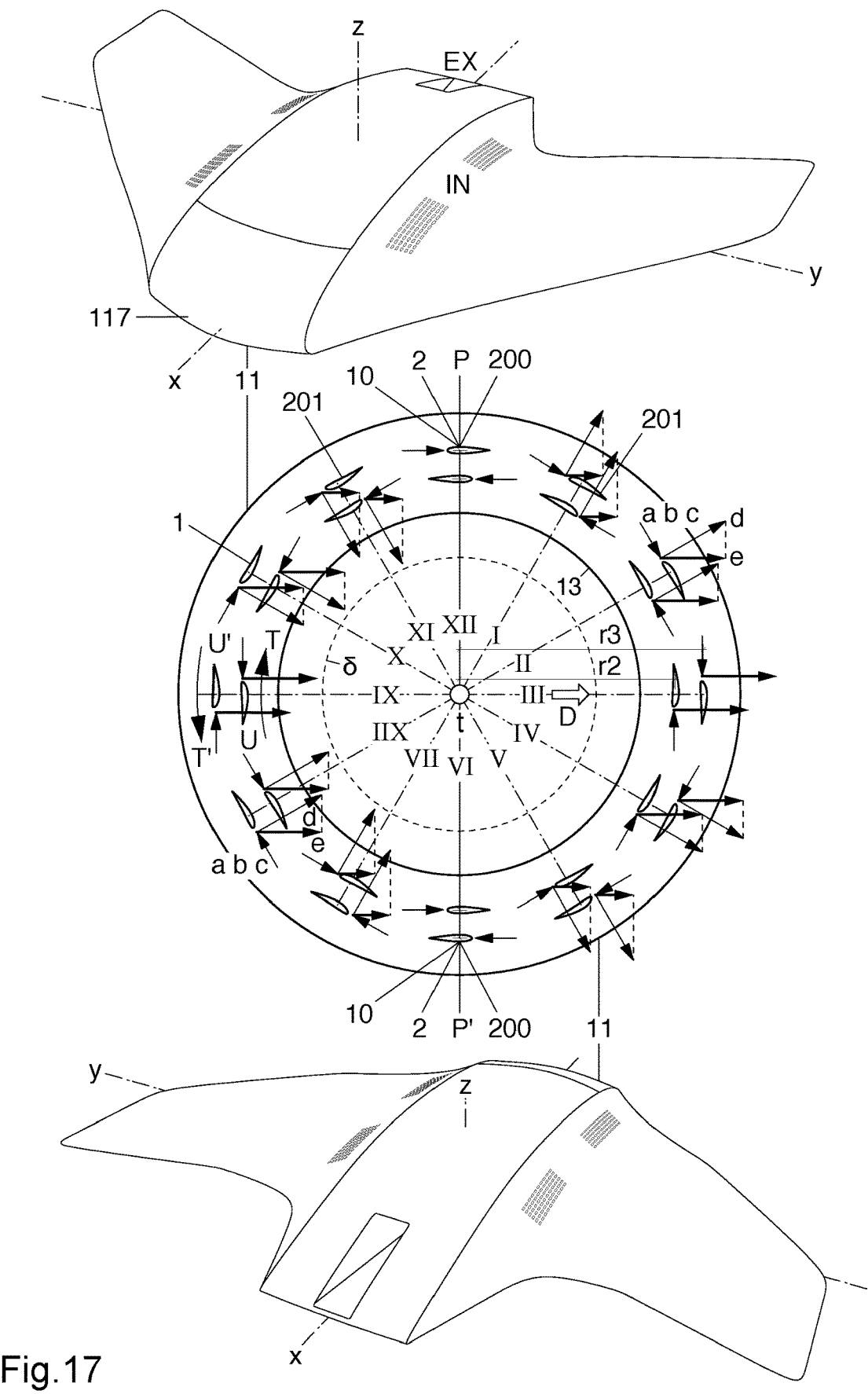
Figure 18:
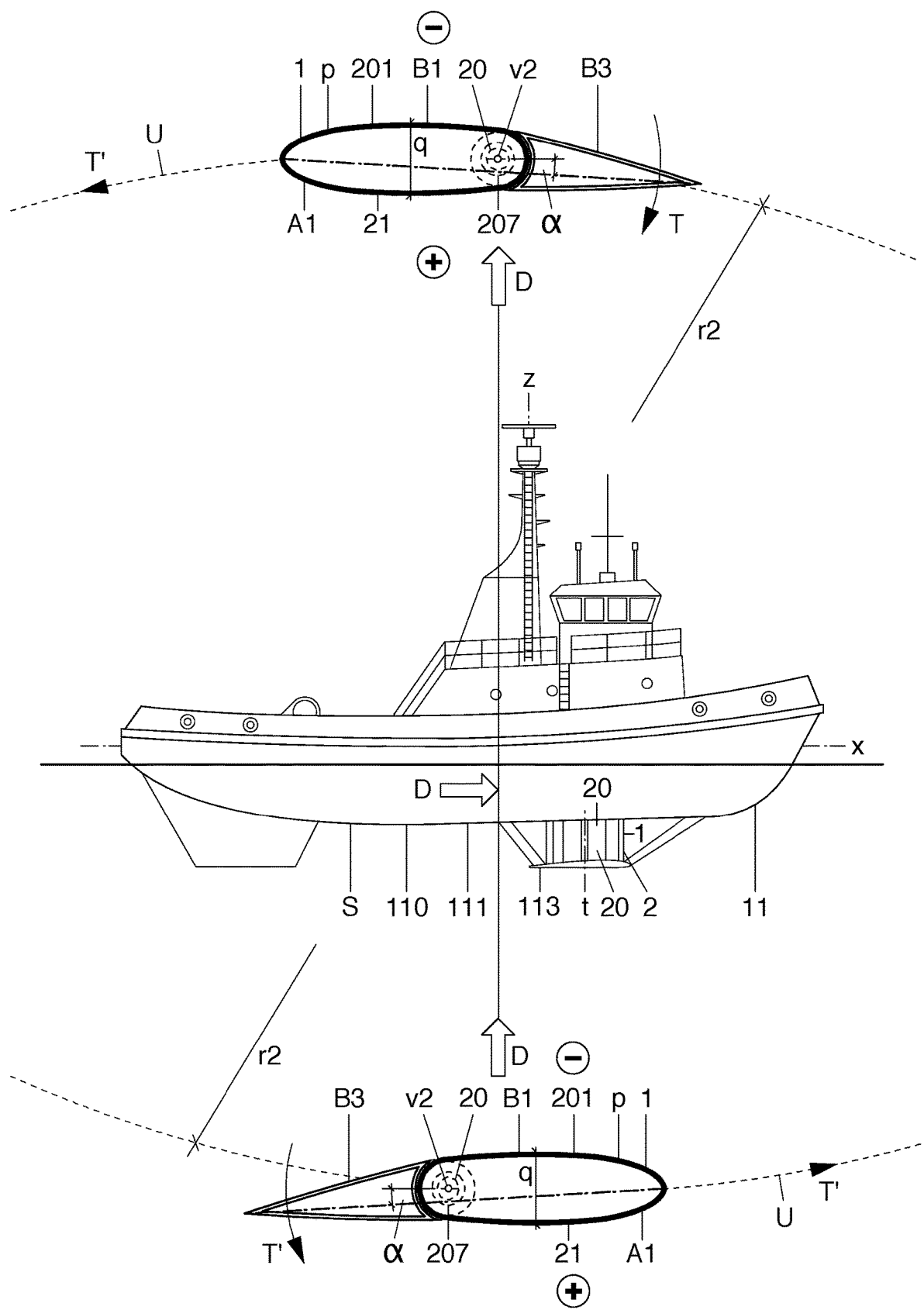
Figure 19:
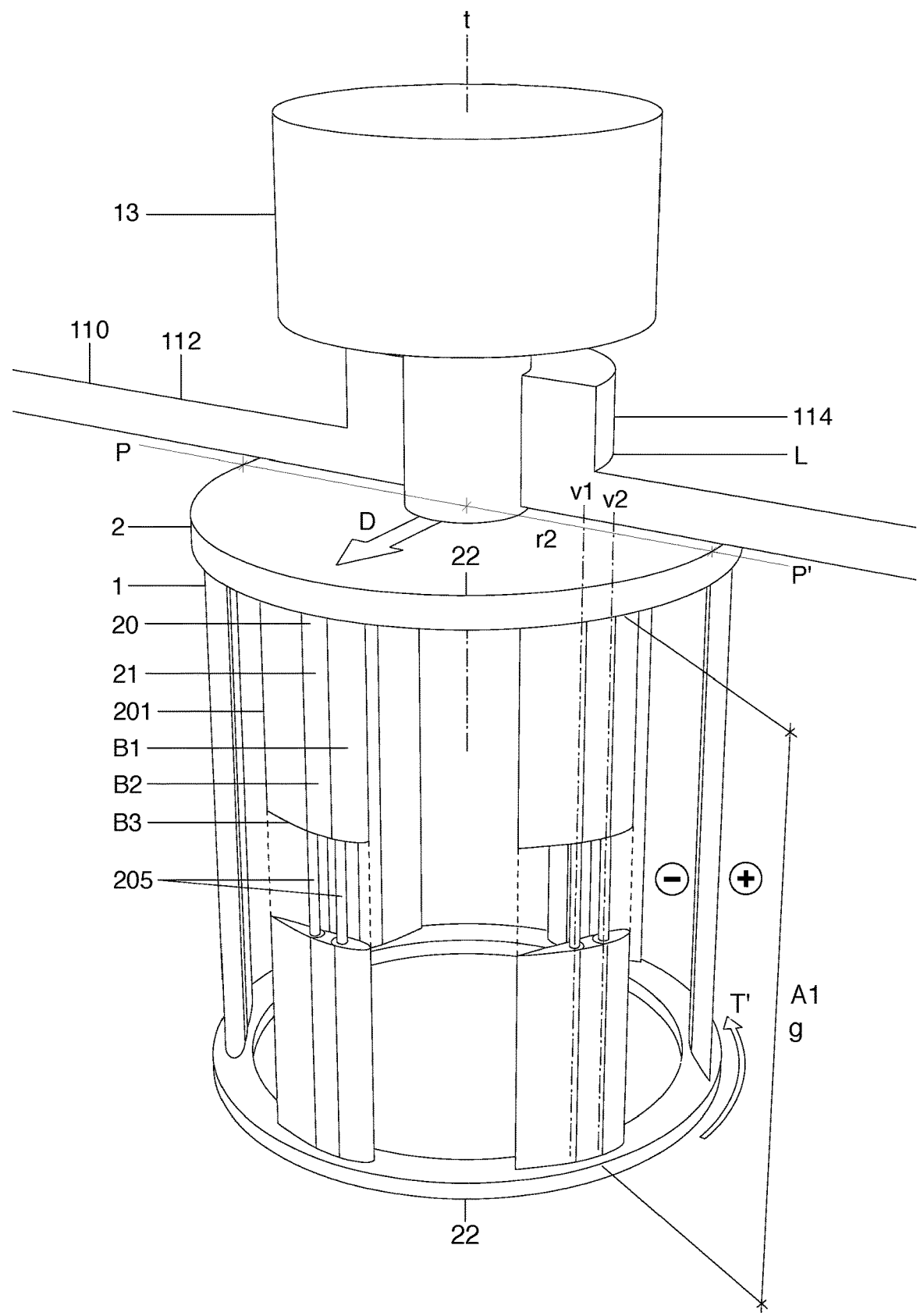
Figure 20:
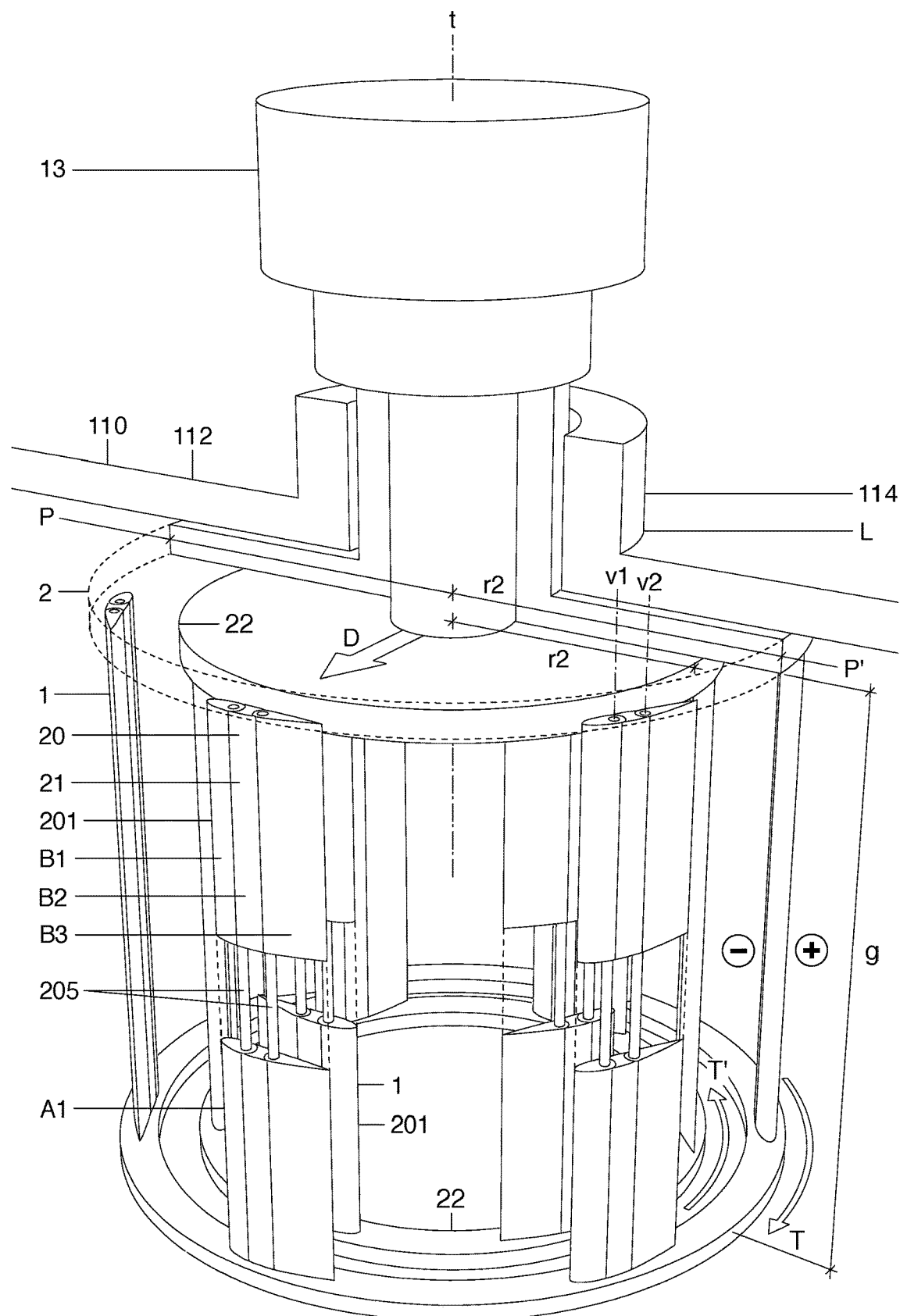
Figure 21:
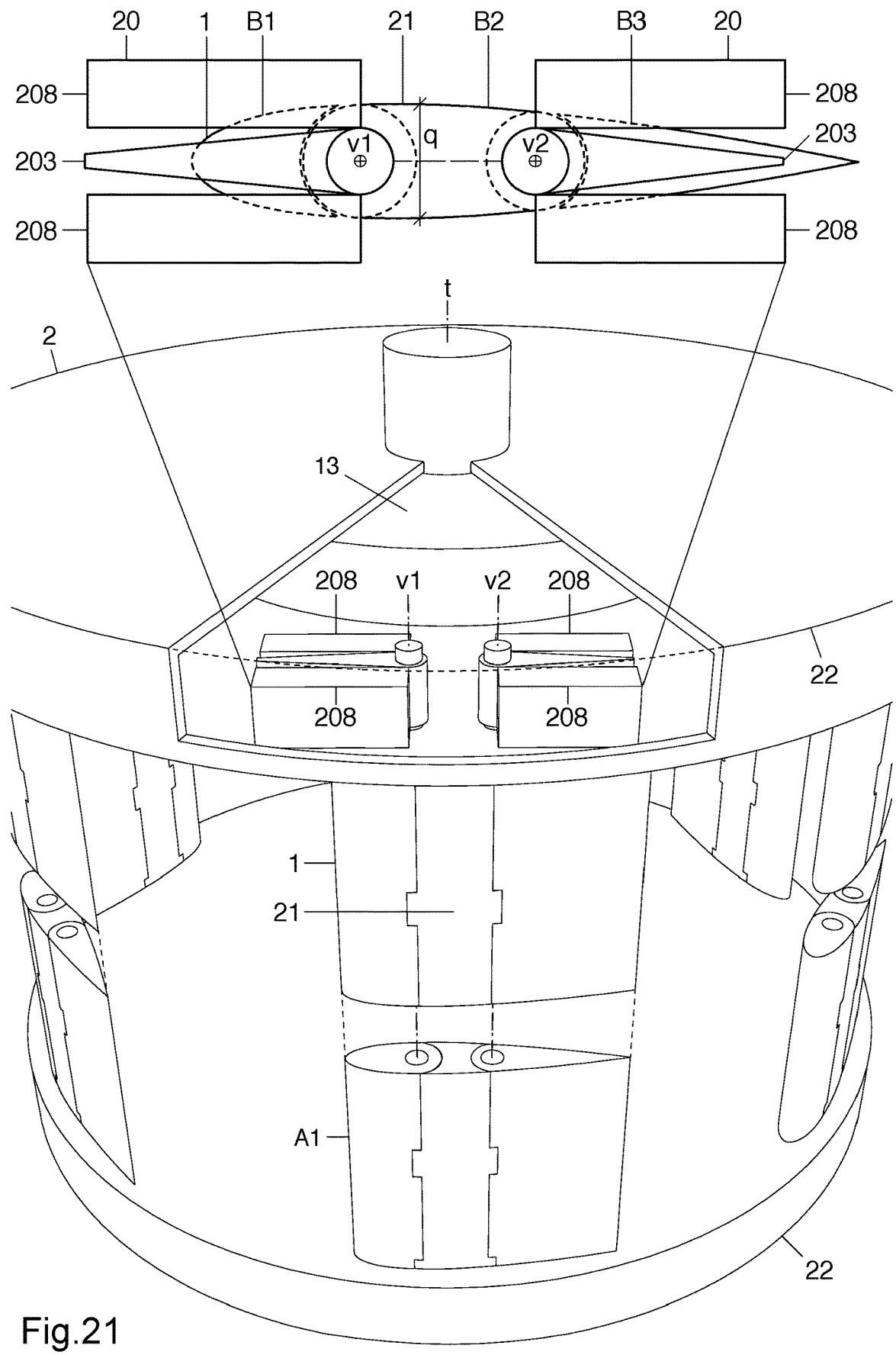
Figure 22:
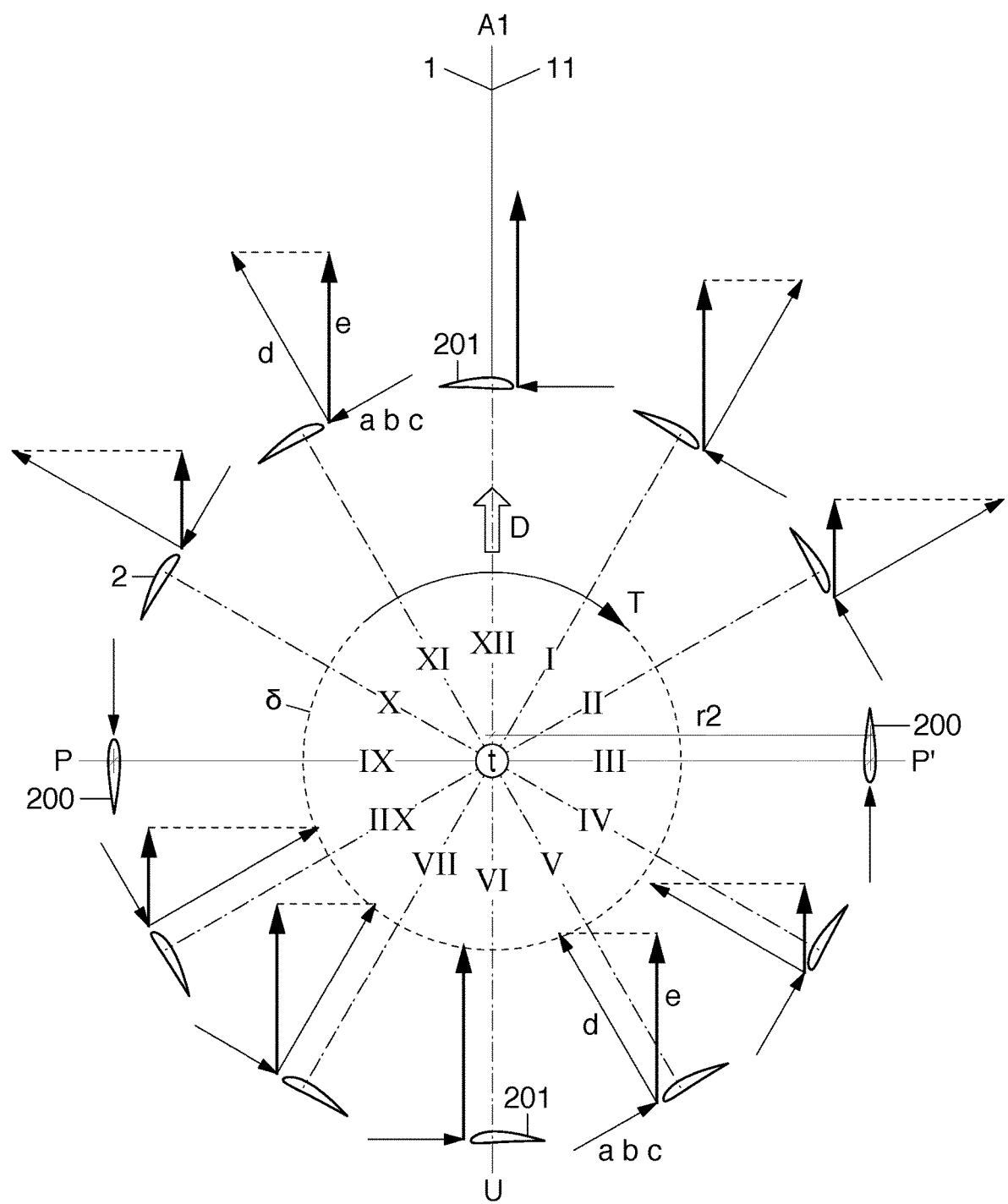
Figure 23:
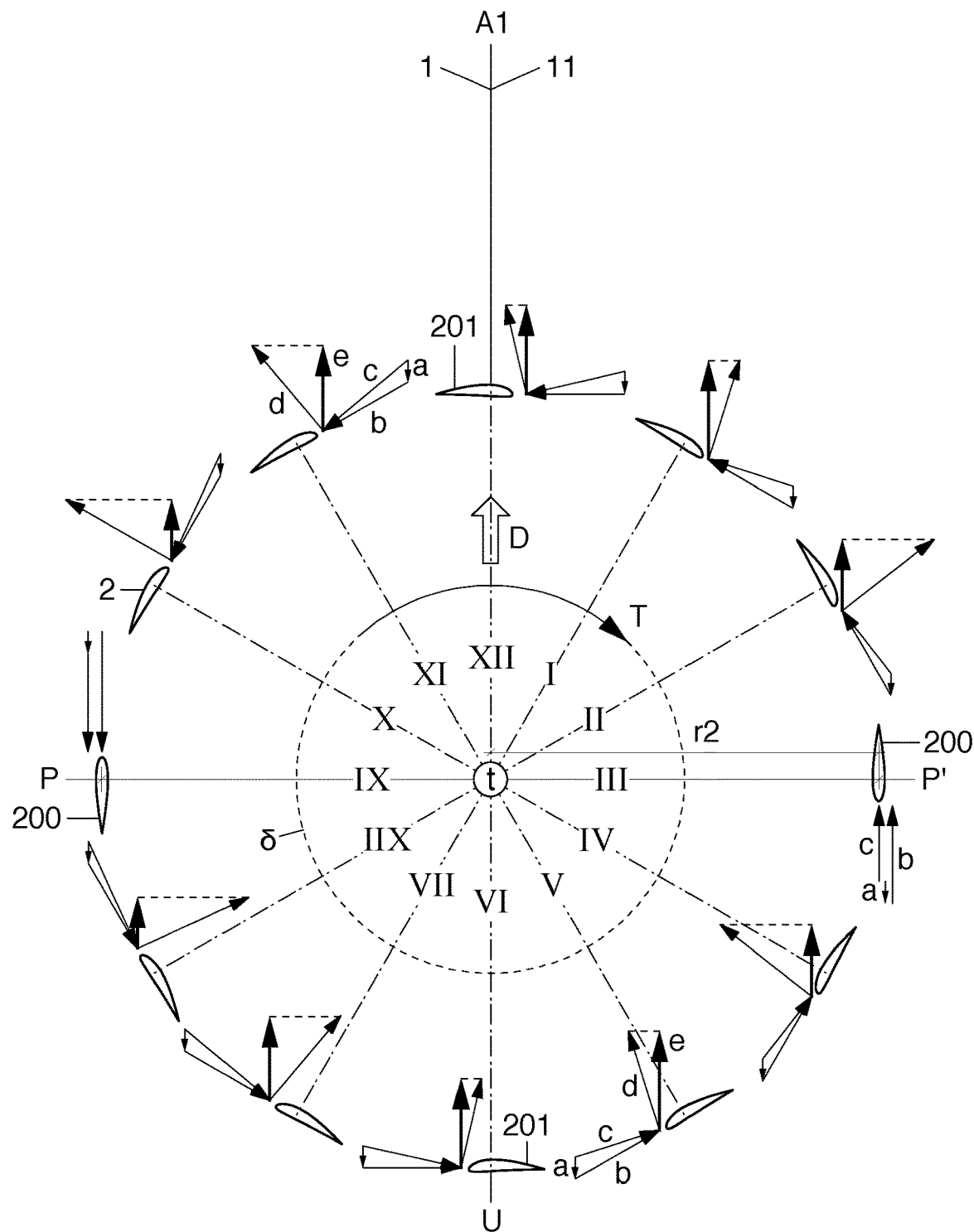
Figure 24:
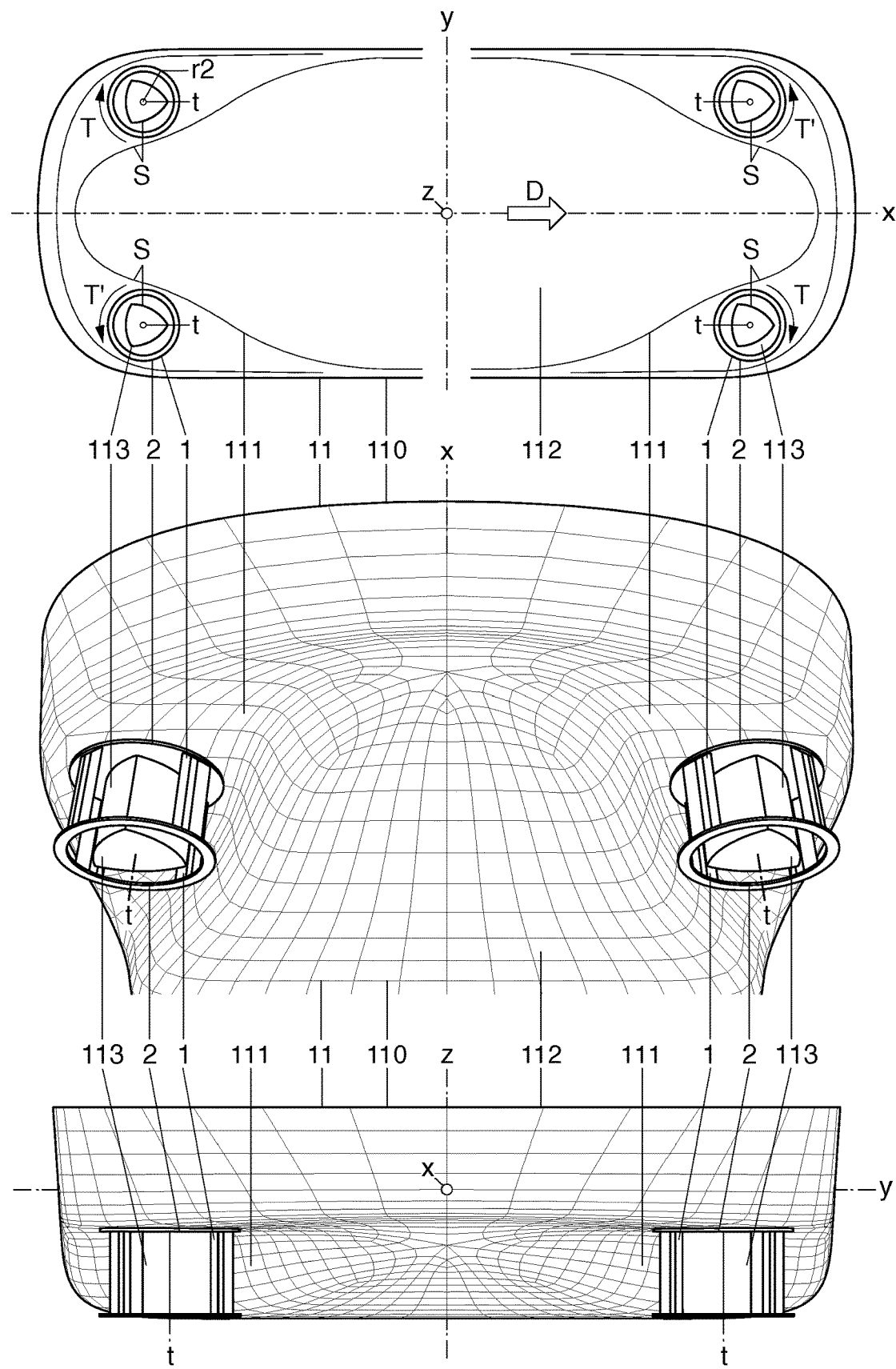
Figure 25:
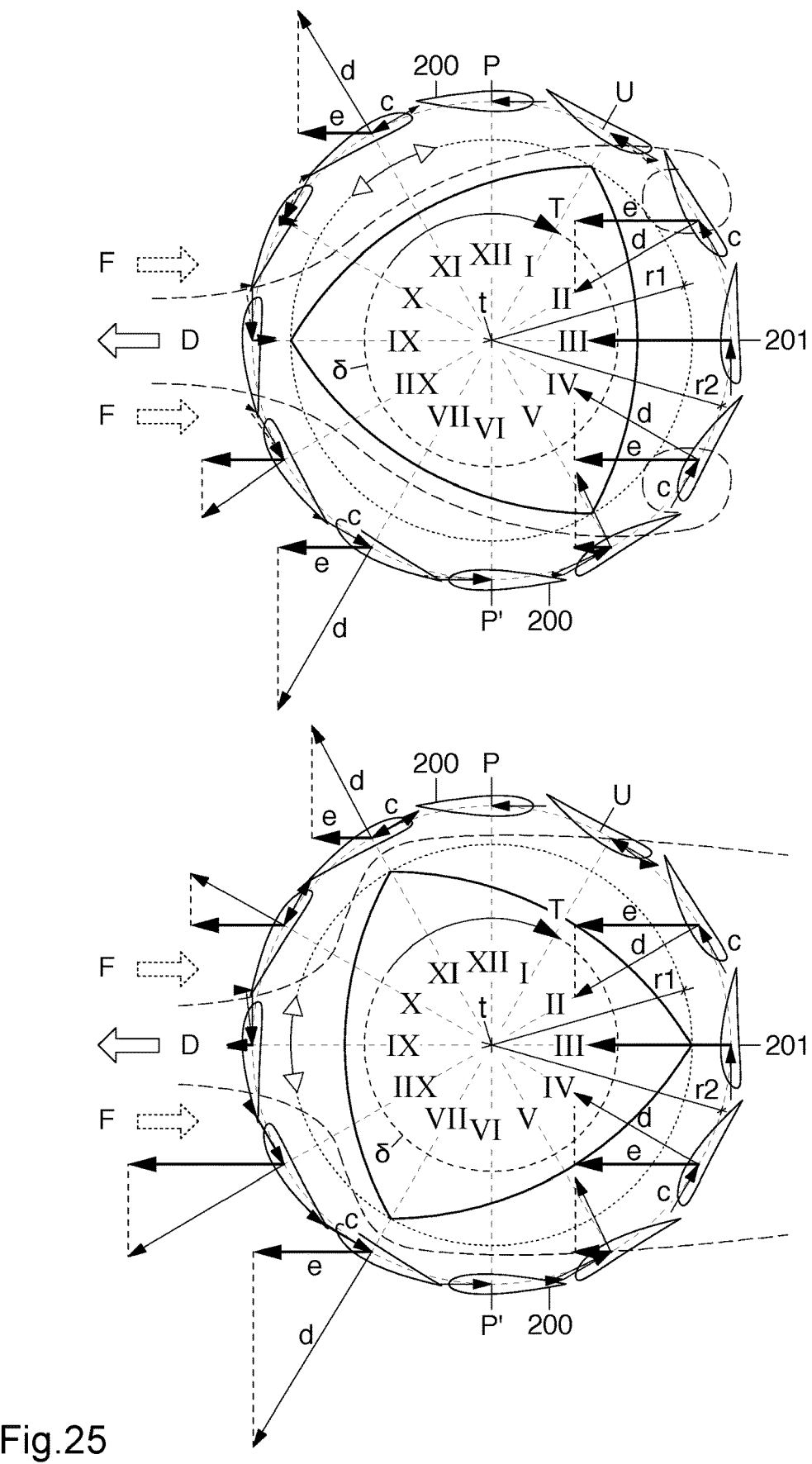
Figure 26:
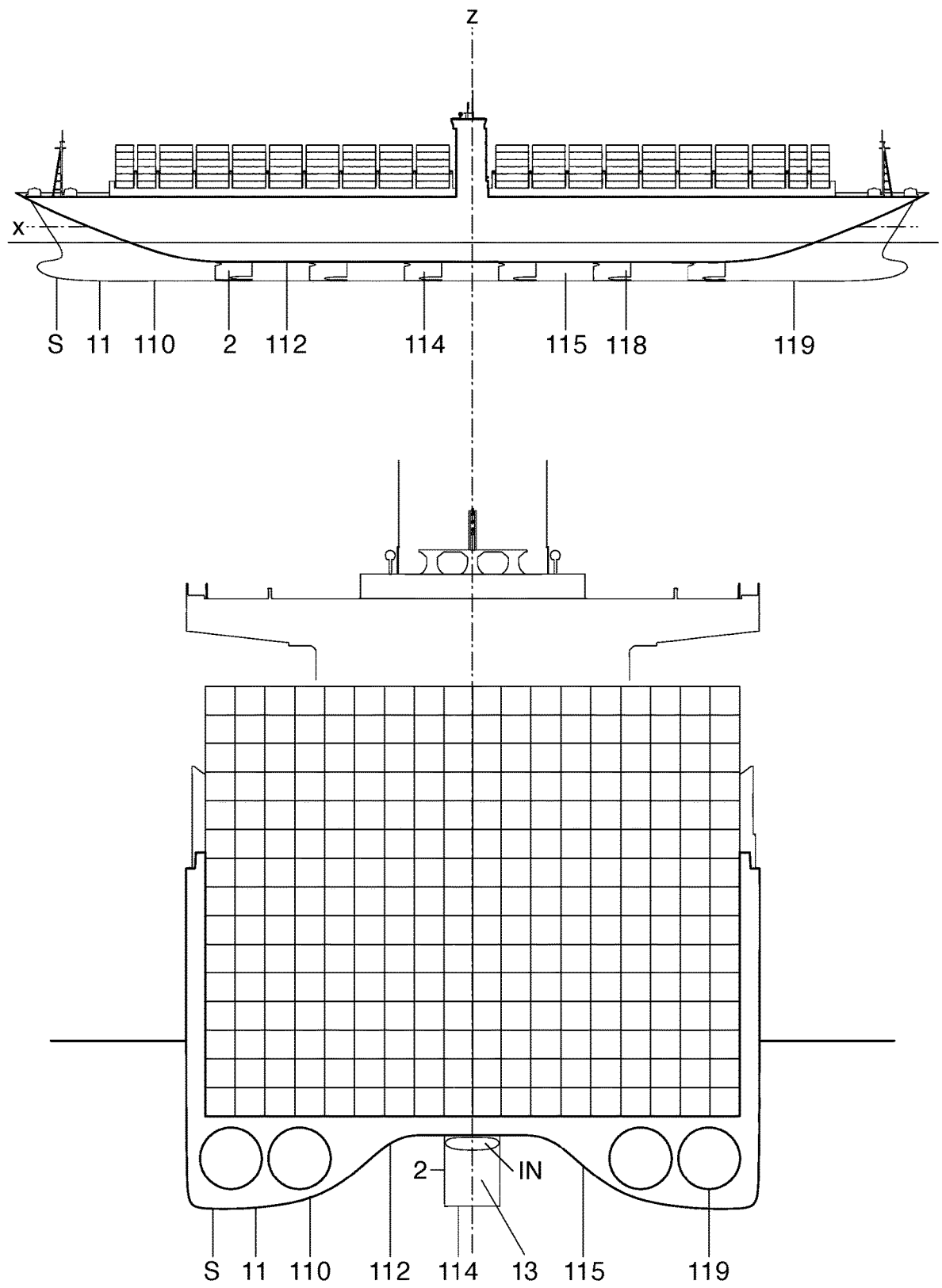
Figure 27:
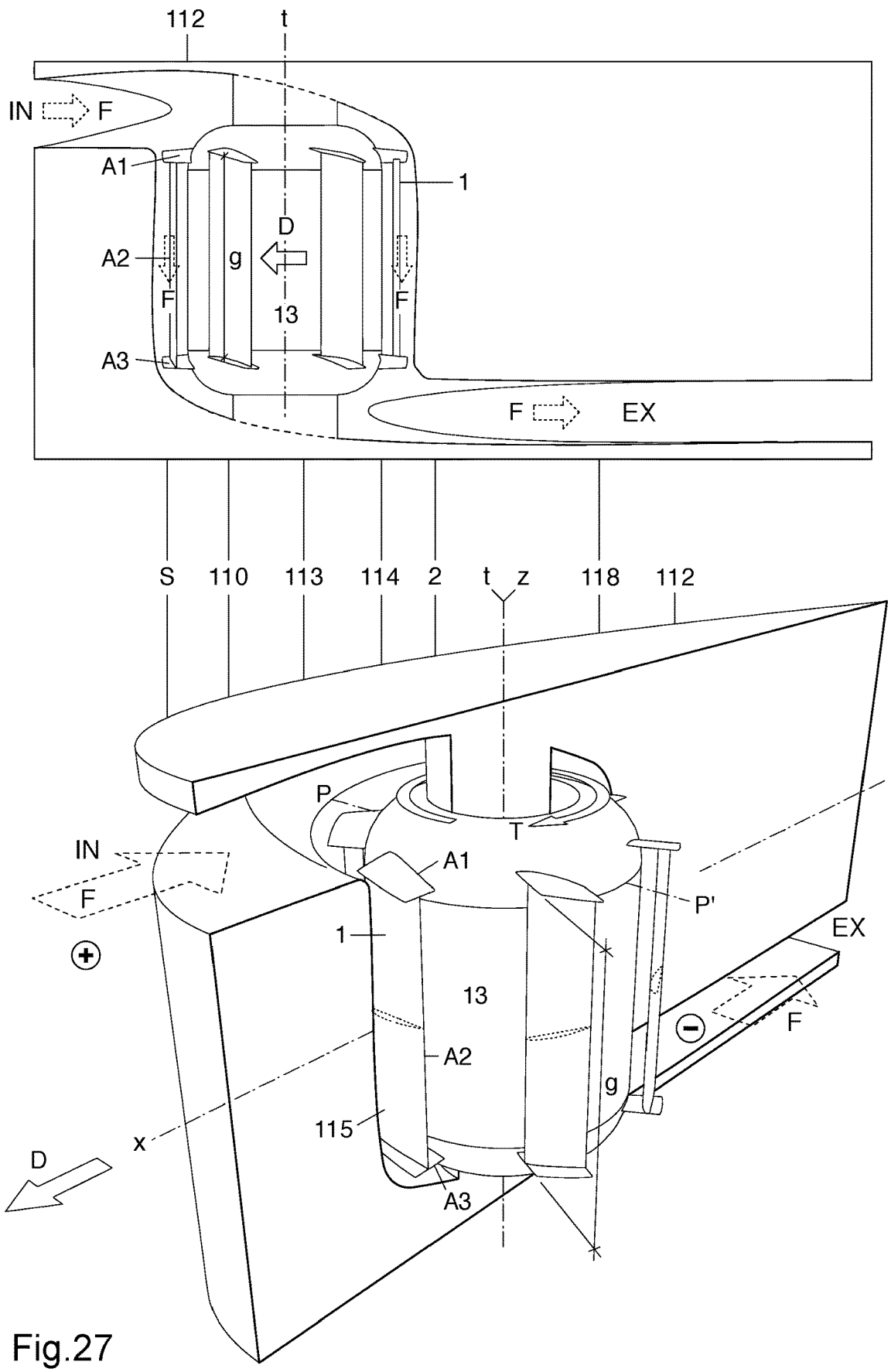
Figure 28:
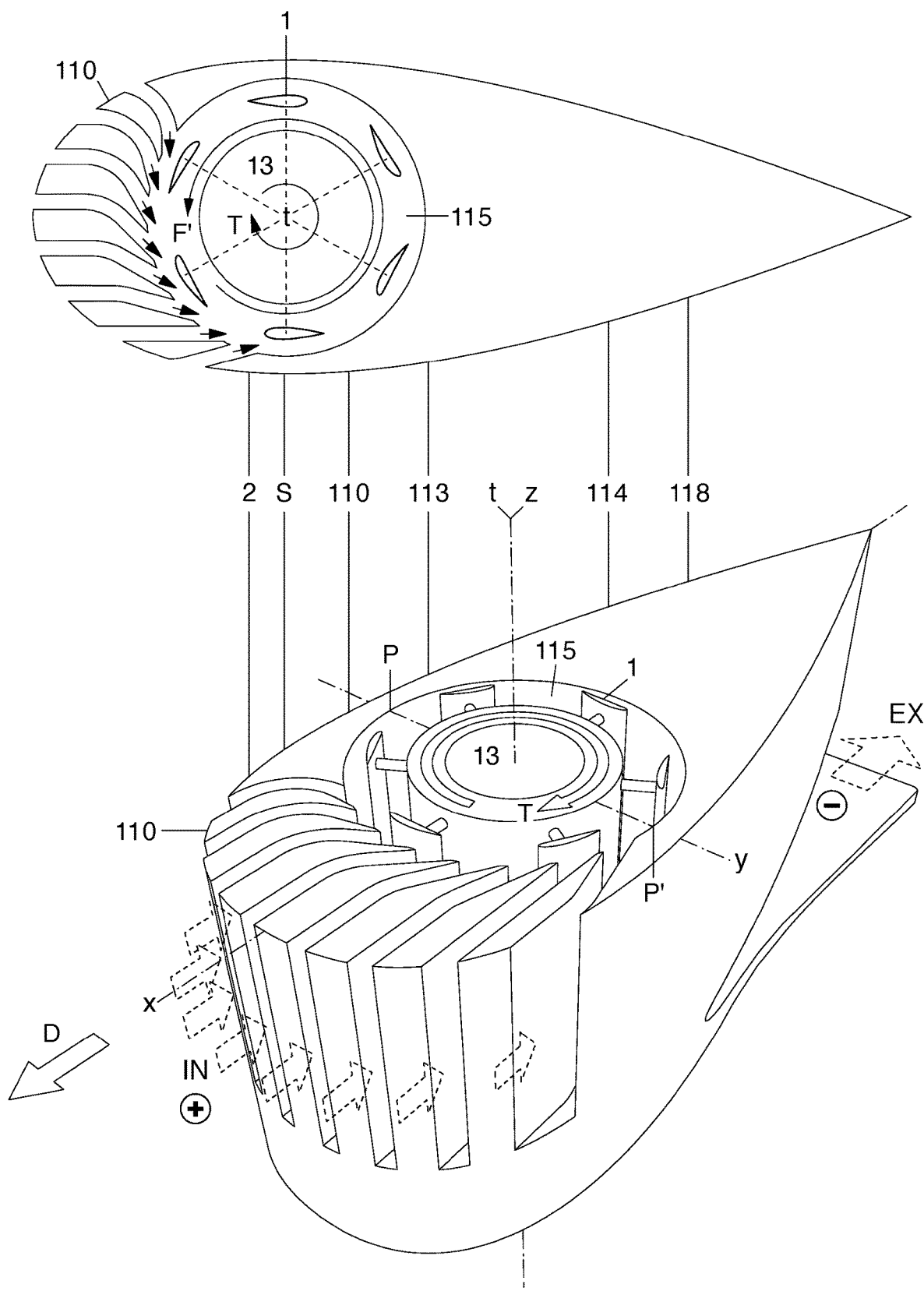
Figure 29:
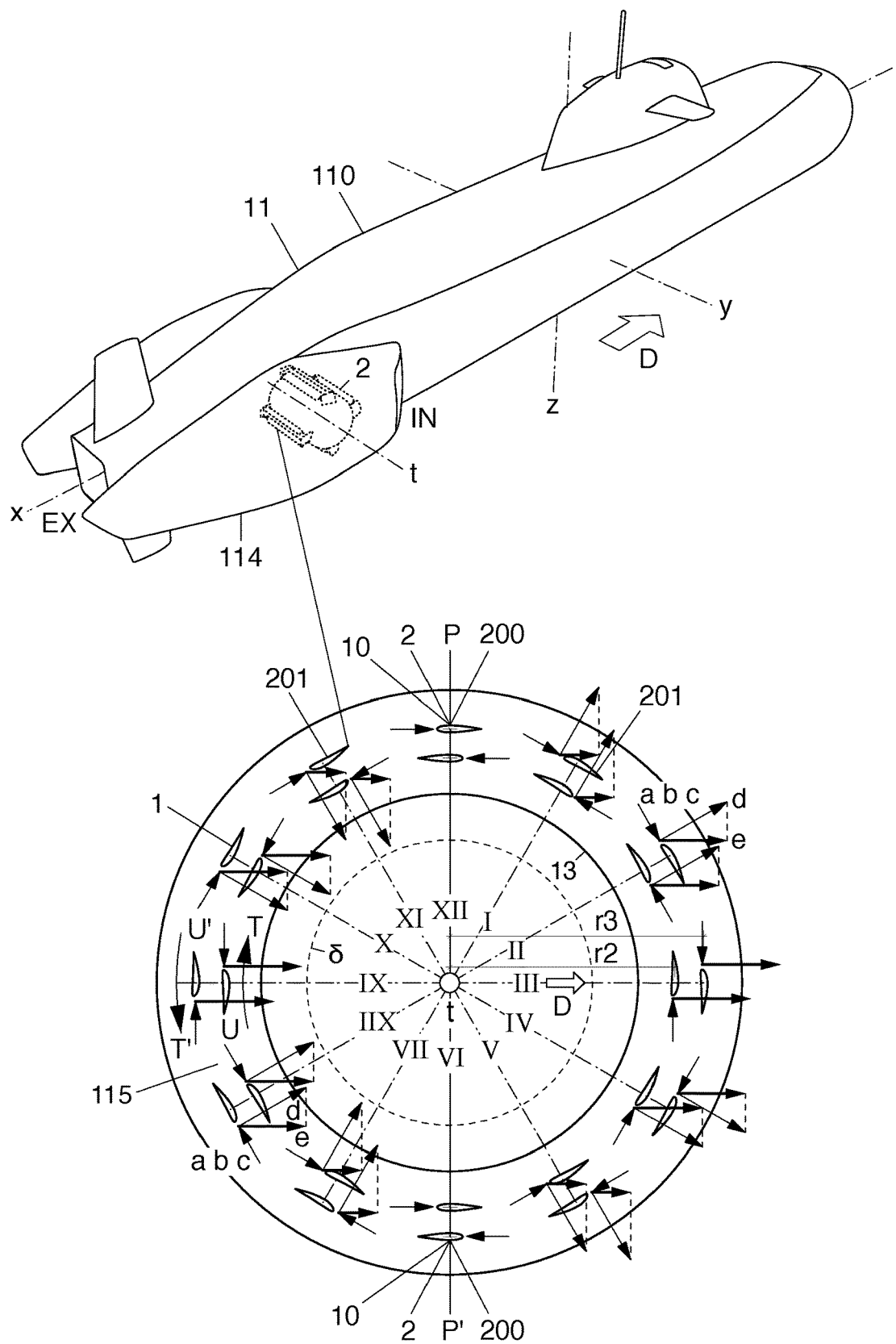
Figure 30:
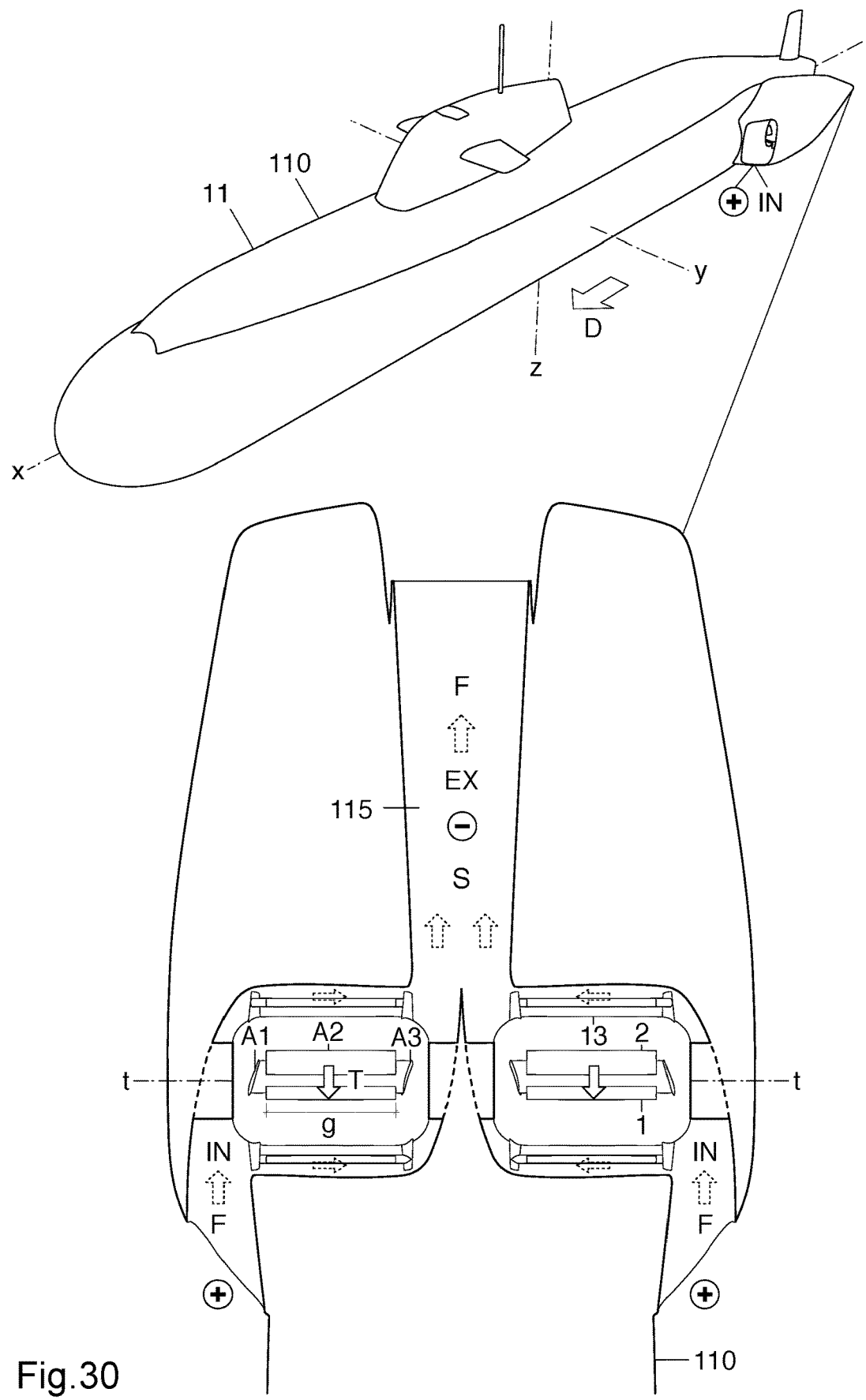
Figure 31:
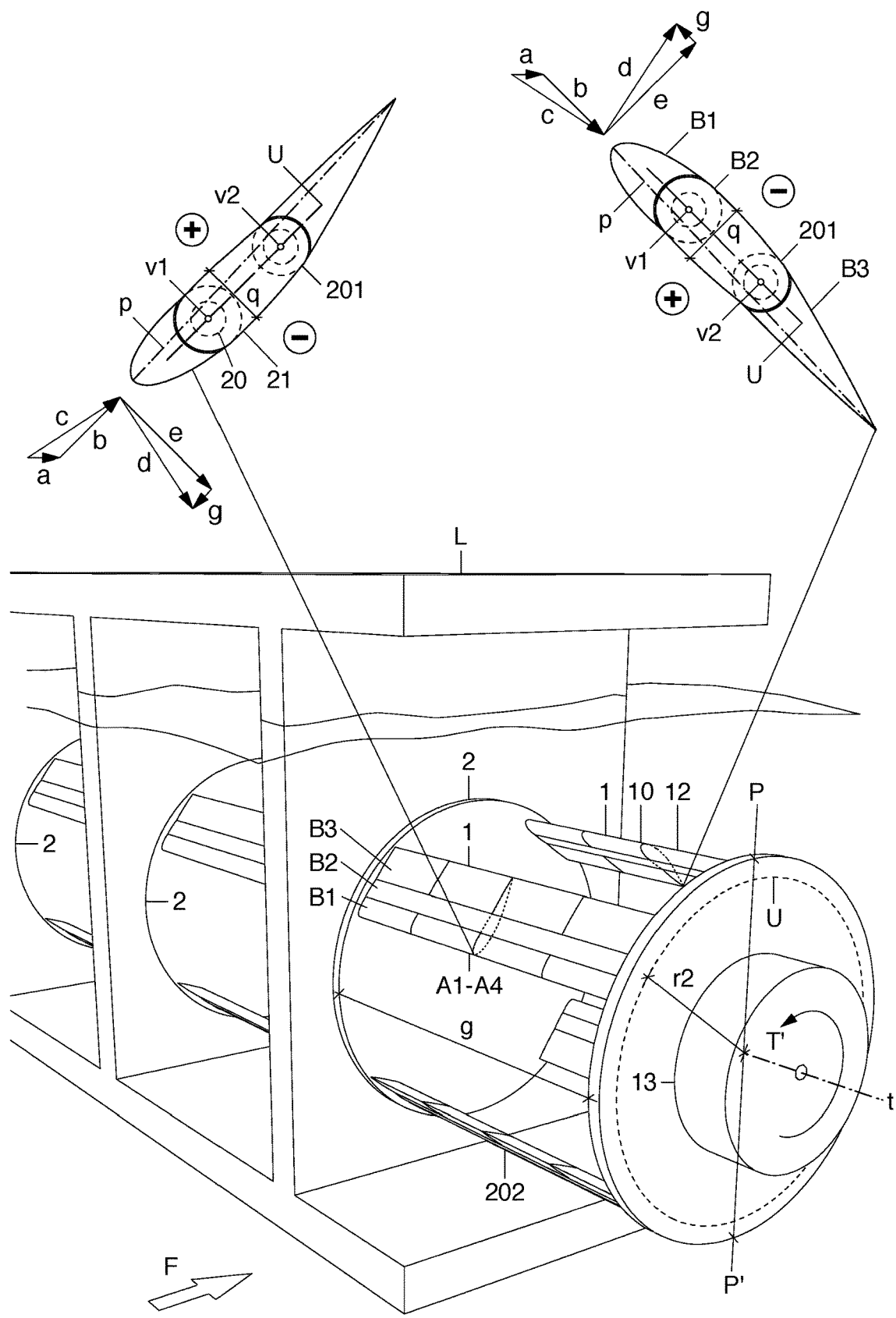
Figure 32:
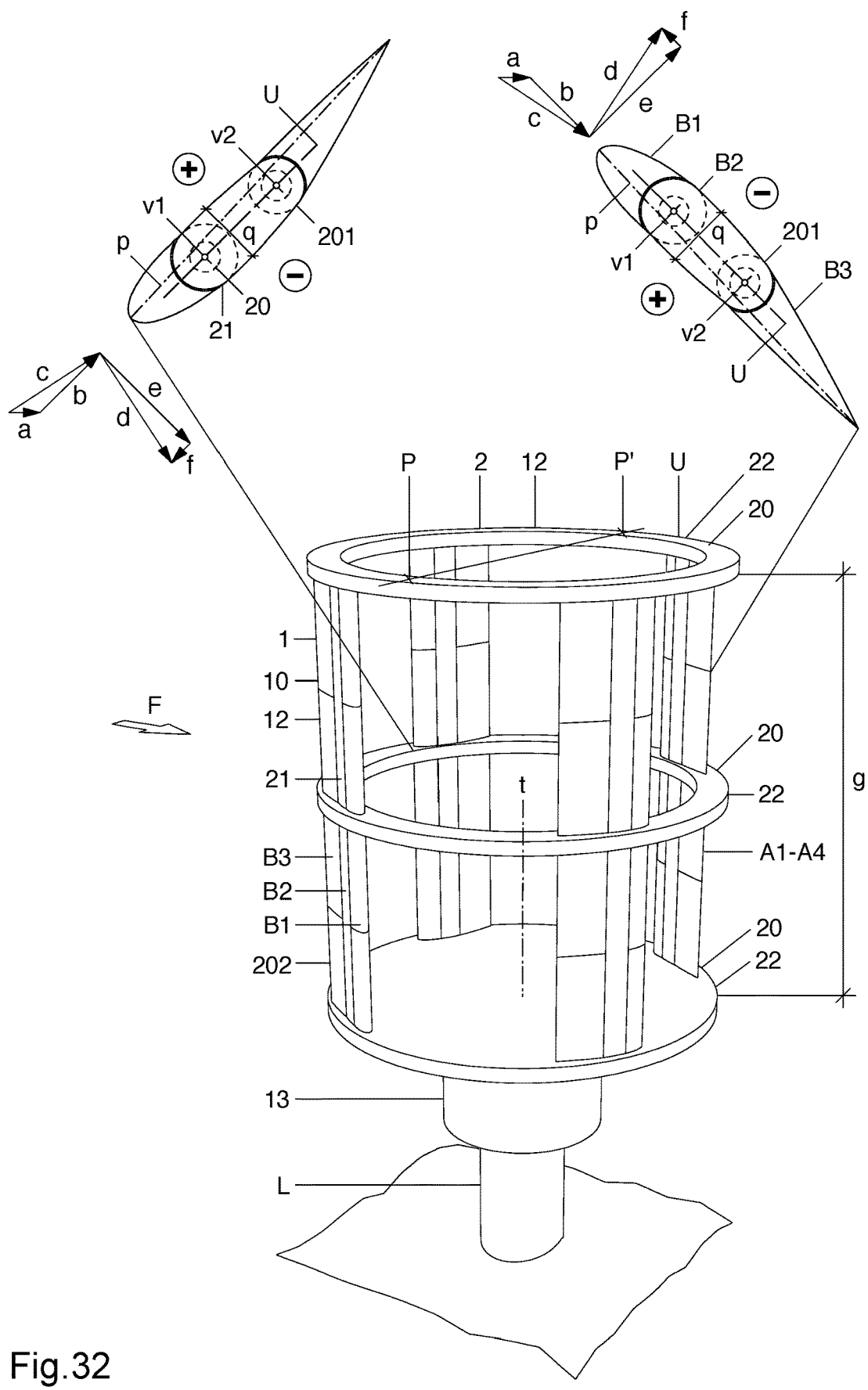
Figure 33:
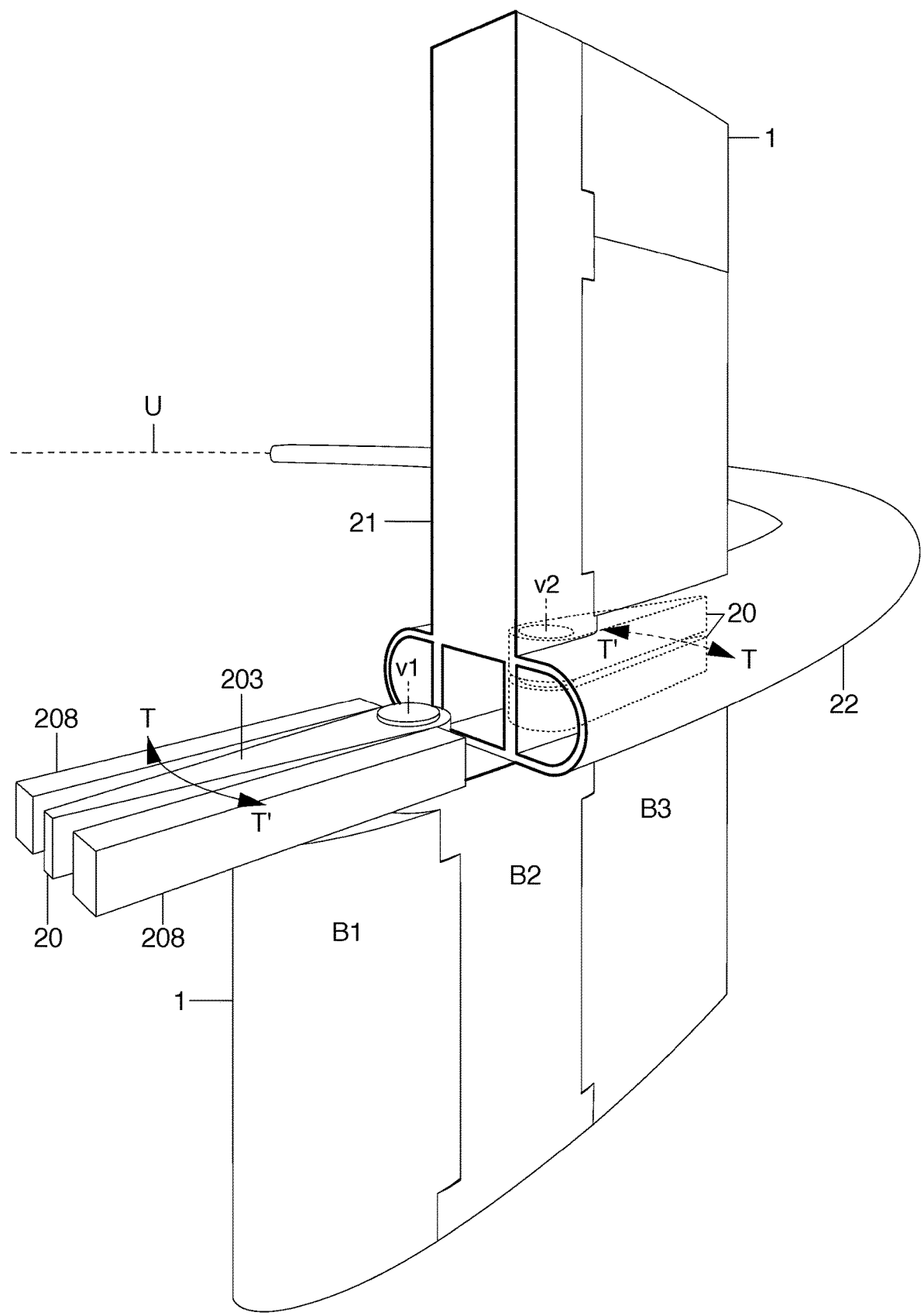
Figure 34:
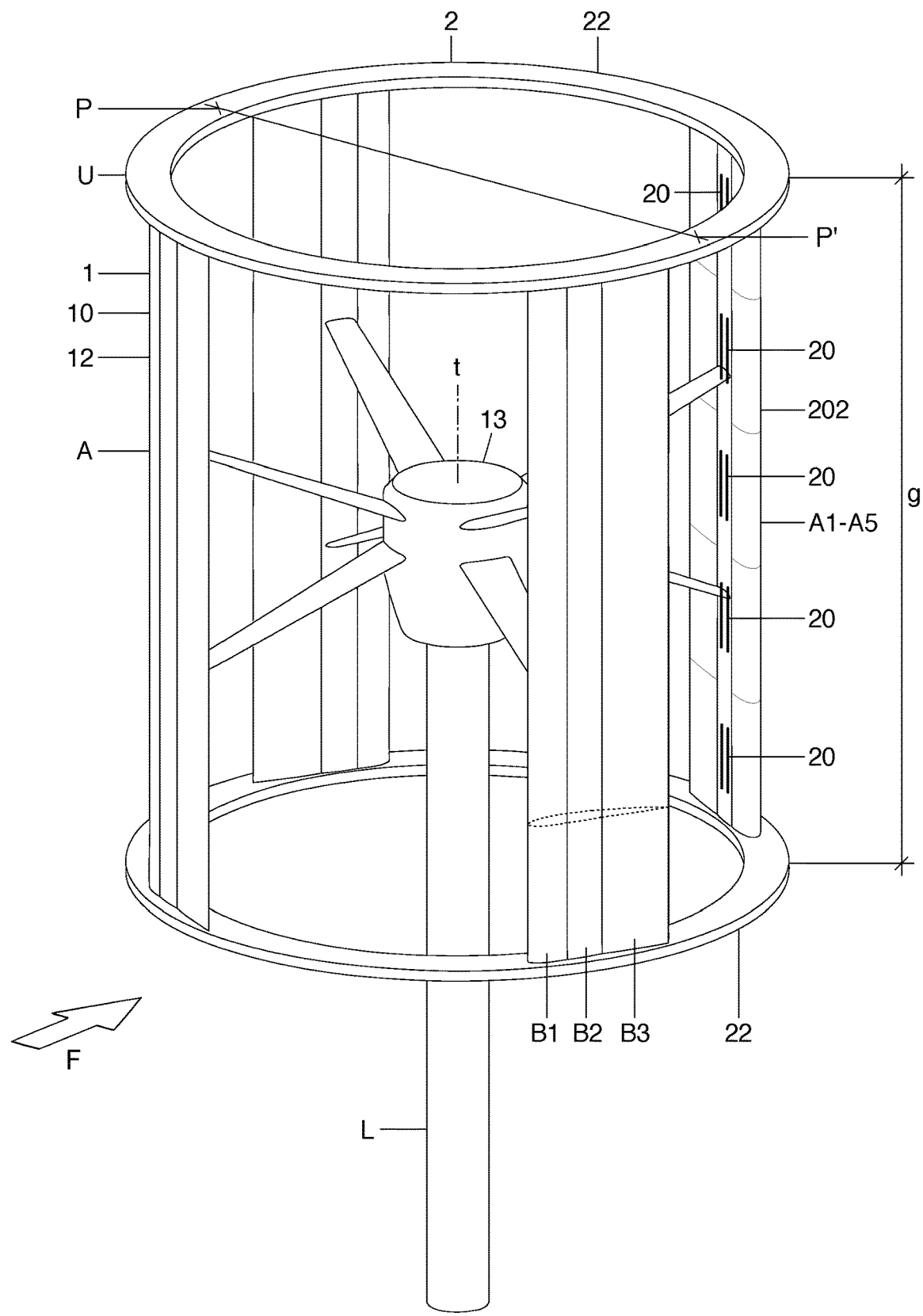
Figure 35:
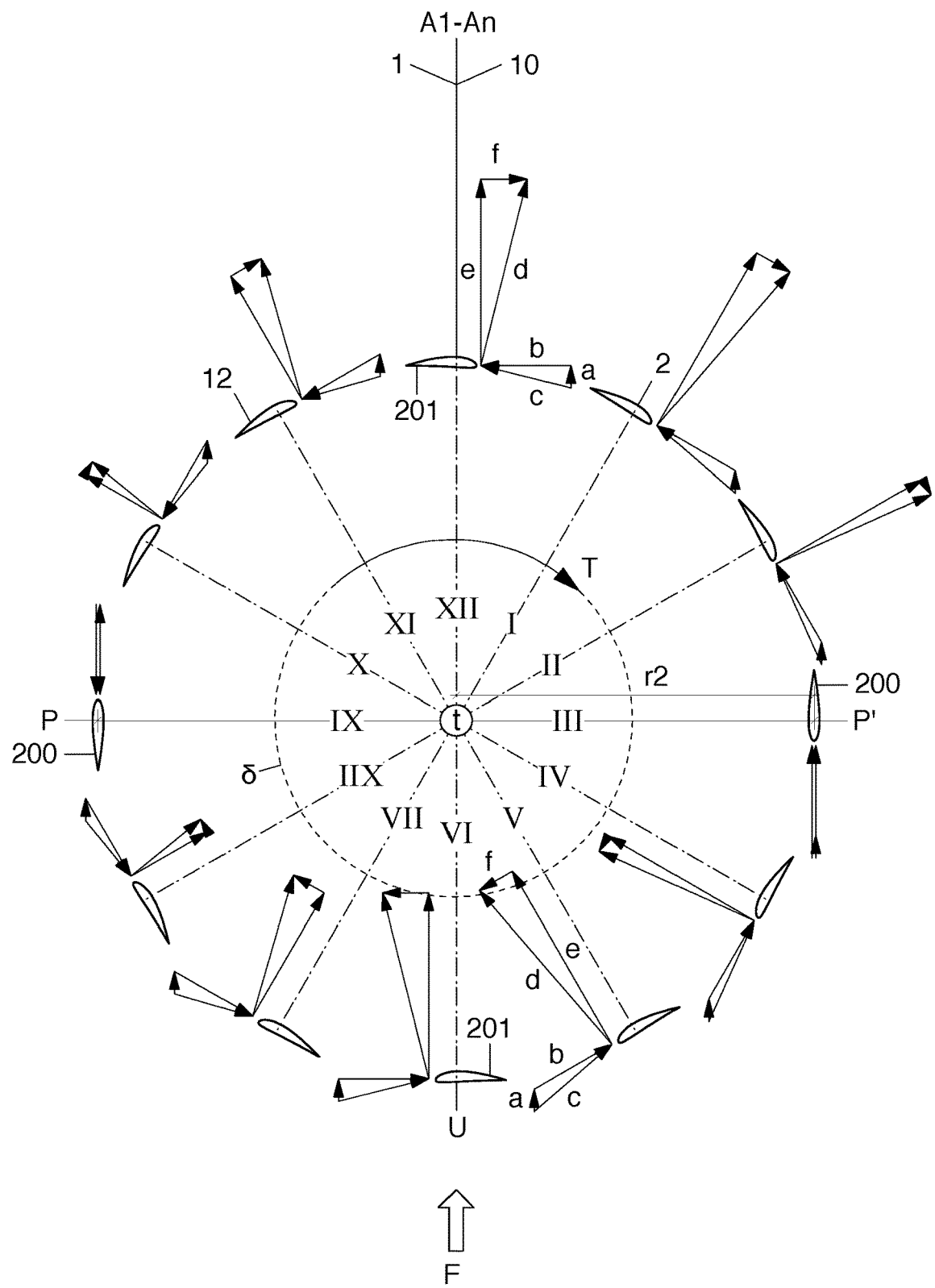
Figure 36:
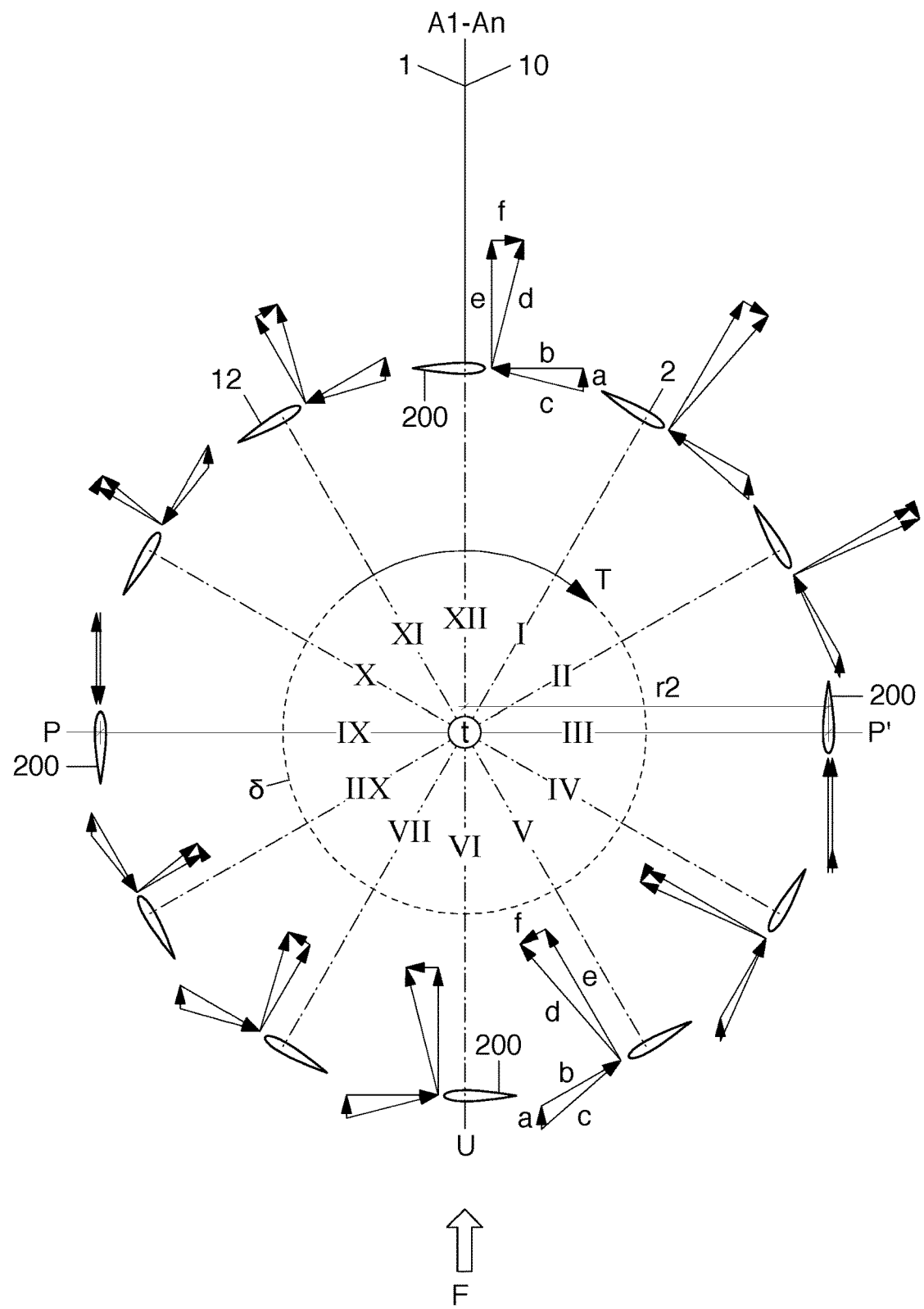
Figure 37:
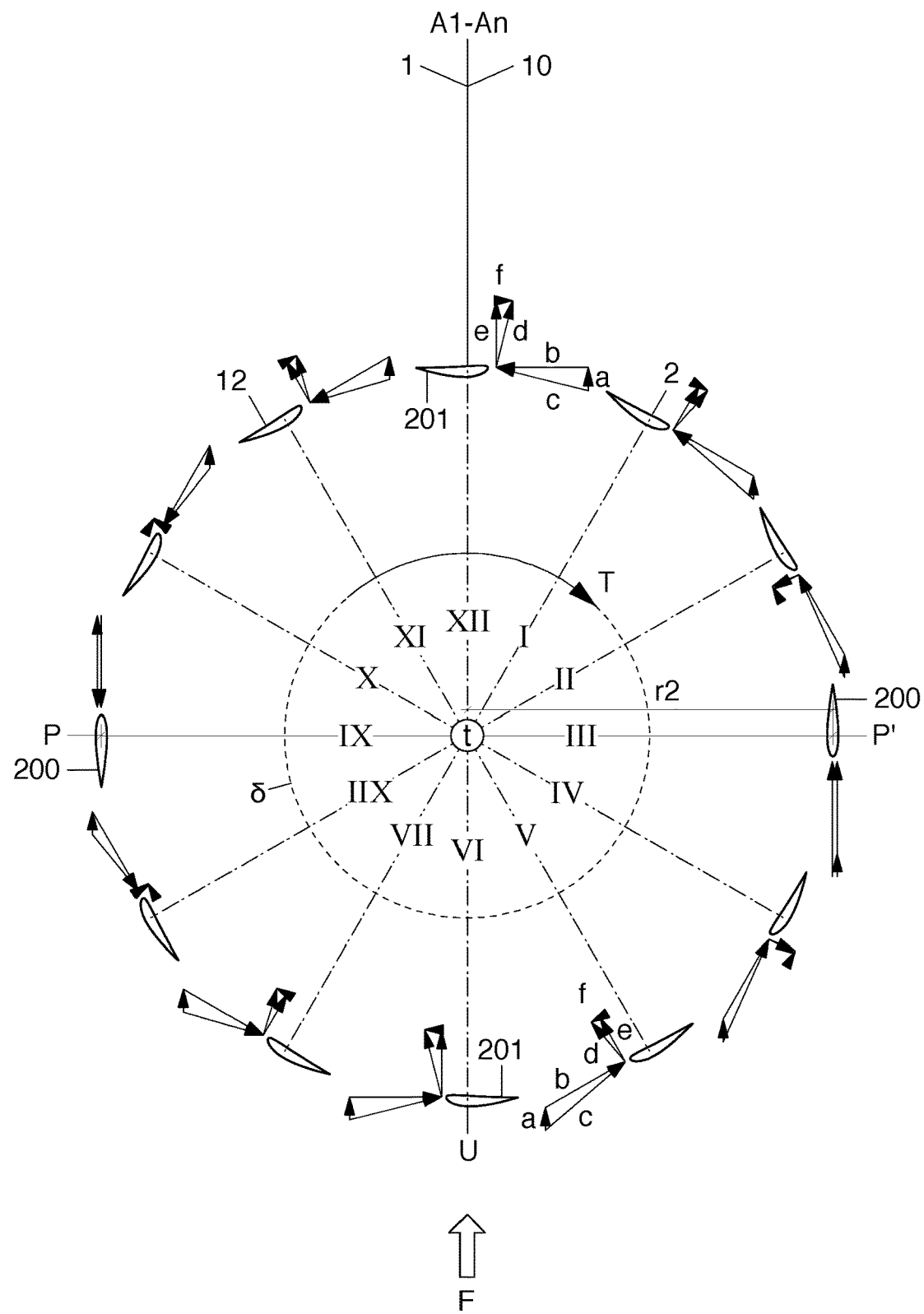

Further details and advantageous further embodiments of the invention can be seen from the exemplary embodiments described below and shown in the drawings, which are in no manner to be understood as limiting the invention, and from the subclaims. It is understood that the features mentioned above and those to be explained below can be used not only in the combination indicated in each case, but also in other combinations or on their own, without going beyond the scope of the present invention. In the figures:

FIG. 1 shows a rotary-wing aircraft designed as a helicopter with four bracket-shaped rotor blades, FIG. 2 shows the helicopter of FIG. 1 in ascent flight with representation of the aerodynamically induced forces on the upper and lower longitudinal portions of the rotor blades in a schematic top view and in detailed sections of the rotor blades, FIG. 3 shows the helicopter of FIG. 1-2 in straight flight with representation of the aerodynamically induced forces on the upper and lower longitudinal portions of the rotor blades in a schematic top view and in detailed sections of the rotor blades, FIG. 4 shows the helicopter of FIGS. 1-3 in straight flight with representation of the aerodynamically induced forces on the longitudinal portions of the rotor blades in a horizontal section, FIG. 5 shows a two-part kinematic rotor blade with a rear axis of rotation for a rear blade segment, at the top as a symmetrical airfoil, in the middle and at the bottom each as an asymmetrical airfoil in schematic cross-section, FIG. 6 shows the two-part rotor blade according to FIG. 5 with integrated actuators, at the top as a symmetrical airfoil, in the middle and at the bottom as an asymmetrical airfoil in a sectional isometry, FIG. 7 shows a two-part kinematic rotor blade with a front axis of rotation, at the top with a symmetrical airfoil, in the middle and at the bottom each with an asymmetrical airfoil in schematic cross-section, FIG. 8 shows the two-part rotor blade of FIG. 7 with integrated actuators, with a symmetrical airfoil at the top and an asymmetrical airfoil in the middle and bottom, each in a sectional isometric view, FIG. 9 shows a three-part rotor blade, at the top with a symmetrical airfoil, in the middle and at the bottom with an asymmetrical airfoil, each in schematic cross-section, FIG. 10 shows the three-part rotor blade according to FIG. 9, at the top as a symmetrical airfoil and at the bottom as an asymmetrical airfoil in a sectional isometric view, FIG. 11 shows a three-part rotor blade with an electromagnetic actuator at the top and an electromagnetic actuator in a sectional isometric view at the bottom, FIG. 12 shows a perspective view of a rotary-wing aircraft designed as an air cab for six persons, with detailed sections of the rotor blades, FIG. 13 shows a vehicle suitable for flight and road traffic, above in driving operation and below in the take-off phase of flight operation, each in a perspective overview, FIG. 14 shows the vehicle of FIG. 13 in ascent flight with representation of the aerodynamically induced forces on a longitudinal portion of the rotor blades of the vehicle in schematic cross-section, FIG. 15 shows the vehicle according to FIGS. 13-14 in straight flight with representation of the aerodynamically induced forces on a longitudinal portion of the rotor blades in schematic cross-section, FIG. 16 shows a rotary-wing aircraft with a wing, FIG. 17 shows the airplane according to FIG. 16, FIG. 18 shows an overview view of a rotary-wing aircraft designed as a tug and bowser with two rotor modules in the center and with detailed sections of the rotor blades at the top and bottom, FIG. 19 shows a rotor module for a slow-moving watercraft in isometric sectional view, FIG. 20 shows two counter-rotating rotor modules for watercraft in an isometric sectional view, FIG. 21 shows the electromagnetic blade adjustment for a ship drive according to FIGS. 16-18, above in detailed section and below in cutaway perspective, FIG. 22 shows a schematic cross-section of the hydrodynamically induced forces of the rotor module according to FIGS. 18-21 in start-up operation, FIG. 23 shows the hydrodynamically induced forces of the rotor module according to FIGS. 18-22 in driving operation in a schematic horizontal section, FIG. 24 shows the hull of a watercraft with four rotor modules, at the top in a bottom view, in the center in a perspective bottom view and at the bottom in a front view, FIG. 25 shows a rotor module of the hull according to FIG. 24 with representation of the forces caused hydrodynamically by a flow guide of the rotor module on the rotor blades in two exemplary horizontal sections, FIG. 26 shows a seagoing watercraft, above in a longitudinal cross-section and below in a schematic cross-section, FIG. 27 shows the housing for a rotor module of the watercraft according to FIG. 26, at the top in the schematic horizontal section and at the bottom in the perspective sectional view, FIG. 28 shows an alternative housing for the rotor module of the watercraft according to FIG. 26, at the top in schematic longitudinal section and at the bottom in a perspective sectional view, FIG. 29 shows a watercraft designed as a submarine, FIG. 30 shows the submarine of FIG. 29 with representation of the stern rotor modules in schematic horizontal section, FIG. 31 shows a rotary-wing turbine designed as a water turbine with a horizontal axis of rotation, with detailed sections of the rotor blades at the top and a perspective sectional view at the bottom, FIG. 32 shows a rotary-wing turbine as a water turbine with a vertical axis of rotation, at the top with detailed sections of the rotor blades and at the bottom in the perspective overview view, FIG. 33 shows a perspective sectional view of an actuator of the water turbine according to FIG. 32, FIG. 34 shows a rotary-wing turbine as a wind turbine with a vertical axis of rotation in an overview perspective view, FIG. 35 shows the rotary-wing kinematics of the turbines according to FIGS. 31-34 for control operation with representation of the fluid-dynamically induced forces in schematic cross-section, FIG. 36 shows the rotary-wing kinematics for a throttled rotational speed of the turbines according to FIGS. 31-34 with representation of the fluid-dynamically induced forces in schematic cross-section, FIG. 37 shows the rotary-wing kinematics for a further throttled rotational speed for the exceptional operation of the turbines according to FIGS. 31-34 with representation of the fluid-dynamically induced forces in schematic cross-section.

In the following, parts that are identical or have the same effect are given the same reference numerals and are usually only described once. The description builds on one another across all characters in order to avoid unnecessary repetition.

FIG. 1 shows a rotary-wing aircraft 11, which is designed as a helicopter with four rotor blades 1 in the shape of a bow. The longitudinal portions A1-A3 of the rotor blades 1 form a polygonal wing chain 203. While the upper longitudinal portion A1 and the lower longitudinal portion A3 are designed to generate a lifting force d, as shown in FIG. 2-3, the rotary-wing kinematics 10 in the longitudinal portion A2 are designed to generate a thrust force e in the direction of travel D of the helicopter. The diameter with the turning points P,P' can be oriented within an adjustment area δ within a radius of 360 degrees in any direction of travel D, so that the longitudinal portion A2 with the length g has the function of a thrust generator. The rotor module 2 is connected to the motor generator 13 via a shaft and has an axis of rotation t, which is formed by the vertical axis z of the helicopter and rotates above the cabin 117 enclosed by the hull 110. The rotary-wing kinematics 10 replaces a swashplate and controls the lift in the upper and lower longitudinal portions A1, A3 and the thrust force of the rotor module 2 in the middle longitudinal portion A2. The longitudinal portions A1, A3 are arranged one above the other in a plane, but can also be arranged offset radially or circumferentially with respect to one another, so that the central longitudinal portion A2 connects the outer upper and outer lower ends of the longitudinal portions A1, A3 at an angle and the rotor blade 1 is designed in a loop shape. With two layers of lift-generating longitudinal portions A1,A3 rotor blades 1, the helicopter can advantageously be used as a cargo helicopter that can maintain a stable position in hovering flight with the rotary wing kinematics 10 in the longitudinal portion A2. Without a swashplate, the rotor module 2 is characterized by very smooth running and is free of unwanted vibrations.

FIG. 2 shows the helicopter according to FIG. 1 with a schematic diagram of the longitudinal portions A1, A3 of the bow-shaped rotor blades 1, at the top in the overview view and at the bottom in detailed sections of the variable asymmetrical airfoil 201 for the left and right halves of the circular path U respectively. In ascent flight, the sum of the lifting forces d is the same in both halves of the circular path U, so that no adjustment of the blade segments B1, B3 is required in the longitudinal portions A1, A3 of the rotor blade 1 in ascent flight.

FIG. 3 shows the helicopter according to FIGS. 1-2 with a schematic diagram of the longitudinal portions A1, A3 of the bow-shaped rotor blades 1, at the top in the overview view and at the bottom in detailed sections of the variable asymmetrical airfoil 201, in each case for the left and the right half of the circular path U, relative to the direction of flight D. When the helicopter is flying straight ahead, the resulting flow c is composed of the rotational speed a and the forward speed b, so that different lifting forces d result on the rotor blades 1 in the left and right half of the circular path U with respect to the direction of travel D. The lifting forces d generated in both halves of the circular path U are balanced by means of a corresponding blade adjustment of the front and rear blade segments B1, B3 relative to the middle blade segment B2, so that the helicopter assumes a stable flight attitude. In the longitudinal portion A2 of the rotor blade 1, as shown in FIG. 24, a blade adjustment is provided, wherein the thrust force e can be aligned in the direction of travel d, wherein in this exemplary embodiment the adjustment area δ is 360 degrees, so that the helicopter can be steered in any direction of travel D. This is particularly advantageous for a precise landing approach and also for maintaining a determined flight position, e.g. in crosswinds.

FIG. 4 shows the straight flight of the helicopter according to FIG. 1-3 in a schematic horizontal section in the longitudinal portion A2 with the length g. The diameter with the turning points P,P' can assume any orbital position I-XII in the longitudinal portion A2, so that the adjustment area δ is 360 degrees in this case. While the rotor blades 1 of the wing chain 203 provide the necessary lifting force d in the longitudinal portions A1,A3, as shown in FIG. 2-3, the longitudinal portion A2 serves to generate a thrust force e, which can be directed in any direction of travel within a 360 degree radius. When stationary, the rotary-wing kinematics 10 in the longitudinal portions A2 of the rotor blades 1 are switched off when there is no wind, so that the thrust forces e caused by the variable asymmetrical airfoils 201 cancel one another out. By means of the rotary-wing kinematics 10, the helicopter is very maneuverable and can maintain a flight position very precisely, which is particularly advantageous for take-off and landing.

FIG. 5 shows a rotor blade 1 constructed in two parts, at the top with a symmetrical airfoil 200, in the middle and at the bottom with an asymmetrical airfoil 201 with swapped suction and pressure sides. The front blade segment B1 is designed as the longitudinal carrier 21 of the rotor blade 1. The rear blade segment B3 is hinged to the front blade segment B1 at the rear axis of rotation v2 of the rotor blade 1. An actuator 20 arranged coaxially and concentrically to the axis of rotation v2 actuates a slide 207 inside the rotor blade 1, which is shown in more detail in FIG. 6.

FIG. 6 shows an actuator 20 for the blade adjustment, which is formed by two pneumatic muscles 204 arranged coaxially and concentrically to the rear axis of rotation v2 of the rear blade segment B3, which are each connected to the face sides of the slide 207. At least one such adjustment device can be arranged in each longitudinal portion A1-An of the rotor blade 1.

FIG. 7 shows a rotor blade 1 designed in two parts, at the top as a symmetrical airfoil 200, in the middle and at the bottom as an asymmetrical airfoil 201, in which the front and rear blade segments B1, B3 are hinged rotatably to a longitudinal carrier 21 formed by a round hollow profile, so that the longitudinal central axis of the longitudinal carrier 21 forms a front axis of rotation v1 of the rotor blade A. For the blade adjustment, the front and rear blade segments B1, B3 are each rotated outwards or inwards by a maximum of 6 to 7 degrees around the axis of rotation v1 with reference to the circular path U in a rotary movement with the opposite direction of rotation T, T'. While the symmetrical airfoil 200 is aligned tangentially to the circular path U, the rotation of the front and rear blade segments B1, B3 results in a positive setting angle α of approximately 2 degrees relative to a tangent to the circular path U.

FIG. 8 shows the adjustment device of the two-part rotor blade 1 according to FIG. 7 with representation of an actuator 20 arranged concentrically and coaxially to the front axis of rotation v1, which is formed by a pneumatic muscle 204. The pneumatic muscle 204 arranged coaxially and concentrically to the axis of rotation v1 pushes the slide 207 back and forth on the hinge pin 205 with a frequency of 20-30 Hz, so that threaded portions of the slide 207 on the front and rear blade segments B3 oriented in opposite directions cause a rotary movement with opposite directions of rotation T,T' approximately 20 times per second. The chord p of the asymmetrical airfoil 201 has a positive setting angle α of 2 to 3 degrees relative to the tangent to the circular path U.

FIG. 9 shows a three-part designed rotor blade 1 with the blade segments B1-B3, at the top as a symmetrical airfoil 200, in the middle and at the bottom as an asymmetrical airfoil 201. At the front axis of rotation v1, the front blade segment B1 is articulated with the nose and at the rear axis of rotation v2, the rear blade segment B3 is articulated with the rear edge to the middle blade segment B2 formed by the longitudinal carrier 21. By rotating the front blade segment B1 and the rear blade segment B3 in opposite directions by a maximum of 7 degrees each, the variable asymmetrical airfoil 201 is given a positive setting angle α of 2.5 degrees relative to the tangent of the circular path U. The chord p of the symmetrical airfoil 200 is aligned tangentially to the circular path U. The opposite direction of rotation T,T' of the front and rear blade segments B1, B2 causes the suction side (−) and the pressure side (+) to change from the exterior side to the interior side of the circular path U and vice versa.

FIG. 10 shows a longitudinal portion A1-An of the three-part rotor blade 1, at the top with the symmetrical airfoil 200 of the transitional position which the rotor blade 1 temporarily has when the suction side (−), as shown in FIG. 4, changes from the exterior side to the interior side of the circular path U at the diameter with the turning points P,P'. The lift-generating asymmetrical airfoil 201 of rotor blade 1 is shown below. The actuators 20 integrated into the rotor blade 1 are formed by twelve pneumatic muscles 204, wherein six pneumatic muscles 204 engage each of the face sides of the slide 207. The pneumatic muscles 204 are each arranged parallel to the axes of rotation v1, v2 of the three-part rotor blade 1. The slides 207 are guided linearly on their inside on the hinge pins 205, while on their exterior sides they engage in threads of the front and rear blade segments B1, B3 in such a manner that the linear translational movement of the slide 207 on the hinge pins 205 causes the front and rear blade segments B1, B2 to rotate in and out in opposite directions T, T' relative to the invariant central blade segment B3. The low pitch of the threads on the blade side allows a transmission ratio of 1 to 10 for six pneumatic muscles 204 engaging on each of the two face sides of the slide 207. Pivot bearings 206 on the hinge pins 205 enable the rotary movement of the blade segments B1, B3. The hinge pins 205 arranged concentrically and coaxially to the axes of rotation v1, v2 serve as media channels for the current supply of the pneumatic muscles 204. The exhaust air from the pneumatic muscles 204 is used for an air bearing of the slide 207 on the hinge pins 205 and the blade segments B1, B3 on the slides 207.

FIG. 11 shows in each case an electromagnetic actuator 20 as an example for a longitudinal portion A1-An of the rotor blade 1, at the top in the transition position with the symmetrical airfoil 200. The hinge pins 205 are each arranged concentrically and coaxially to the axes of rotation v1, v2 for the front blade segment B1 and the rear blade segment B3 and serve as cable channels for the current supply of the two electromagnetic actuators 20. In the simple embodiment illustrated above, an iron sleeve of the hinge pin 205 carries an excitation winding 208 for the induction of an iron sleeve of the slide 207. By reversing the polarity of the electromagnetic actuator 20, the slide 207 performs an oscillating movement with a frequency of 20-30 Hz on the hinge pin 205, so that threads of the actuators 20 together with the threads of the front and rear blade segments B1, B3 cause the rotary movement with opposite directions of rotation T, T' on the front and rear blade segments B1, B3, which are each articulated to the middle blade segment B2 by means of pivot bearings 206. Air bearings between the hinge pin 205 and the slide 207 as well as between the slide 207 and the blade segments B1, B3 are supplied with pressurized air by the hinge pin 205. In this exemplary embodiment, the electromagnetically induced field is aligned parallel to the axes of rotation v1, v2, while the actuator 20, bottom, has a linear motor in which a plurality of exciter windings 208 of the stator are each aligned radially to the axes of rotation v1,v2 of the blade segments B1, B3, and the slide 207 arranged concentrically and coaxially to the hinge pin 205 has a plurality of corresponding ring-shaped permanent magnets 209. The linear motor allows exact positioning of the slide 207 so that the adjustment angle θ for the blade segments B1, B3 can be set and varied very precisely. The adjustment device is designed to withstand considerable aerodynamically induced suction forces and centrifugal forces, wherein the blade segments B1, B3 can be individually adjusted and locked in each longitudinal portion A1-An of the rotor blade 1.

FIG. 12 shows the flight operation of a rotary-wing aircraft 11 with particularly advantageous rotary-wing kinematics 10 for two rotor modules 2 with radii r2,r3, which rotate in opposite directions T,T' about an axis of rotation t formed by the vertical axis z and about a cabin 117 for six passengers. The cabin 117 has the shape of an ellipsoid, which has a hub with motor generators 13 at an upper and lower apex, to which two rotor modules 2 are connected, each with two bow-shaped rotor blades 1. The motor generators 13 drive the rotor modules 2, which rotate in opposite directions T, T'. The bow-shaped rotor blades 1 are divided into three longitudinal portions A1-A3. While the variable, asymmetrical airfoil 201 generates the lifting force d in the upper and lower longitudinal portions A1,A3, as shown at the upper and lower blade edge, the rotary-wing kinematics 10 generate a thrust force e in the longitudinal portions A2 with the length g, which can be aligned in the direction of travel D. To maintain a determined flight position, the rotary-wing kinematics 10 switches the longitudinal portions A2 of the rotor blades 1 to standby mode, so that the thrust forces e with a neutral blade position eliminate one another and, in the event of crosswinds, turbulence and other external forces, the variable, asymmetrical airfoil 201 is used to specifically activate thrust forces e as counterforces such that the rotary-wing aircraft 11 can precisely maintain the respective flight position. In the air cab, large lifting forces are generated in the longitudinal portions A1, A3 of the rotor blades 1 by means of the wing chain 203 and high thrust forces are generated in the longitudinal portion A2 with the length g in a division of labor. The electric drive by means of the motor generators 13 requires comparatively little energy with a drive power of 150 KW for each of the two motor generators 13.

FIG. 13 shows a rotary-wing aircraft 11 designed as a passenger car suitable for air and road transportation for four persons. The passenger car, for example, is 5.9 m long, 1.9 m high and 2.1 m wide. At the front end of the front part and at the rear end of the rear part, an axis of rotation t arranged parallel to the transverse axis y is provided for two front and two rear rotor modules 2, each driven by motor generators 13 and rotating in opposite directions T, T'. During driving operation of the passenger car, the total of eight bow-shaped rotor blades 1 are each folded into a hollow space in the front and rear sections and are covered by unspecified sliding hoods. The rotary-wing aircraft 11 has four telescopic supports 116, which are extended for take-off operation, so that the total of four rotor modules 2 can be unfolded and rotate freely in order to be driven and brought up to rotational speed by means of the motor generators 13 on the rotary axes t. At a rotational speed of 800 rpm or lower, the vehicle prefers to take off and switch to flight mode, wherein the telescopic stabilizers 116 are retracted hydraulically. The rotor blades 1 each have three blade segments B1-B3, whose rotary-wing kinematics 10 are explained in more detail in FIGS. 14-15. In flight, the longitudinal portions A2 of the bow-shaped rotor blades 1 provide the necessary lift, wherein they change their orientation from the exterior side to the interior side of the circular path U at the turning points P, P' of the diameter of the circular path U, as shown in FIG. 14. The longitudinal portions A1,A3 of the bow-shaped rotor blades 1 serve as the tail unit of the rotary-wing aircraft 11.

FIG. 14 shows the ascent flight of the rotary-wing aircraft 11 according to FIG. 13 in a schematic vertical section. The rotor modules 2 with radii r2, r3 rotating in opposite directions T, T' on separate circular paths U can be seen. In ascent flight, the diameter with the turning points P,P' assumes a horizontal position, so that the resulting flow c of the rotor blades 1 in the orbital positions I-XII of the circular paths U,U', with the exception of orbital positions III, IX for the diameter with the turning points P,P', generates a thrust force e derived from the lifting force d of the asymmetrical airfoil 201, with which the rotary-wing aircraft 11 can transition from standstill to ascent flight. This preferably requires at least a power of 150 KW each of the two motor generators 13 shown in FIG. 13 at the front and rear axis of rotation t, wherein the two rotor modules 2 rotate at a rotational speed of 800 revolutions or less per minute. For the rotary-wing kinematics 10, this means 26 load changes per second.

FIG. 15 shows an example of two rotor modules 2 rotating in opposite directions T, T' on separate circular paths U with the radii r2, r3 of the rotary-wing aircraft 11 according to FIGS. 13-14 in a schematic vertical section. Compared to the vertical section shown in FIG. 14, the diameter with the turning points P,P' assumes a circular path U orbital position marked by the numbers IV, X, wherein the lifting force d in all orbital positions I-XII, with the exception of orbital positions IV, X, results in a thrust force e directed upwards and in the direction of travel D. The adjustment area for the diameter with the turning points P,P' is characterized by the adjustment angle δ. In straight flight, the two rotor modules 2 rotate around the axis of rotation t at 800 revolutions per minute.

FIG. 16 shows a rotary-wing aircraft 11 designed as an airplane with a wing, in which four rotor modules 2 are fully integrated into the wing. The rotor modules 2 each consist of rotor blades arranged in pairs, which rotate in opposite directions T, T' on two concentric and coaxial circular paths with radii r2, r3 around a common axis of rotation t. The arrangement of the rotor modules 2 largely corresponds to the exemplary embodiment explained in FIGS. 13-15, with the difference that the four rotor modules are integrated into the wing of the aircraft and are each designed in a housing 114 with an inlet IN facing the wing leading edge of the wing and an outlet EX for the flow F facing the wing trailing edge. The bow-shaped rotor blades 1 of the four rotor modules 2 each have a central blade segment B2 of length g, which is arranged parallel to the transverse axis y of the aircraft. The blade segments B1, B3 of the rotor blades rotating in opposite directions T,T' are also adjustable, so that aerodynamically induced forces parallel to the axis of rotation t serve to stabilize the aircraft in hovering flight and to generate an air flow within the housing 114 in the flow channel, which serves to dissipate heat from the motor generators 13 arranged coaxially and concentrically to the axis of rotation t. The turning points P,P' of the diameter are aligned horizontally during vertical take-off, wherein the suction side (-) of the variable asymmetrical airfoil 201 is directed vertically upwards in both halves of the circular path U, so that the lift generated by the counter-rotating rotor blades 1 can be used for the vertical take-off. According to the rotary-wing kinematics 10, the diameter with the turning points P,P' is gradually oriented vertically for the receptacle of the straight flight, so that a thrust force e effective in the direction of travel D can be derived from the lifting force d caused by the four rotor modules. The complete integration of the four rotor modules 2 into the wing of this air cab for four persons is an example of the possibility of vertical take-off and the transition to straight and level flight on a flying wing aircraft with wings. This innovative drive technology is quiet and, thanks to the thrust force e derived directly from the lifting force d, is very effective both in vertical take-off and in straight flight.

FIG. 17 shows the aircraft according to FIG. 16 in straight flight, at the top in a perspective overview, in the middle with a vertical alignment of the turning points P,P' for the variable asymmetric airfoil 201, which enables straight flight, and at the bottom in an overview perspective of the flying wing from behind. The flow channel of a rotor module 2 is flowed through at right angles to the direction of travel D. Within the flow channel, the diameter with the turning points P,P' can be oriented in such a manner that the drive force d for straight flight results in a thrust force e parallel to the longitudinal axis x of the aircraft. The aerodynamic forces caused by the rotary-wing kinematics are exemplified at twelve orbital positions I-XII. Immediately at the diameter with the turning points P,P', at which the blade adjustment of the variable asymmetric airfoil takes place, no lifting forces d are produced, wherein despite the turbulent flow F in the flow channel, the asymmetric airfoil 201 produces considerable lifting forces d at all other orbital positions, from which a thrust force e can be derived in each case. With an adjustment area δ of 360°, the thrust force e can be steered in any direction.

FIG. 18 shows a rotary-wing aircraft 11, which is designed as a tug and bowser and has two electrically driven rotor modules 2, each with six two-part kinematic rotor blades 1. The suction sides (−) of the six rotor blades 1 of a rotor module 2 are aligned in the direction of travel D. In this exemplary embodiment, the front blade segment B1 is designed as a longitudinal carrier 21, to which a rear blade segment B3 is hinged at the rear axis of rotation v2. The rotor modules 2 are arranged in the forward half of the ship on the starboard and port side of the longitudinal axis x and each rotate in the opposite direction T,T'. Together with horizontal and vertical guide surfaces, the flat ship bottom 112 forms a flow guide S for the flow towards the six kinematic rotor blades 1 of the rotor module 2. The detailed sections show a two-part design of the rotor blades 1, which each have actuators 20 at their upper and lower ends, corresponding to the exemplary embodiment shown in FIG. 19. As shown in FIG. 17, the rotor blades 1 rotate about the vertical axis of rotation t and are electrically driven by a motor generator 13 arranged inside the hull 111. In contrast to a Voith-Schneider propeller, the kinematic rotor blades 1 operate as lifting rotors and can be operated at a comparatively much higher rotational speed. Each rotor blade 1 with the variable asymmetrical airfoil 201 generates a lifting force d, from which a thrust force e results. As shown in FIGS. 20-21, the thrust force e can be aligned in any direction of travel d, so that the tug and bowser can change its direction of travel D to any direction in a matter of seconds.

FIG. 19 shows an alternative rotor module 2 for the drive of the tug and bowser according to FIG. 16. The rotor module 2 has six kinematic rotor blades 1 each with a front B1, a center B2 and a rear blade segment B3. The central blade segment B2 forms a rigid longitudinal carrier 21 to which the front blade segment B1 and the rear blade segment B3 are hinged, as shown in FIGS. 9-11. The rotary-wing kinematics 10 of the rotor module 2 is controlled in such a manner that the diameter can be aligned with the turning points P, P' in the desired direction of travel D. At the diameter with the turning points P, P', the suction side (−) and the pressure side (+) of the rotor blade 1 change their orientation to the circular path U, such that the suction sides (−) of the rotor blades 1 are oriented towards the direction of travel D in both halves of the circular path U. The rotor blades 1 are subdivided along the length g into four longitudinal portions A1-A4, such that each longitudinal portion can accommodate at least two actuators 20 for the blade adjustment. The upper ends of the longitudinal carrier 21 are flexurally rigidly connected to a disc-shaped transverse carrier 22, while the lower ends of the longitudinal carriers 21 are flexurally rigidly connected to an annular transverse carrier 22, forming a rotor module 2 that is inherently rigid in bending, shear and torsion.

FIG. 20 shows a further exemplary embodiment for the drive of the tug and bowser according to FIG. 16. Two rotor modules 2 rotating in opposite directions are driven by a motor generator 13 arranged inside the hull 110 with two concentric and coaxial shafts and a gearbox. Here too, the rotor blades 1 are subdivided into longitudinal portions A1-An, such that each longitudinal portion has at least two actuators 20 for the blade adjustment. As shown in FIGS. 9-11, the actuators are guided linearly on a hinge pin 205. The longitudinal carriers 21 of the rotor blades 1 of the two rotor modules 2 are each rigidly connected at their upper and lower ends to transverse carriers 22, which are either disc-shaped or ring-shaped.

FIG. 21 shows an embodiment of the rotor module 2 for a watercraft according to FIGS. 16-18, in which the actuators 20 for the blade adjustment of the rotor blades 1 have ferromagnetic setting levers 203, which are each switched at the upper and lower ends of a rotor blade 1 by means of two opposing electromagnets with exciter windings 208. The electromagnetic actuators 20 are each integrated into the disc-shaped transverse carriers 22 of the rotor module 2, which are designed as hollow bodies.

FIG. 22 shows twelve different orbital positions I-XII of the variable airfoil 201 on the circular path U for the watercraft according to FIG. 16 in start-up operation. As represented in FIG. 16, the suction side (−) of the variable asymmetrical airfoil 201 in relation to the direction of travel D changes to the exterior side of the circular path U in the front orbit and to the interior side of the circular path U in the rear orbit, so that the variable airfoil 22 in the form of a Clark YM-15 airfoil produces a thrust force e resulting from the lifting force d and indicated by arrows in the direction of travel D at a circular speed b. At the orbital position III, the suction side (−) of the variable airfoil 20 changes from the exterior side to the interior side of the orbital band U, while at the orbital position IX, the suction side (−) of the variable airfoil 20 changes from the interior side to the exterior side of the orbital band U and in each case has a symmetrical airfoil 200 in a transitional position. In windward and leeward rotation, the resulting flow c as the vector sum of the flow speed a and the rotational speed b of the rotor module 2 therefore causes a thrust force e directed in the direction of travel D, which is approximately one third greater with the asymmetrical airfoil 201 than with a symmetrical airfoil 200. This results in a substantially improved efficiency of the ship drive.

FIG. 23 shows as an example twelve different orbital positions I-XII of the variable airfoil 201 for the watercraft according to FIG. 16 in driving operation. Compared to the start-up operation shown in FIG. 20, the thrust force e caused by the variable airfoil 201 is reduced in driving operation, as shown at the twelve orbital positions I-XII shown, under the influence of the drive speed referred to as the flow speed a. For this reason, this type of ship drive is suitable for slow-moving watercraft with a drive speed limited to approximately seven to eight knots. However, the higher rotational speed b compared to the Voith-Schneider propeller reduces the negative influence of drive speed.

FIG. 24 shows the hull 110 of a watercraft for inland waterways, at the top in a schematic bottom view, in the middle as a perspective bottom view and at the bottom in a frontal view. The hull 110 has a bulkhead 111 at the bow and stern, so that indentations are formed on the starboard and port sides for the installation of a total of four rotor modules 2. The rotor modules 2 arranged in pairs at the bow and stern each rotate with a radius r1 in the opposite direction of rotation T, T' around a vertical axis of rotation t and have a flow guide 113 with a Reuleaux triangular cross-section within the radius r1, which together with the bulkhead 111 forms the flow guide S for a rotor module 2. The Reuleaux triangle of the flow guide 113 is rotatably connected to the hull 110 in such a manner that the tip of the Reuleaux triangle can be oriented in the direction of travel D, as shown here. The watercraft has a longitudinal axis x, a transverse axis y and a vertical axis z. The hull 110 has a U-shaped frame and can be adapted to different functions, such that the watercraft can be designed as a fast-moving cargo ship, as a passenger ship or as a ferry. With the rotary-wing kinematics 10 of the rotor modules shown in more detail in FIG. 23, the watercraft can change the direction of travel D very quickly and travel forwards, backwards or sideways. The flow guide 113 causes a favorable flow to the six rotor blades of the rotor module 2, which is explained in more detail in FIG. 23 using the example of twelve orbital positions I-XII.

FIG. 25 shows a rotor module 2 of the hull 110 according to FIG. 22, which rotates with the radius r2 on the circular path U about a vertical axis of rotation t and has a flow guide 113 with the radius r1 arranged within the circular path U, which has a Reuleaux triangle in cross-section. The flow guide 113 is mounted on an axis of rotation that is coaxial and concentric with the axis of rotation t of the rotor module 2 and can be rotated on the flat ship bottom 112 shown in FIG. 22 in the area of the bulkhead 111 and can assume different positions with respect to the direction of travel D. At the top, a position of the flow guide 113 is shown in which the tip of the Reuleaux triangle is aligned in the direction of travel D, while at the bottom, the Reuleaux triangle is aligned with the blunt side in the direction of travel D. Although the flow guide 113 increases the flow resistance of the watercraft-significantly less at the top than at the bottom-on the other hand, the deflection of the flow F leads to a favorable flow towards the asymmetrical airfoils 201, whose suction sides (−) can be aligned with the respective direction of travel D in both halves of the circular path U according to the invention. At the turning points P,P′, the asymmetrical airfoil 201 temporarily takes on the shape of a symmetrical airfoil 200. Due to the redirection of the flow F, the asymmetrical airfoil 201 of the rotor blade 1 causes a resulting flow c in both halves of the circular path U, such that the rotor blade 1 generates a lifting force d at all twelve orbital positions I-XII, which causes a thrust force e directed in the direction of travel. Forces c,d,e are labeled as examples for some orbital positions.

FIG. 26 shows a watercraft designed as a seagoing high-speed container ship, the hull 110 of which has a flow guide S. The underwater hull 110 has submerged starboard and port side lifting bodies which can be used, for example, as large volume hydrogen tanks 119 and which together with the flat ship bottom 112 form a propulsion channel 115 in the center. Coaxial to the longitudinal axis x of the vessel, a total of six housings 114 are arranged within this drive channel 115 and, as shown in FIGS. 25-26, each accommodate a rotor module 2. The electrical energy for operating the motor generators 13 of the rotor modules 2 is provided by fuel cells, which are fed from the hydrogen tanks 119. The six housings 114 each accommodate a rotor module 2 and have an input IN oriented in the direction of travel D and an output EX on the downstream side, wherein the flow through them is vertical, as explained in more detail in FIG. 25. The container ship is substantially designed symmetrically to the vertical axis z, so that it can move both forwards and backwards in estuaries and harbors and can be maneuvered very well by means of the rotary wing kinematics 10 for the rotor modules 2.

FIG. 27 shows the housing 114 for one of the six rotor modules 2 of the watercraft according to FIG. 22, at the top in a schematic cross-section and at the bottom in a perspective sectional view, with representation of an upper inlet IN aligned in the direction of travel D and a lower outlet EX for the flow F. On the pressure side (+) of the housing 114, which is designed as a symmetrical wing stub 118, the inlet IN for the flow F is arranged at the upper end of the housing 114, while the outlet EX for the flow F is located at the lower end of the wing stub 118 on the suction side (−) in the dead water. The flow F flows through the housing 114 in a vertically arranged, hollow cylinder-shaped drive channel 115 from top to bottom, wherein a submerged motor generator 13 is arranged concentrically and coaxially to the axis of rotation t in the center of the drive channel 115 and is connected at its upper end to the hull 110 of the watercraft. Six rotor blades 1 of the rotor module 2 are designed bow-shaped and divided into three longitudinal portions A1-A3 along the length g. The rotor blades 1 on the longitudinal portions A1 and A3 drive the vertical flow F within the drive channel 115, while the rotor blades 1 in the longitudinal portions A2 with length g are designed to generate the thrust force e in the direction of travel D, as shown in FIG. 20.

FIG. 28 shows an alternative design of the housing 114 for one of the six rotor modules 2 of the watercraft according to FIG. 24. The housing 114 is designed as a wing stub 118 aligned with its longitudinal axis x coaxial to the longitudinal axis x of the watercraft and has in its interior a hollow cylindrical drive channel 115 arranged perpendicular to the longitudinal axis x, in which the rotor module 2 rotates about the axis of rotation t of the submerged motor generator 13. Comb-like designed flow guides 113 on the pressure side (+) of the wing stub 118 aligned in the direction of travel D cause a circular flow F′ within the drive channel 115 that is directed against the direction of rotation T of the rotor module 2. The outlet EX for the flow F is located on the suction side (−) of the wing stub 118 facing away from the flow at the lower end of the housing 114 and favors the outflow of the flow from the drive channel 115. With this arrangement for the rotor module 2, the negative influence of the drive speed on the thrust force e generated by the rotor module 2 described in FIG. 21 is eliminated, so that the ship drive also appears to be particularly suitable for high drive speeds.

FIG. 29 shows a rotary-wing aircraft 11 designed as a submarine with a new type of noiseless stern drive, which is formed by two rotor modules 2 arranged parallel to the transverse axis of the submarine. The stern part of the submarine has starboard and port extensions designed according to fluid dynamic aspects with an inlet IN on the pressure side of the housing 114 of the rotor modules 2. At a common outlet EX at the stern of the submarine, the flow leaves the drive channel 115, as also shown in FIG. 30. The bow-shaped rotor blades 1, designed with three longitudinal portions A1-A3, either rotate on a circular path U as shown in FIG. 30 or have two circular paths U with radii r2, r3 as shown here. At the turning points P,P′ of a diameter that can be freely oriented with an adjustment area δ within a radius of 360°, the suction side (−) of the rotor blades 1 changes from the exterior side to the interior side of the circular path U and vice versa. This allows the thrust force e of the rotor blades driven by the motor generator 13, which is derived from the lifting force d, to be steered in any direction, so that the submarine can descend or ascend from straight ahead in a matter of seconds. The encapsulated design of the rotary vane drive means that no noise is transmitted to the water surrounding the submarine.

FIG. 30 shows the submarine according to FIG. 29 in a bow-side perspective with representation of the inlet IN for the flow at the stern. The schematic cross-section below shows two rotor modules 2 arranged parallel to the transverse axis y of the submarine with bow-shaped rotor blades 1, which are subdivided into longitudinal portions A1-A3. In this exemplary embodiment, the longitudinal portions A1, A3 cause a flow through the drive channel 115 and are formed by correspondingly inclined asymmetrical airfoils 201, while the rotary wing kinematics 10 according to the invention are designed in the longitudinal portion A2 of the bow-shaped rotor blades 1 as shown in FIG. 29.

FIG. 31 shows a rotary-wing turbine 12 which is designed as a water turbine with a horizontal axis of rotation t and whose supporting structure L has a beam bridge as a structural system that can be extended in one direction. A single rotor module 2 of the rotary-wing turbine 12 has four kinematic rotor blades 1 of length g, each of which is subdivided into four longitudinal portions A1-A4 and forms a straight wing chain 202. In each of the four longitudinal portions A1-A4, at least two actuators 20 assigned in pairs to the axes of rotation v1,v2, which correspond to the exemplary embodiments described in FIGS. 9-11, are provided for actuating the rotary-wing kinematics 10. A rigid connection is provided between the central blade segments B2 of the rotor blades 1, designed as longitudinal carriers 21, and disc-shaped transverse carriers 22, so that a drum-shaped rotor module 2 is formed which is rigid in bending, shear and torsion and which is connected to a motor generator 13 arranged concentrically and coaxially to the axis of rotation t. The rotary-wing turbine 12 rotates transversely to the flow F on a body of flowing water. The suction sides (−) of the rotor blades 1 change their orientation from the exterior side to the interior side of the circular path U at an upper and a lower turning point P,P' of the diameter of the circular path U, wherein the suction side (−) of the rotor blades 1 is oriented towards the interior side of the circular path U in windward rotation and the suction side (−) is oriented towards the exterior side of the circular path U in leeward rotation. The detailed sections of the variable asymmetric airfoil 201 of the adjustable rotor blades 1 show examples of the flow dynamic effect of the asymmetric airfoils 201 for the windward and leeward rotation. As shown in FIG. 31, the incident flow c resulting from the flow speed a and the orbital speed b causes a tangential drive force f derived from the lifting force d on the variable airfoil 201 in each orbital position I-XII. If the flow F changes direction regularly for several hours, as in a tidal power plant, the rotor blades 1 can be adapted to the change in direction of the flow F while maintaining their direction of rotation T', wherein the suction sides (−) of the rotor blades 1 are always arranged on the leeward side in a rotary-wing turbine 12. The number of rotor blades 1 increases with the size of the rotor blade turbine 12, whose support structure L has a scalable construction system. FIG. 32 shows a rotary-wing turbine 12, which is designed as a water turbine with a vertical axis of rotation t. A total of four kinematic rotor blades 1, designed in three parts, each change the orientation of the suction side (−) from the inside to the exterior side of the circular path U at a diameter that can be aligned to the flow F with turning points P, P' of the circular path U. The resulting incident flow c is composed of the flow speed a and the circular speed of the rotor module 2 and causes a lifting force d on the asymmetrical airfoil 201 of the rotor blades, from which a tangential drive force f can be derived. The rotor module 2 is braced by a total of three transverse carriers 22, wherein the two upper transverse carriers 22 are designed in the shape of a ring, while the lower transverse carrier 22 is disc-shaped. A rotor blade 1 of the rotor blade turbine 12 with the length g is subdivided into four longitudinal portions A1-A4, wherein each longitudinal portion A1-A4 accommodates actuators 20 arranged in pairs and integrated in the transverse carriers 22, which correspond to the exemplary embodiment explained in FIG. 29.

FIG. 33 shows a vertical sectional perspective of the rotor blade 1 according to FIG. 32 with representation of an actuator 20 integrated in an annular transverse carrier 22, which has an electromagnetically controllable setting lever 203. Switchable exciter windings 208 are each integrated on the inside and exterior side of the circular path U in the annular transverse carrier 22 designed as a hollow profile and sealed off watertight from the movable blade segments B1, B3. This form of electromagnetically actuated actuator 20 is particularly suitable for water turbines.

FIG. 34 shows a rotary-wing turbine 12 designed as a wind turbine with a vertical axis of rotation t, in which four rotor blades 1 rotate about a vertical rotor axis t and are connected to one another by two annular transverse carriers 22 and to a motor generator 13 arranged coaxially and concentrically to the axis of rotation t by eight radial transverse carriers 22 at the head of the supporting structure L formed by a mast. The rotor blades 1 each consist of a front blade segment B1, a by means of blade segment B2 and a rear blade segment B3. The central blade segments B2 are designed as longitudinal carriers 21 of the rotor blades 1 and are rigidly connected at both ends to the annular transverse carriers 22, so that a rotor module 2 is formed that is inherently rigid in bending, shear and torsion. Five longitudinal portions A1-A5 of the rotor blade 1 form a wing chain 202 of length g. Each longitudinal portion A1-A5 accommodates at least two actuators 20, according to the exemplary embodiments described in FIGS. 9-11. The suction sides (−) of the rotor blades 1 change their orientation from the inside in the windward rotation to the exterior side in the leeward rotation at a diameter that can be aligned with an adjustment area δ of 360 degrees in the direction of the flow F at the turning points P,P'. The aerodynamically induced forces and different operating positions of the rotor blades 1 are shown in FIGS. 35-37.

FIG. 35 shows twelve different orbital positions I-XII of the variable asymmetrical airfoil 201 of the rotary-wing turbines 12 shown in FIGS. 31-34 on the circular path U defined by the radius r2. In relation to the direction of the flow F, the suction side (−) of the variable asymmetrical airfoil 201 is aligned to the inside of the circular path U on the windward side and to the exterior side of the circular path U on the leeward side, so that in the case of the wind turbine shown in FIG. 30 as a Clark YM-15 profile, the variable airfoil 201 produces a tangential drive force f at wind forces 3-6, indicated by arrows in the direction of rotation T. At the orbital position III, the suction side (−) of the variable airfoil 20 changes from the exterior side to the interior side of the orbital band U, while at the orbital position IX, the suction side (−) of the variable airfoil 201 changes from the interior side to the exterior side of the orbital band U and in each case has a symmetrical airfoil 200 in a transitional position. In windward and leeward rotation, the resulting incident flow c as a vector sum of the flow speed a and the rotational speed b of the rotor module 2 therefore causes a lifting force d inclined in the direction of rotation T, which is approximately one third greater with the asymmetrical airfoil 201 than with the symmetrical airfoil 200 considered in FIG. 32. This results in a substantially improved efficiency of the rotary blade turbine 12, which can be designed as a wind or water turbine, compared to a conventional Darrieus rotor.

FIG. 36 shows twelve different orbital positions I-XII of the variable asymmetrical airfoil 201 of the rotor blades 1 for the rotary-wing turbines 12 with a symmetrical airfoil 200 shown in FIGS. 27-30. For the wind turbine described in FIG. 30, this unitary rotor blade position is provided for wind forces 6-9 according to the Beaufort scale in order to utilize a lifting force d reduced by one third for the operation of the wind turbine during storms. Compared to the blade positions of the rotor blades 1 shown in FIG. 31, the variable airfoil 201 as a symmetrical airfoil 200 results in a lower lifting force d and a resulting reduced tangential drive force f. The rotary blade turbine 12, which can be designed as a wind or water turbine, therefore has a lower overturning moment at the base.

FIG. 37 shows twelve different orbital positions I-XII of the variable asymmetric airfoil 201 of the rotor blades 1 for the rotary-wing turbines 12 shown in FIGS. 27-30. The variable asymmetric airfoil 201 of the wind turbine shown in FIG. 30 shows an inverse position of the variable asymmetric airfoil 201 of the rotor blades 1 compared to the rotary wing kinematics 10 described in FIG. 31. In relation to the direction of the flow F, the suction side (−) of the asymmetrical airfoil 201 in the form of a Clark-YM-15 airfoil is oriented towards the exterior side of the circular path U in the windward orbit and towards the interior side of the circular path U in the leeward orbit, so that the variable airfoil 201, with the exception of orbital positions IX and III, causes a reduced tangential drive force f at extreme wind forces 9-12 according to the Beaufort scale at orbital positions V-VIII and X-I, which is countered by a tangential resistance acting against the direction of rotation T at orbital positions III, IV and IX. However, since the tangential drive force f predominates, the wind turbine rotates according to the Saffir-Simpson hurricane scale, even during a hurricane, and converts part of the kinetic energy of the storm into a rotary movement, which is an advantage over a standstill of the rotary-wing turbine 12.

Naturally, many variations and modifications are possible within the scope of the present inventions.

The invention claimed is:

1. A device which is designed as a rotary-wing craft or as a rotary-wing turbine, the device comprising:
a rotor module with a motor generator, with rotor blades and with rotary-wing kinematics for the rotor blades connected to the motor generator, the rotor module is designed to enable the rotor blades to rotate in the same or opposite direction on a circular path about an axis of rotation, the rotor blades are each subdivided into a plurality of longitudinal portions for the receptacle of at least one actuator integrated in a longitudinal carrier or transverse carrier of the rotor blade and have a variable, asymmetrical airfoil which, in one revolution of the rotor blade, can be freely oriented at a diameter of the circular path which is freely orientable within an adjustment range with turning points in at least one longitudinal portion of the rotor blade with a length in such a manner that the suction side and the pressure side of the asymmetrical blade profile can be adjusted by means of the rotary-wing kinematics at the turning points from the exterior side to the interior side of the circular path, or vice versa, the interior side being the side of the circular path facing the axis of rotation, the exterior side being the side of the circular path facing away from the axis of rotation, and the variable, asymmetrical airfoil of the rotor blade temporarily has a symmetrical airfoil with its chord aligned tangentially to the circular path in a transitional position; wherein the device in the case of the design as a rotary-wing craft is designed in such a manner that the diameter can be aligned with the turning points in the at least one longitudinal portion of the rotor blades with the length transverse to the direction of travel in such a manner that the suction side of the asymmetrical airfoil in both halves of the circular path is oriented in the direction of travel and a thrust force acting in the direction of travel results from the lifting force generated on the asymmetrical airfoil; and
wherein the device in the case of the design as a rotary-wing turbine is designed in such a manner that the diameter with the turning points in all longitudinal portions of the rotor blade can be aligned orthogonally to the flow in such a manner that the suction side of the asymmetrical airfoil can be oriented to the leeward side in both halves of the circular path and a tangential drive force for the rotor blade turbine results from the lifting force generated by the asymmetrical airfoil.

2. The device according to claim 1, wherein:
the motor generator of the rotor module has a stator and a rotor and is designed as an induction machine or as a permanently excited synchronous machine and has a shaft for a rotor blade or two shafts and a gearbox for two rotor blades with the radii which are arranged coaxially and concentrically to one another and rotate in opposite directions of rotation;
wherein, if the device is designed as a rotary-wing craft, the motor generator is designed to switch from motor operation to generator operation when thrust is reversed, wherein the suction sides of the asymmetrical airfoil are aligned opposite the direction of travel, wherein the rotary-wing craft is decelerated in descent or in free fall with a thrust force; and
wherein, if the device is designed as a rotary-wing turbine, the motor generator is designed to accelerate the rotor module to a starting rotational speed and then to switch to generator operation when the tangential drive force is greater than the rotational resistance of the rotor module.

3. The device according to claim 1, wherein:
in one revolution of the rotor blade, the variable asymmetrical airfoil of the rotor blade temporarily has a symmetrical airfoil with a chord aligned tangentially to the circular path of the rotor module at the diameter with the turning points in each case
in which the rotor blade
has either a front blade segment designed as a longitudinal carrier of the rotor blade, to which front blade segment a rear blade segment is articulated on a rear axis of rotation, wherein the rotor blade has an asymmetrical blade profile by turning the rear blade segment in or out with opposite directions of rotation by up to 6 degrees in the windward and leeward rotation, the rotor blade having an asymmetrical airfoil, in which the chord in both halves of the circular path divided by the diameter with the turning points has a positive setting angle of up to 3.5 degrees relative to a tangent to the circular path
or has a central blade segment designed as a longitudinal carrier, to which a front blade segment rotatable about a front axis of rotation is articulated with the nose, and to which middle blade segment a rear blade segment rotatable about a rear axis of rotation is articulated with the rear edge, wherein the rotor blade has an asymmetrical airfoil on the windward and leeward side, the chord of which is inclined at a positive setting angle of up to 2 degrees relative to a tangent to the circular path.

4. The device according to claim 1, wherein:
the rotor blade is designed to be either straight or bow-shaped or arcuate or loop-shaped and is subdivided into a plurality of longitudinal portions in such a manner that a straight rotor blade has a straight wing chain and a rotor blade designed in the shape of a bow or arc or loop has a polygon-train-shaped wing chain with respectively differently inclined axes of rotation in the straight longitudinal portions of the polygon-train of the wing chain, wherein the actuators for the rotatable blade segments are integrated in the longitudinal carriers or in the transverse carriers of the rotor blades.

5. The device according to claim 1, wherein:
the actuators of the rotor blade, including the energy stores and servomotors, are fully integrated into internal hollow spaces of the longitudinal carriers of the rotor blades, wherein the actuators actuate cylindrical slides which are linearly guided on their inner sides on hollow hinge pins arranged coaxially and concentrically to the axes of rotation and engage on their exterior sides in threaded portions of the front and rear blade segments, and wherein the actuators effect the turning in and out of the movable blade segments relative to the inherently rigid longitudinal carrier by means of an electromagnetically or hydraulically or pneumatically or mechanically driven linear translational movement of the slide.

6. The device according to claim 5, wherein:
the slide of the rotor blade
can be moved back and forth either by a pneumatic muscle arranged coaxially and concentrically to at least one of the axes of rotation or by a plurality of pneumatic muscles arranged parallel to the axes of rotation;
or in which the slide is movable by an actuator designed as a linear motor, wherein the hinge pin in the relevant longitudinal portion of the longitudinal carrier carries a plurality of excitation windings arranged radially with respect to the axes of rotation, which together with permanent magnets of the slide form the three-phase linear motor, which is designed for precise controller of the blade segments and the adjustment area;
or in which the slide is movable by an actuator formed by a switchable electromagnet, wherein the hinge pin has an excitation winding arranged coaxially and concentrically to the axes of rotation for the induction of an iron sleeve of the slide, wherein a media channel formed by the hinge pin extends between both ends of the rotor blade.

7. The device according to claim 1, wherein:
the device is designed as a rotary-wing craft with a longitudinal axis, a transverse axis and a vertical axis, said rotary-wing craft being designed as an aircraft or as a watercraft, wherein the at least one rotor module rotates about axes of rotation arranged coaxially and concentrically or parallel to one of the axes in each case, wherein the rotary-wing kinematics of the rotor module is designed in the longitudinal portion of the rotor blades with the length and can be controlled by a pilot or with a remote control, which rotary-wing craft if designed as an aircraft, is designed as a helicopter, as a vertical take-off air cab, as a craft suitable for air and road traffic, or as an aircraft with at least one wing; and
in the case of training as a watercraft, is designed as a tug and bowser or as a cargo or passenger ship or as a submarine.

8. The device according to claim 7, wherein:
the device is designed as a helicopter with an axis of rotation arranged concentrically and coaxially to the vertical axis, wherein the rotor blades are designed in the shape of a bow and form a polygon-train-shaped wing chain which is divided in height into an upper, a means of and a lower longitudinal portion, wherein the diameters with the turning points in the upper and lower longitudinal portions of the rotor modules are aligned longitudinally to the direction of travel and the setting angles of the asymmetrical airfoils are controlled in such a manner that the lifting forces in the left and in the right half of the circular paths of the rotor module are of equal magnitude during flight operation of the helicopter, and wherein in the central longitudinal portion with the length, the adjustment area of the rotary-wing kinematics for the diameter with the turning points is 360 degrees, such that the suction sides of the asymmetrical airfoils can be aligned in any direction of travel and the rotor blades in the central longitudinal portions generate a thrust force directed in the respective direction of travel.

9. The device according to claim 7, wherein:
the device is designed as a suitable for air and road traffic, wherein in each case two rotor blades rotating in opposite directions of rotation form a front and a rear rotor module in such a manner that in each case at least four bow-shaped rotor blades of the two rotor modules rotate about an axis of rotation arranged parallel to the transverse axis and form a polygon-train-shaped wing chain, which is folded into the front and rear parts of the craft during driving operation of the craft suitable for flight and road traffic, and the craft is designed as a passenger car with four wheels and with four telescopic supports which lift the craft during the take-off phase of flight operation, so that the unfolded rotor modules are freely rotatable and the takes off, the telescopic supports are retracted and the rotor modules control the flight operation of the craft in such a manner that for straight flight in the longitudinal portion of the bow-shaped rotor blades the adjustment area is used for generating the lifting force and a thrust force acting in the direction of travel and the lateral longitudinal portions of the bow-shaped rotor blades are provided for the controller and stabilization of the craft about the longitudinal, transverse and vertical axes.

10. The device according to claim 7, wherein the device is designed as an aircraft with at least one wing, said wing forming a housing for the rotor module and a plurality of rotor modules being integrated into the at least one wing of an aircraft, wherein the wing forms a flow guide with a pressure side oriented in the direction of travel as the inlet for a flow and a suction side oriented towards a wing trailing edge of the wing as the outlet for the flow, and the axes of rotation of the rotor modules within the wing are oriented transversely to the direction of travel, wherein a rotor module has at least four rotor blades each, which rotate in pairs with opposite directions of rotation and enable a vertical take-off and a straight flight of the aircraft in that the diameter with the turning points in the longitudinal portion with the length can each be aligned perpendicular to the desired direction of travel within a radius of 360 degrees.

11. The device according to claim 7, wherein:
the device is designed as a watercraft, in which an at least partially flat ship bottom forms a flow guide for a plurality of rotor modules with axes of rotation aligned perpendicular to the ship bottom, and the rotor modules rotate in opposite directions and are arranged either in a row coaxially to the longitudinal axis of the watercraft or in pairs parallel to the longitudinal axis of the watercraft, such that the individual rotor blades of the rotor modules are exposed to a free flow; or the device is designed as a watercraft, wherein the rotor module has a flow guide which is designed as a longitudinal portion of a Reuleaux triangle rotatably mounted within a circumcircle with the radius on the axis of rotation of the rotor module, wherein the hull of the fast-moving watercraft at the bow and stern each has a starboard and portside bulkhead for the arrangement of the rotor modules with the flow guides.

12. The device according to claim 7, wherein:
the device is designed as a seagoing watercraft, in which the airfoil has a housing for the rotor module and is formed by a wing stub which is aligned with its pressure side in the direction of travel and has an inlet and an outlet for the flow, wherein the inlet is located on the pressure side of the wing stub and has a plurality of comb-like flow guides which are designed to flow onto the rotor blades inside the housing with a circular flow counter to the direction of rotation of the rotor module and wherein the outlet for the flow is located downstream on the suction side of the housing.

13. The device according to claim 7, wherein:
the device which is designed as a seagoing watercraft which has a flat ship bottom between lower-reaching lifting bodies arranged on the starboard and port sides for the receptacle of hydrogen tanks and the lifting bodies together with the flat ship bottom form a drive channel extending from the bow to the stern for the arrangement of a plurality of rotor modules, whose housings each have a wing stub and are arranged in the drive channel in the direction of travel in series one behind the other parallel to the longitudinal axis of the watercraft in such a manner that the housing has a pressure side aligned in the direction of travel with an upper inlet for the flow and a suction side with a lower outlet for the flow, so that a ring channel surrounding the motor generator and arranged parallel to the vertical axis of rotation of the rotor module is flowed through vertically and the supporting structure of the watercraft has a watertight shell and a load-bearing skeleton of trusses arranged in the longitudinal and transverse directions, which are connected to one another to form a spatial truss girder and, at nodal points within the drive channel, to the upper ends of the housings for the rotor modules, so that the loads on the hull are transmitted from the envelope to the spatial truss girder at the nodal points of the supporting structure.

14. The device according to claim 7, wherein the device is designed as a watercraft, said watercraft being designed as a submarine, the hull of which is connected at the stern to a housing for the receptacle of two rotor modules arranged respectively on the starboard and port side parallel to the transverse axis, said housing having a flow guide with a pressure side oriented in the direction of travel as the inlet for the flow and a suction side oriented towards the dead water of the submarine as the outlet for the flow, wherein a rotor module has at least four rotor blades, each rotating in pairs in opposite directions, which form the drive and controller for the surface and underwater travel of the submarine and control the diving or climbing of the submarine in such a manner that the diameter can be aligned with the turning points within a radius of 360 degrees in each case perpendicular to the desired direction of travel.

15. The device according to claim 1, wherein:
the device is designed as a rotary-wing turbine, the rotary-wing turbine being designed either as a wind turbine or as a water turbine;
and in which sensors detect the direction of the flow and the actuators align the diameter with the turning points on the circular path perpendicular to the respective direction of the flow, wherein the suction side of the asymmetrical airfoil of the rotor blade can be oriented towards the exterior side of the circular path on the windward side and towards the interior side of the circular path on the leeward side in order to limit the rotational speed of the rotary-wing turbine, and the rotary-wing turbine is connected to an external supporting structure, which in the case of a wind turbine is formed by a mast anchored in a foundation and in the case of a water turbine with a horizontal or vertical axis of rotation is formed by a bridge or by a mast.

16. The device according to claim 4, wherein an actuator for the longitudinal carrier is designed as a pneumatic muscle or as a switchable electromagnet with an exciter winding.

17. The device according to claim 4, wherein an actuator for an annular or disc-shaped transverse carrier has an electromagnetically actuated setting lever engaging on the axes of rotation, such that each longitudinal portion of the wing chain can be individually controlled.

18. The device according to claim 5, wherein the slide is arranged in hollow spaces of a blade segment of the rotor blade designed as a longitudinal carrier.

* * * * *